US012602251B2

(12) United States Patent
Kanda

(10) Patent No.: US 12,602,251 B2
(45) Date of Patent: Apr. 14, 2026

(54) SEMICONDUCTOR DEVICE, CONTROL METHOD FOR THE SAME, AND PROGRAM

(71) Applicant: RENESAS ELECTRONICS CORPORATION, Tokyo (JP)

(72) Inventor: Kenta Kanda, Tokyo (JP)

(73) Assignee: Renesas Electronics Corporation, Tokyo (JP)

( * ) Notice: Subject to any disclaimer, the term of this patent is extended or adjusted under 35 U.S.C. 154(b) by 704 days.

(21) Appl. No.: 18/055,598

(22) Filed: Nov. 15, 2022

(65) Prior Publication Data

US 2023/0195523 A1    Jun. 22, 2023

(30) Foreign Application Priority Data

Dec. 20, 2021    (JP) .................................. 2021-205996

(51) Int. Cl.
G06F 9/50          (2006.01)
(52) U.S. Cl.
CPC .................................. G06F 9/5027 (2013.01)
(58) Field of Classification Search
None
See application file for complete search history.

(56) References Cited

U.S. PATENT DOCUMENTS 7,386,586 B1 *  6/2008  Headley ................ G06F 9/5033
                                               709/201
8,881,161 B1 * 11/2014  Chudgar ............... G06F 9/4843
                                               718/1

9,009,711 B2 *  4/2015  Wein ....................... G06F 9/546
                                               718/104
9,250,953 B2 *  2/2016  Kipp ..................... G06F 9/5027
9,588,809 B2    3/2017  Jensen et al.
9,747,127 B1 *  8/2017  Florissi ..................... G06F 9/46
11,204,803 B2 * 12/2021  Li ............................. G06N 3/08
(Continued)

FOREIGN PATENT DOCUMENTS

JP    2011-175378 A    9/2011
JP    2012-178107 A    9/2012
JP    2013-218744 A    10/2013

OTHER PUBLICATIONS

Saranya et al. "Dynamic Partitioning Based Scheduling of Real-Time Tasks in Multicore Processors"; 2015 IEEE 18th International Symposium on Real-Time Distributed Computing; DOI 10.1109/ISORC.2015.23; (Saranya_2015.pdf) (Year: 2015).*

(Continued)

*Primary Examiner* — Hiren P Patel
(74) *Attorney, Agent, or Firm* — Rimon P.C.

(57) ABSTRACT

An exclusive control processing that is complex is eliminated on tasks executed in processors. A semiconductor device includes: a memory that stores task management information and running group management information; a first PE and a second PE; and a first shared resource and a second shared resource, and the first PE or the second PE is configured to refer to the running group management information and specify a group of tasks executable in the first PE or the second PE as an executable group, and to refer to the task management information and determine a task associated with group identification information of the specified executable group as a task to be executed next in the first PE or the second PE.

8 Claims, 37 Drawing Sheets

(56) References Cited

U.S. PATENT DOCUMENTS

| | | | | |
|---|---|---|---|---|
| 2003/0037091 A1* | 2/2003 | Nishimura | G06F 9/4881 | |
| | | | 718/103 | |
| 2007/0220517 A1* | 9/2007 | Lippett | G06F 9/5038 | |
| | | | 718/102 | |
| 2008/0065803 A1* | 3/2008 | Utsumi | G06F 13/24 | |
| | | | 710/260 | |
| 2009/0113432 A1* | 4/2009 | Singh | G06F 9/4881 | |
| | | | 718/102 | |
| 2011/0113429 A1* | 5/2011 | Oda | G06F 11/0793 | |
| | | | 718/102 | |
| 2015/0163324 A1* | 6/2015 | Bolotin | H04L 67/63 | |
| | | | 709/225 | |
| 2016/0098296 A1* | 4/2016 | Ash | G06F 9/5061 | |
| | | | 718/104 | |
| 2020/0151034 A1* | 5/2020 | Khandelwal | G06F 9/542 | |
| 2022/0214929 A1* | 7/2022 | Wang | G06F 9/4881 | |

OTHER PUBLICATIONS

Zhuravlev et al.; "Survey of Scheduling Techniques for Addressing Shared Resources in Multicore Processors"; ACM Computing Surveys, vol. 45, No. 1, Article 4, Publication date: Nov. 2012; DOI 10.1145/2379776.2379780; (Zhuravlev_2012.pdf) (Year: 2012).*

Office Action dated Apr. 1, 2025, from corresponding Japan Patent Application No. 2021-205996, 8 pages.

Office Action dated Sep. 2, 2025, from corresponding Japan Patent Application No. 2021-205996, 8 pages.

* cited by examiner

Figure 4:
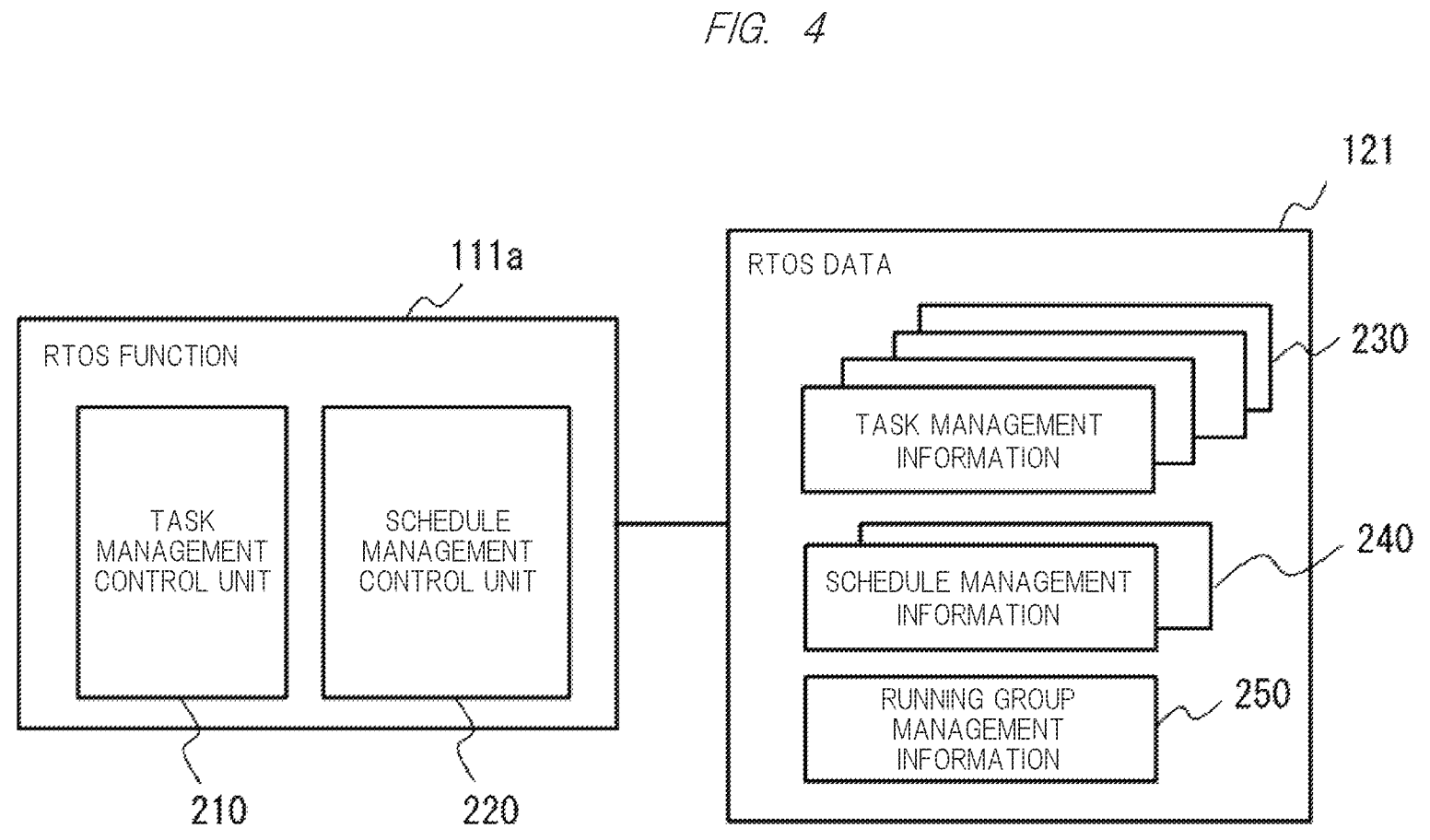

RTOS DATA

230

TASK MANAGEMENT INFORMATION

240

SCHEDULE MANAGEMENT INFORMATION

250

RUNNING GROUP MANAGEMENT INFORMATION

111a

RTOS FUNCTION

TASK MANAGEMENT CONTROL UNIT

210

SCHEDULE MANAGEMENT CONTROL UNIT

```
RTOS INITIAL SETTING FILE

TASK T1 {
       GROUP    = GroupA;
       PRIORITY = 6;
    };
    TASK T2 {
       GROUP    = GroupA;
       PRIORITY = 4;
    };
    TASK T3 {
       GROUP    = GroupB;
       PRIORITY = 4;
    };
    TASK T4 {
       GROUP    = GroupA;
       PRIORITY = 4;
    };
    TASK T5 {
       GROUP    = GroupB;
       PRIORITY = 2;
    };
    TASK T6 {
       PRIORITY = 2;
    };
```

*FIG. 12*

<CASE 1>

<CASE 1>

<CASE 1>

*FIG. 15*

<CASE 2>

<CASE 2>

*FIG. 17*

<CASE 3>

*FIG. 19*

<CASE 4>

*FIG. 21*

<CASE 5>

<CASE 5>

*FIG. 23*

<CASE 6>

<CASE 6>

TASK MANAGEMENT INFORMATION (PE1)

SCHEDULE MANAGEMENT INFORMATION (PE1)

*FIG. 25*

<CASE 7>

<CASE 7>

TASK MANAGEMENT INFORMATION (PE1)

SCHEDULE MANAGEMENT INFORMATION (PE1)

RUNNING GROUP MANAGEMENT INFORMATION

<u>121</u>

RUNNING GROUP MANAGEMENT INFORMATION

INTERRUPT MANAGEMENT 422       420
INFORMATION

421

INTERRUPT CAUSE GROUP INFORMATION

SEMICONDUCTOR DEVICE, CONTROL METHOD FOR THE SAME, AND PROGRAM

CROSS-REFERENCE TO RELATED APPLICATIONS

The disclosure of Japanese Patent Application No. 2021-205996 filed on Dec. 20, 2021 including the specification, drawings and abstract is incorporated herein by reference in its entirety.

BACKGROUND

The present invention relates to a semiconductor device, a control method for the same, and a program.

In recent years, microcomputers have been widely used as semiconductor devices mounted on in-vehicle systems, industrial equipment, home appliances and the like. In such a microcomputer, a multiprocessor system capable of executing tasks concurrently in a plurality of processors is adopted. In the multiprocessor system, an exclusive control is required since accesses from the respective processors to a shared resource such as a shared memory conflict with one another.

As a related art, there is a disclosed technique listed below.

[Patent Document 1] Japanese Unexamined Patent Application Publication No. 2011-175378

Patent Document 1 discloses a technology capable of preventing a processor resource from being continuously consumed when the conflict in the shared resource occurs in the multiprocessor system.

SUMMARY

However, in the related art, on each of tasks executed in the processors, it is necessary to perform exclusive control processing that is complex.

Other objects and novel features will be apparent from the description in the specification and the accompanying drawings.

According to an embodiment, a semiconductor device includes a memory, first and second processor elements, and first and second shared resources. The memory stores a program, task management information, and running group management information. The first and second shared resources are accessible from the first and second processor elements. The task management information is information in which tasks executed in the first or second processor element and group identification information for identifying groups corresponding to the first or second shared resource are associated with each other. The running group management information is information indicating, for each of the groups, whether or not the tasks associated with the group identification information of the groups are executed in the first or second processor element. The first or second processor element is configured to, by executing the program, refer to the running group management information, and specify, as an executable group, a group of tasks executable in the first or second processor element, and refer to the task management information, and determine a task associated with group identification information of the specified executable group as a task to be executed next in the first or second processor element.

According to the embodiment, the exclusive control processing that is complex can be eliminated on each of the tasks executed in the processors.

BRIEF DESCRIPTION OF THE DRAWINGS

FIG. 4 is a configuration diagram showing configurations of a real time operating system (RTOS) and RTOS data according to the first embodiment.

FIG. 6 is a configuration diagram showing the configuration of the RTOS according to the first embodiment.

FIG. 10 is a diagram showing an RTOS initial setting file for the specific example of the multiprocessor system according to the first embodiment.

FIG. 12 is a diagram showing states of tasks of respective processor elements (PEs) in Case 1 of the specific example of the multiprocessor system according to the first embodiment.

FIG. 15 is a diagram showing states of the tasks of the respective PEs in Case 2 of the specific example of the multiprocessor system according to the first embodiment.

FIG. 17 is a diagram showing states of the tasks of the respective PEs in Case 3 of the specific example of the multiprocessor system according to the first embodiment.

FIG. 19 is a diagram showing states of the tasks of the respective PEs in Case 4 of the specific example of the multiprocessor system according to the first embodiment.

FIG. 21 is a diagram showing states of the tasks of the respective PEs in Case 5 of the specific example of the multiprocessor system according to the first embodiment.

FIG. 23 is a diagram showing states of the tasks of the respective PEs in Case 6 of the specific example of the multiprocessor system according to the first embodiment.

FIG. 25 is a diagram showing states of the tasks of the respective PEs in Case 7 of the specific example of the multiprocessor system according to the first embodiment.

DETAILED DESCRIPTION

Figure 1:
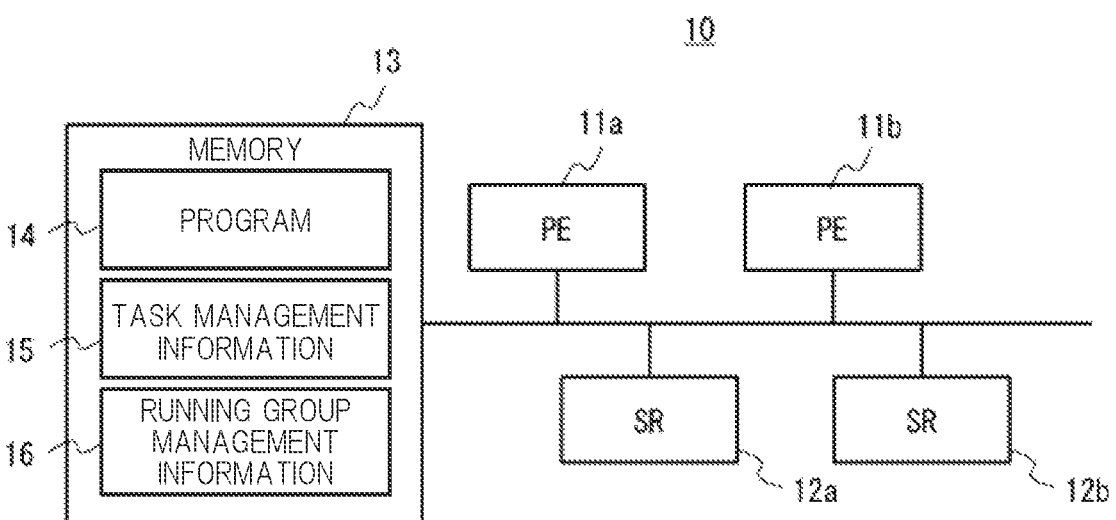
FIG. 1 is a configuration diagram showing an outline of a semiconductor device according to embodiments.

Hereinafter, a description will be given of embodiments with reference to the drawings. For clarifying the explanation, the following description and the drawings are omitted and simplified as appropriate. Moreover, the respective elements described in the drawings, the elements being functional blocks which perform a variety of processing, can be composed of a CPU, a memory and other circuits in terms of hardware, and can be achieved by programs loaded on the memory, and the like in terms of software. Hence, it is understood by those skilled in the art that these functional blocks can be achieved in a variety of forms by only the hardware, only the software, or combinations of these. The functional blocks are not limited to any of the above. Note that the same reference numerals are assigned to the same elements throughout the drawings and duplicated explanations are omitted as required.

Study on Related Art

In recent years, computerization of in-vehicle systems has progressed, and nowadays, one vehicle has a system mounted thereon, the system incorporating software with a numerous number of rows therein. A software developer for the in-vehicle systems is required to develop, in a short period, large-scale software incorporated in each of the in-vehicle systems. In order to develop the large-scale software in a short delivery time, desired are a technology for improving diversity of the software and a technology for facilitating the development of the software.

Meanwhile, an operation frequency of a CPU has reached a limit thereof due to problems of leakage current and reliability, and as an alternative method, taken are measures for improving performance by concurrently executing the software by a multiprocessor system in which two or more CPUs are mounted on one semiconductor chip.

Development of software for the multiprocessor system has a challenge that an exclusive control for a shared resource among processors must be performed in an application program. Therefore, the development of the software for the multiprocessor system is more complex and difficult than development of software for a single processor system.

As an exclusive control method for the shared resource in the multiprocessor system, a lock method of acquiring and releasing a lock of the shared resource is known. The lock method includes a spin lock method and a sleep lock method. The spin lock method is a method in which busy waiting continues until a task acquires a lock, and an access is continuously made to a lock variable for acquiring and releasing the lock. Moreover, the sleep lock method is a method in which a task is caused to sleep when the task cannot acquire a lock, and when the lock is released, the task is awakened to acquire the lock. In the spin lock method, the processor is wasted while the processor is in the busy waiting, and in the sleep lock method, a processor execution time is required at a time of sleep and a time of awakening.

For this, in Patent Document 1 described above, the waste of the CPU is prevented by switching between waiting by the spin lock method and waiting by the sleep lock method based on a holding period while the lock of the shared resource is held by the task.

However, in the related art such as Patent Document 1, the diversity of the software is not taken into consideration. The diversity of the software, which is mentioned herein, refers to a case where software working on the single processor system is directly used for the multiprocessor system. In a general multiprocessor system, in the case of operating the shared resource among the processors during process processing, processing for acquiring the lock must be added to the program of the process. Likewise, processing for releasing the lock must also be added after the operation of the shared resource among the processors is completed. Moreover, also assumed is a case (nest lock) of performing such a lock acquisition for another shared resource during a period of acquiring a lock for a certain shared resource. The nest lock has a risk to generate a malfunction such as a deadlock and a livelock, which is inherent in a multiprocessor. Therefore, it is not easy to add lock acquisition processing and lock release processing to a process (task).

Outline of Embodiments

FIG. 1 shows a schematic configuration of a semiconductor device according to embodiments. A semiconductor device 10 according to the embodiments constitutes a multiprocessor system. As shown in FIG. 1, the semiconductor device 10 includes: a first processor element (PE) 11a and a second processor element (PE) 11b; a first shared resource (SR) 12a and a second shared resource (SR) 12b; and a memory 13. The memory 13 stores a program 14, task management information 15, and running group management information 16. The program 14 includes an operating system (OS) and an application program.

The first PE 11a and the second PE 11b are execution units which work individually of each other and are capable of executing tasks concurrently with each other. Each of the tasks is a unit of predetermined processing included in the application program. For example, one task is executable in one PE. Note that the program may be executed with not only the task but also a process or a thread taken as a unit. The first PE 11a and the second PE 11b execute processing of the tasks according to the application program stored in the memory 13.

The first shared resource 12a and the second shared resource 12b are accessible individually from the first PE 11a and the second PE 11b. That is, the first shared resource 12a and the second shared resource 12b are accessible from the tasks executed individually in the first PE 11a and the second PE 11b. The first shared resource 12a and the second shared resource 12b are shared memories and the like. The first shared resource 12a and the second shared resource 12b are not limited to the memories, and include other storage means and network resources, other system resources, and the like. The first shared resource 12a and the second shared resource 12b are accessible simultaneously from a plurality of tasks on the first PE 11a and the second PE 11b, and accesses thereto conflict with one another, and accordingly, an exclusive control is required for the same.

The task management information 15 is information in which the task executed in the first PE 11a or the second PE 11b and group identification information for identifying a group corresponding to the first shared resource 12a or the second shared resource 12b are associated with each other. That is, the respective tasks are grouped for each of the shared resources accessed thereby. The running group management information 16 is information indicating, for each group, whether or not each task associated with the group identification information of the group is executed in the first PE 11a or the second PE 11b.

The first PE 11a or the second PE 11b executes the program 14 that is an operating system, thereby achieving a function to schedule the task executed in the first PE 11a or the second PE 11b. Specifically, the first PE 11a or the second PE 11b executes the program 14, thereby referring to the running group management information 16 to specify, as an executable group, a group of such tasks executable in the first PE 11a or the second PE 11b. The first PE 11a or the second PE 11b refers to the task management information 15, and determines each task associated with the group identification information of the specified executable group as a task to be executed next. For example, the first PE 11a or the second PE 11b refers to the running group management information 16, and specifies, as the executable group, a group in which the task associated with the group identification information of the group is not executed in the first PE 11a or the second PE 11b.

As described above, in the embodiments, in the semiconductor device that constitutes the multiprocessor system, the tasks are associated with the groups of the shared resources, execution states of the tasks which access the shared resource from any of the processors are managed for each group on the OS side, and the next task is scheduled based on such execution states of the tasks of each group. Thus, the exclusive control for the shared resources accessed from the tasks is achievable not by the application program side of the tasks but by the task scheduling on the OS side.

Hence, according to the embodiments, a software developer of the multiprocessor system does not have to take care of a resource conflict between the processors during task processing, and exclusive control processing that is complex is not required for the application program, and therefore, it can be made less difficult to develop the software. Moreover, it becomes possible to improve diversity of software already developed for a single processor system.

First Embodiment

Next, a multiprocessor system according to a first embodiment will be described. In the present embodiment, an exclusive control is performed for each group of tasks which access shared resources in a scheduling function of an OS.

System Configuration

Figure 2:
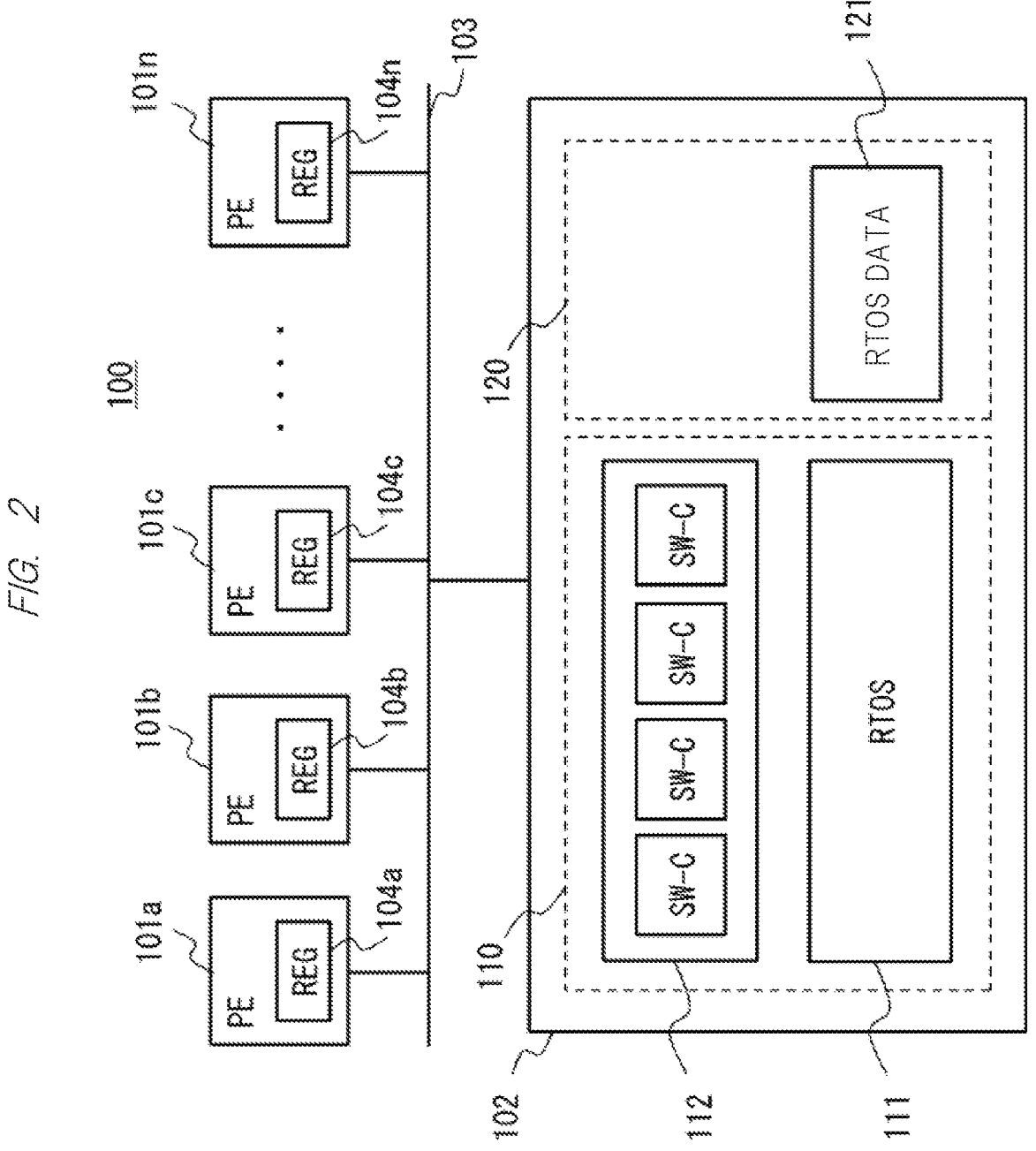
FIG. 2 is a configuration diagram showing a hardware configuration of a multiprocessor system according to a first embodiment.
Figure 3:
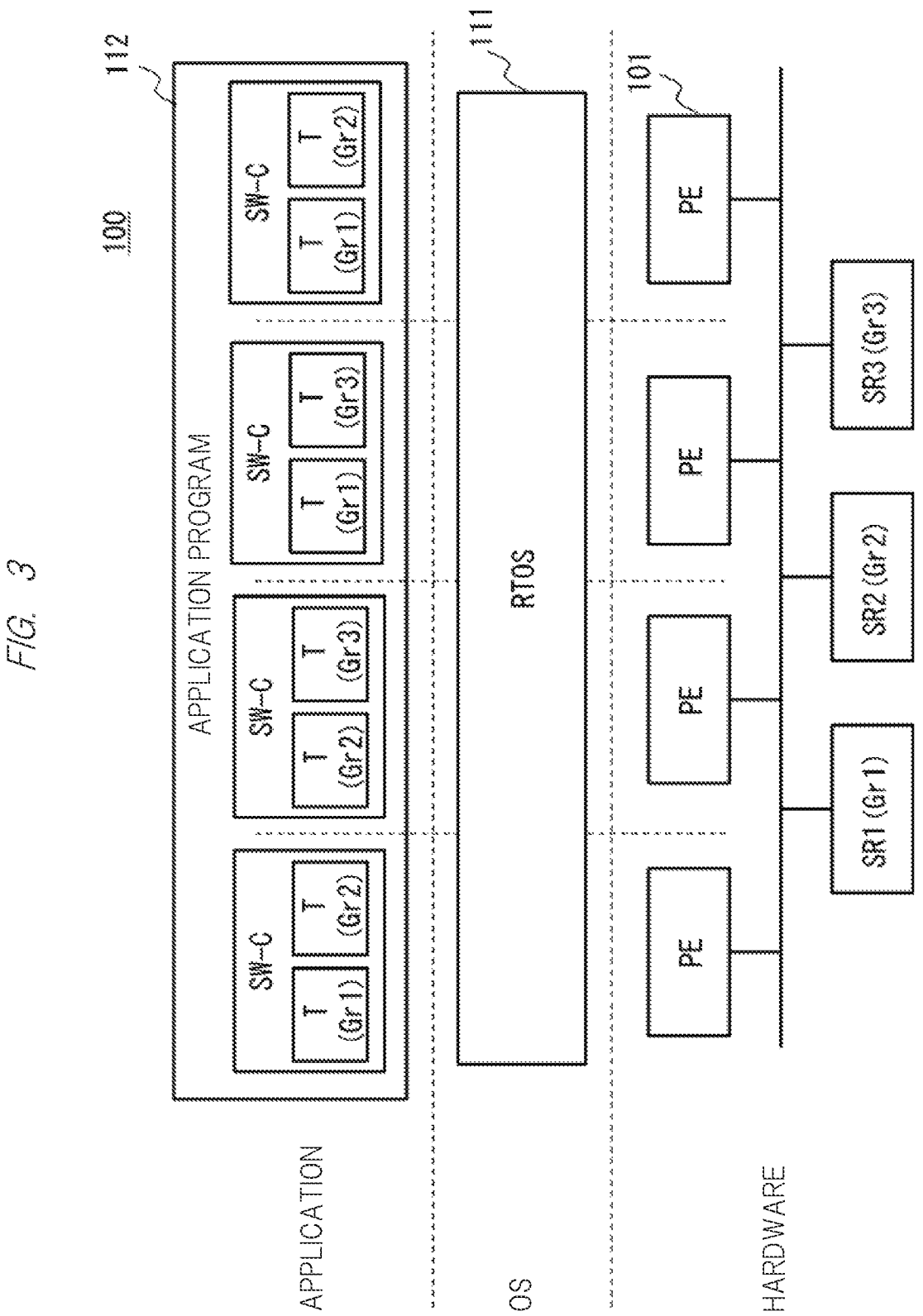
FIG. 3 is a configuration diagram showing a logical layer configuration of the multiprocessor system according to the first embodiment.

Next, a system configuration of the present embodiment will be described. FIG. 2 shows a hardware configuration of the multiprocessor system according to the present embodiment. FIG. 3 shows a logical layer configuration of the multiprocessor system according to the present embodiment. A multiprocessor system 100 according to the present embodiment is a microcomputer (semiconductor device) that implements a real time operating system (RTOS).

As shown in FIG. 2, the multiprocessor system 100 includes a plurality of PEs 101 (for example, PEs 101a to 101n) and a memory 102. The PEs 101a to 101n and the memory 102 are connected to each other via a bus 103. The PEs 101a to 101n are capable of accessing the memory 102 via the bus 103.

Each of the PEs 101 is a computing device that includes a CPU core and executes a program. The PE 101 reads out programs such as an OS and an application program from the memory 102, and executes the readout programs, thereby achieving each function of the programs. The PEs 101a to 101n include registers (REGs) 104a to 104n for use in processing the programs to be executed, respectively.

The memory 102 is a storage device that stores the programs and data, which are used by the PEs 101. The memory 102 is a non-volatile memory such as a flash memory or a volatile memory such as a static random access memory (SRAM) and a dynamic random access memory (DRAM).

The memory 102 includes a program area 110 and a data area 120. The program area 110 is an area for storing the programs executable by the PEs 101. The data area 120 is an area for storing data necessary to process the programs.

The program area 110 stores therein an RTOS 111, a user application program 112, and the like. The RTOS 111 is basic software directed to a real time system. Functions of the basic software include scheduling of tasks executed in the PEs 101, and the like. The RTOS 111 provides the application program with a system call for calling a variety of functions of the basic software.

As shown in FIG. 3, the RTOS 111 provides each of the PEs 101 of the multiprocessor system 100 with the functions of the basic software. That is, the RTOS 111 is read and executed by each PE 101, whereby the variety of functions such as scheduling in each PE 101 are achieved.

The user application program 112 is an application program developed by a user. The user application program 112 includes software components SW-Cs, each of which serves for each PE 101. Each of the software components SW-Cs includes tasks executed by each PE 101. The tasks are units of executing the processing of the program. Each of the tasks is started by calling the system call of the RTOS 111 from the software component SW-C, and is then executed.

As shown in FIG. 3, each software component SW-C of the user application program 112 works on each PE 101 via the function of the RTOS 111. The software component SW-C includes a plurality of the tasks (Ts) executed in the PE 101. The software component SW-C is read and executed in the corresponding PE 101, whereby a function of the task is achieved on the PE 101.

The data area 120 stores RTOS data 121 and the like. The RTOS data 121 is data required at the time when the RTOS 111 is executed. That is, the RTOS data 121 is referred to and updated by the PE 101 according to processing of the RTOS 111, which is executed in the PE 101. Besides, the data area 120 also includes application data required at the time when the user application program 112 is executed.

Moreover, the multiprocessor system 100 includes a plurality of shared resources SRs accessed from the tasks of the respective PEs 101. In the present embodiment, as shown in FIG. 3, the tasks which access the shared resources SRs are grouped for each of the shared resources SRs. For example, among the tasks executed in the respective PEs 101, tasks which access the shared resource SR1 are defined as tasks of Group 1 (Gr1). Moreover, tasks which access the shared resource SR2 are defined as tasks of Group 2 (Gr2). Further, tasks which access the shared resource SR3 are defined as tasks of Group 3 (Gr3). In the scheduling of the RTOS 111, an exclusive control for the tasks is performed for each of the groups corresponding to the shared resources SRs.

FIG. 4 shows a functional configuration of the RTOS and a data configuration of the RTOS data according to the present embodiment. As shown in FIG. 4, the RTOS data 121 includes task management information 230, schedule management information 240, and running group management information 250.

The task management information 230 is information for managing the tasks executed in the PEs 101. The task management information 230 is information assigned to the tasks in a one-to-one relationship. Each piece of the task management information 230 includes identification information of the task, a state of the task, a priority level of the task, which serves for the scheduling, and the like. Moreover, in order to manage the tasks of each of the groups of the shared resources SRs, the task management information 230 includes identification information of each of the groups of the shared resources SRs used by the tasks. The task management information 230 associates these pieces of information with the task.

The schedule management information 240 is information for managing the scheduling of the tasks in the PEs 101. The schedule management information 240 is information assigned to the PEs 101 in a one-to-one relationship. Each piece of the schedule management information 240 includes, for example, information on a task waiting to be executed, a highest task priority level, information on a running task, and the like. Moreover, in order to manage scheduling of each of the groups of the shared resources SRs, the schedule management information 240 includes a highest task priority level for each group.

The running group management information 250 is information for managing a group of tasks running in the multiprocessor system 100. The running group management information 250 is sole information assigned to the multiprocessor system 100. The running group management information 250 includes information indicating whether or not there is a running task for each group in the multiprocessor system 100.

An RTOS function 111*a* achieved by execution of the RTOS 111 by each of the PEs 101 includes a task management control unit 210 and a schedule management control unit 220. The task management control unit 210 manages and controls the state of each of the tasks in the PEs 101. The task management control unit 210 refers to and updates the task management information 230, the schedule management information 240 of the PE 101 as an execution target, and the running group management information 250 of the group to which each task belongs, and manages the state of each task. The task management control unit 210 is called from the user application program 112 (the software component), and controls the operation of the task according to such a call. The task management control unit 210 receives a task start request or a task stop request from the user application program 112, and stores the state of the task and register information of the task in the task management information 230.

Moreover, the task management control unit 210 can also be said to manage an execution state of each of the tasks for each group of the shared resource SR. For example, among the tasks executed in the respective PEs 101, the task management control unit 210 manages an execution state of each task of Group 1, which accesses the shared resource SR1, and an execution state of each task of Group 2, which accesses the shared resource SR2. The task management control unit 210 refers to and updates the running group management information 250, thereby managing whether or not the task of each group is running in any of the PEs 101. For example, the task management control unit 210 manages whether or not the task of Group 1, which accesses the shared resource SR1, is executed in any of the respective PEs 101, and manages whether or not the task of Group 2 that accesses the shared resource SR2 is executed in any of the respective PEs 101.

The schedule management control unit 220 manages and controls the schedule of the task in each of the PEs 101. The schedule management control unit 220 refers to and updates the task management information 230, the schedule management information 240 of the PE as an execution target, and the running group management information 250 of the group to which the task belongs, and schedules the task. The schedule management control unit 220 is called from the task management control unit 210, receives the schedule management information 240 and the running group management information 250, and specifies the task to be started next.

Moreover, based on the execution states of the tasks for each of the groups, the schedule management control unit 220 determines the task of each group, which is to be executed next. For example, based on the execution state of the task of Group 1, which accesses the shared resource SR1, the schedule management control unit 220 determines the task of Group 1, which is to be executed next in each of the PEs 101. Moreover, based on the execution state of the task of Group 2, which accesses the shared resource SR2, the schedule management control unit 220 determines the task of Group 2, which is to be executed next in each of the PEs 101. At the time of scheduling a task belonging to a group, when the task of the group is not running in any of the PEs 101, the schedule management control unit 220 schedules a task, which is scheduled to be executed next in the group, so that the task is executed in any of the PEs 101. When the task of the group is running in any of the PEs 101, the schedule management control unit 220 suspends the execution of the task scheduled to be executed next in the group (that is, the task is a candidate to be started).

Moreover, the schedule management control unit 220 schedules a task with a highest priority level among such tasks scheduled to be executed next so that the task with the highest priority level is executed. That is, based on the execution state of the tasks for each group and based on such priority levels of the tasks of each group, the schedule management control unit 220 schedules the task of each group, which is to be executed next. For example, based on the execution states of the tasks of Group 1 and based on the priority levels of the tasks of Group 1, the schedule management control unit 220 determines the task of Group 1, which is to be executed next in each PE101. Moreover, based on the execution states of the tasks of Group 2 and based on the priority levels of the tasks of Group 2, the schedule management control unit 220 determines the task of Group 2, which is to be executed next in each PE101. At the time of scheduling the tasks belonging to the group, the schedule management control unit 220 determines whether or not the tasks of the group are running in all the PEs 101. When the tasks of the group are not running in any of the PEs 101, the schedule management control unit 220 schedules a task, which has a highest priority level among the tasks scheduled to be executed next in the group, so that the task is executed in the PE 101. Note that, in the case where such a group is not set for the tasks (this case is called non-group), the tasks are scheduled based on only priority levels thereof.

Figure 5:
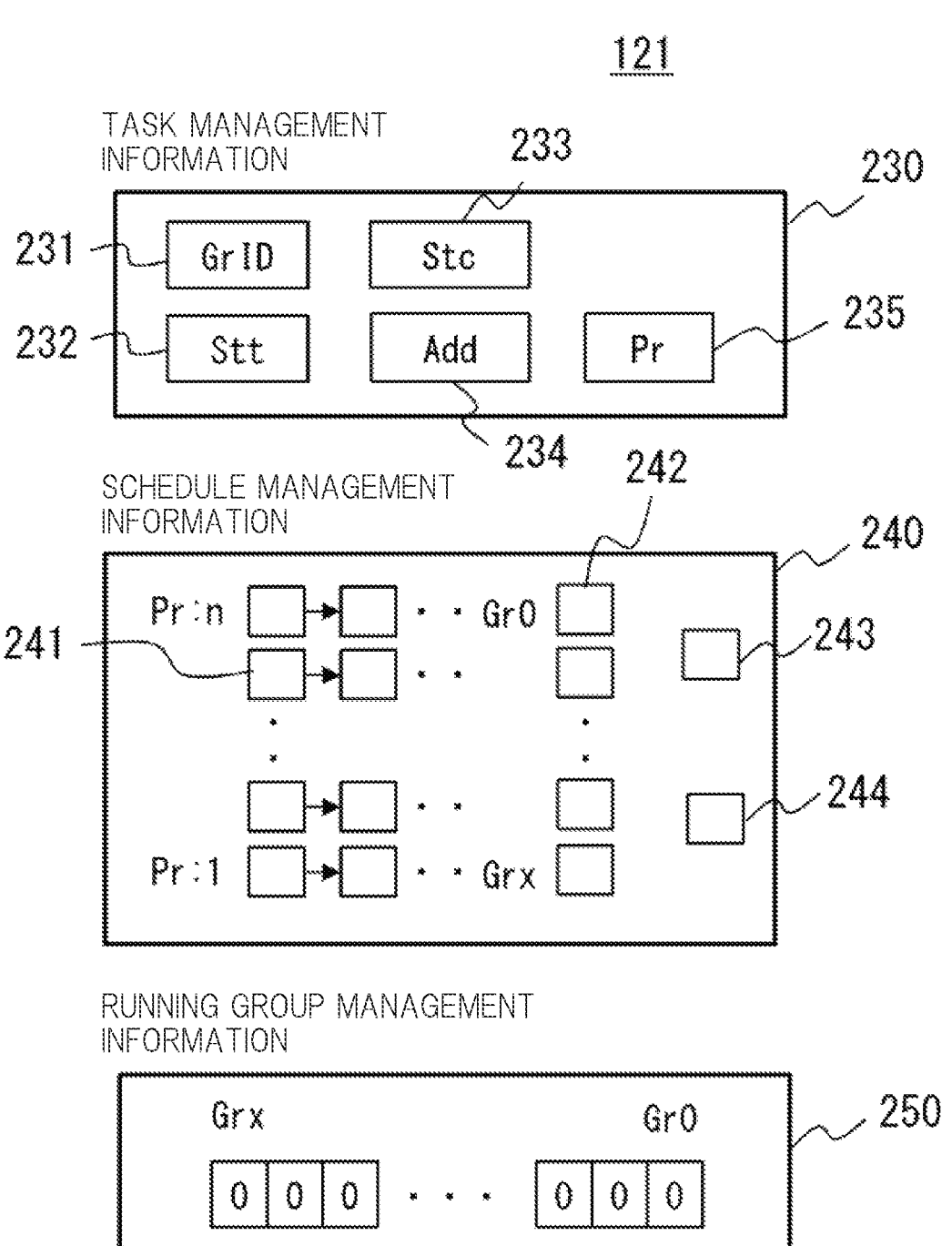
FIG. 5 is a configuration diagram showing the configuration of the RTOS data according to the first embodiment.

FIG. 5 shows configurations of the respective pieces of information included in the RTOS data according to the present embodiment. As shown in FIG. 5, the task management information 230 includes a task group ID (GrID) 231, a task state (Stt) 232, task stack information (Stc) 233, a task start address (Add) 234, and a task priority level (Pr) 235.

The task group ID 231 is identification information for identifying the group to which the task belongs (that is, the group is a shared resource accessed by the task). For example, when the number of groups (shared resources) is x+1, the group IDs become 0 to x. x is an arbitrary value, and is determined at the time when a user makes initial setting for the RTOS.

The task state 232 is information indicating a task state. To the task state 232, for example, a bitmap value corresponding to the task state is set. To the task state 232, any of a Running state, a Suspended state, a Ready state and a Terminated state is set. The Running state is a state in which the task is executed (is running) on the PE 101. The Suspended state is a state in which the task is not executed (is not required to be executed) on the PE 101. The Ready state is a state in which the task is ready to be executable on the PE 101. The Terminated state is a state in which the task is not ready to be executable on the PE 101.

The task stack information 233 is a buffer for temporarily storing (stacking) a value of the register 104 for use at the time when the task works on the PE 101. The task start address 234 is information indicating a detail of an address of the user application program 112 read at the time when the PE 101 starts the processing for the task. The task priority level 235 is information indicating a value of the priority level of the task, which serves for the scheduling. For example, the task priority level 235 is any value from 1 to n. n is an arbitrary highest priority level value, and is generally determined at the time when the user makes initial setting for the RTOS. In the present embodiment, it is assumed that a priority level 1 is a lowest priority level, and that a priority level n is the highest priority level.

The schedule management information 240 includes ready task information 241, group highest priority level information 242, highest priority level information 243, and a running task ID 244. The ready task information 241 is a task ID of a task that turns to the Ready state for each priority level. For example, the ready task information 241 is stored in a structure array for each priority level. In the structure array, task IDs of such tasks in the Ready state, which have the same priority level, are connected to one another in order of turning to the Ready state. Each structure stores address information of a buffer (structure) that stores the task ID of the task in the Ready state and a task ID of a task in the next Ready state (that is, a task that is to turn to the Ready state next).

The group highest priority level information 242 is information indicating, for each group, a value of the highest priority level in the tasks in the Ready state. The group highest priority level information 242 is stored, for example, in an array of Group 0 to Group x. When no task in the Ready state is present in such a group of interest, 0 is stored in the group highest priority level information 242 of the group.

The highest priority level information 243 is information indicating a value of the highest priority level in the tasks in the Ready state in the PE 101. When no task in the Ready state is present in the PE 101, 0 is stored in the highest priority level information 243. The running task ID 244 is a task ID of the task in the Running state in the PE 101. When no task in the Running state is present, 0 is stored in the running task ID 244.

The running group management information 250 is information indicating the group to which the running task belongs, the running task running in any of the PEs 101 of the multiprocessor system 100. For example, the running group management information 250 is composed of a bit-map table in which bits are assigned to Group 0 to Group x one by one. 1 is set to a predetermined bit corresponding to a group among Group 0 to Group x, in which the task in the Running state is present on the multiprocessor system 100. 0 is set to a predetermined bit corresponding to a group among Group 0 to Group x, in which no task in the Running state is present on the multiprocessor system.

Figure 6:
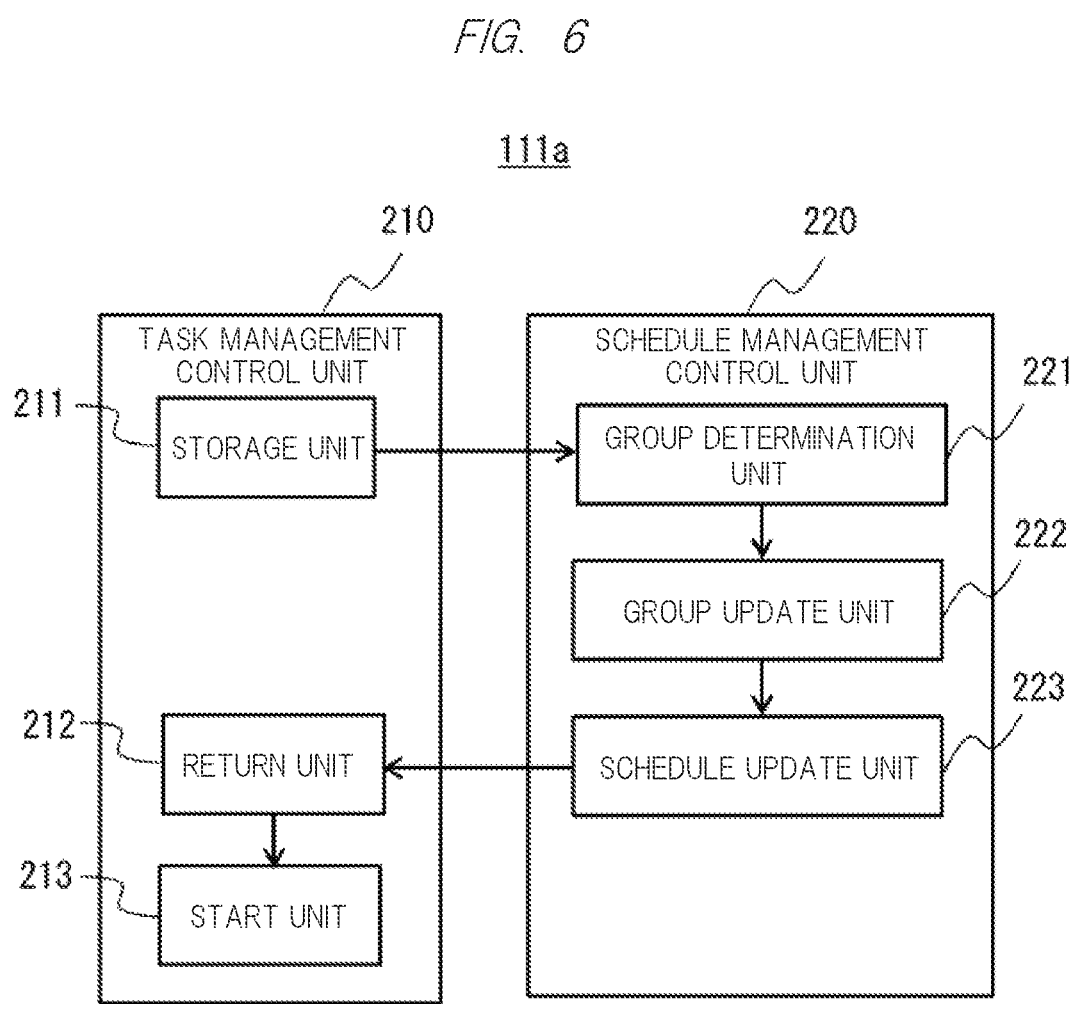

FIG. 6 shows configurations of the task management control unit 210 and the schedule management control unit 220, which are included in the RTOS function 111a according to the present embodiment. As shown in FIG. 6, the task management control unit 210 includes a storage unit 211, a return unit 212, and a start unit 213. The schedule management control unit 220 includes a group determination unit 221, a group update unit 222, and a schedule update unit 223.

The storage unit 211 is called from the user application program 112, and in the task management information 230, stores a state of a required task and information held in the register 104 of each of the PEs 101. Based on the task management information 230 that has made storage, the storage unit 211 updates the schedule management information 240 and the running group management information 250. Moreover, the storage unit 211 calls the group determination unit 221 of the schedule management control unit 220, and requests task scheduling.

According to a call from the storage unit 211, the group determination unit 221 determines a group of a task to be started next. Based on the running group management information 250 and the schedule management information 240, the group determination unit 221 determines a group of executable tasks as an executable group. The group determination unit 221 refers to the running group management information 250, and determines, as the executable group, a group in which the task is not executed in some of the PEs 101.

Based on the group of the tasks, which is determined by the group determination unit 221, the group update unit 222 updates the running group management information 250 of that group. Based on the schedule management information 240, the group update unit 222 determines a task ID of a task to be started next in the group. Since the schedule management information 240 is updated based on the task management information 230, the group update unit 222 may refer to the schedule management information 240 and the task management information 230, and may determine the task to be started next. The schedule management information 240 may refer to the task management information 230, and may determine a task, which is associated with the executable group, as the task to be started next in any of the PEs 101. Moreover, the schedule management information 240 may refer to the task management information 230, and may determine, as the task to be started next in any of the PEs 101, a task executable in any of the PEs 101 among such tasks associated with the executable group. Further, the schedule management information 240 may refer to the task management information 230, and may determine, as the task to be started next in any of the PEs 101, a task which is executable in any of the PEs 101 and has a highest priority level among such tasks associated with the executable group.

The schedule update unit 223 updates the schedule management information 240 based on the task ID acquired by the group update unit 222. Moreover, the schedule update unit 223 calls the return unit 212 of the task management control unit 210, and makes thereto a request to start the task.

According to the call from the schedule update unit 223, the return unit 212 returns information necessary for the requested start of the task. The return unit 212 returns information of a register, which is stored in the started task management information 230, to the register 104 of the PE 101. Based on the information returned by the return unit 212, the start unit 213 starts the task on the PE 101.

RTOS Initial Setting

Figure 7:
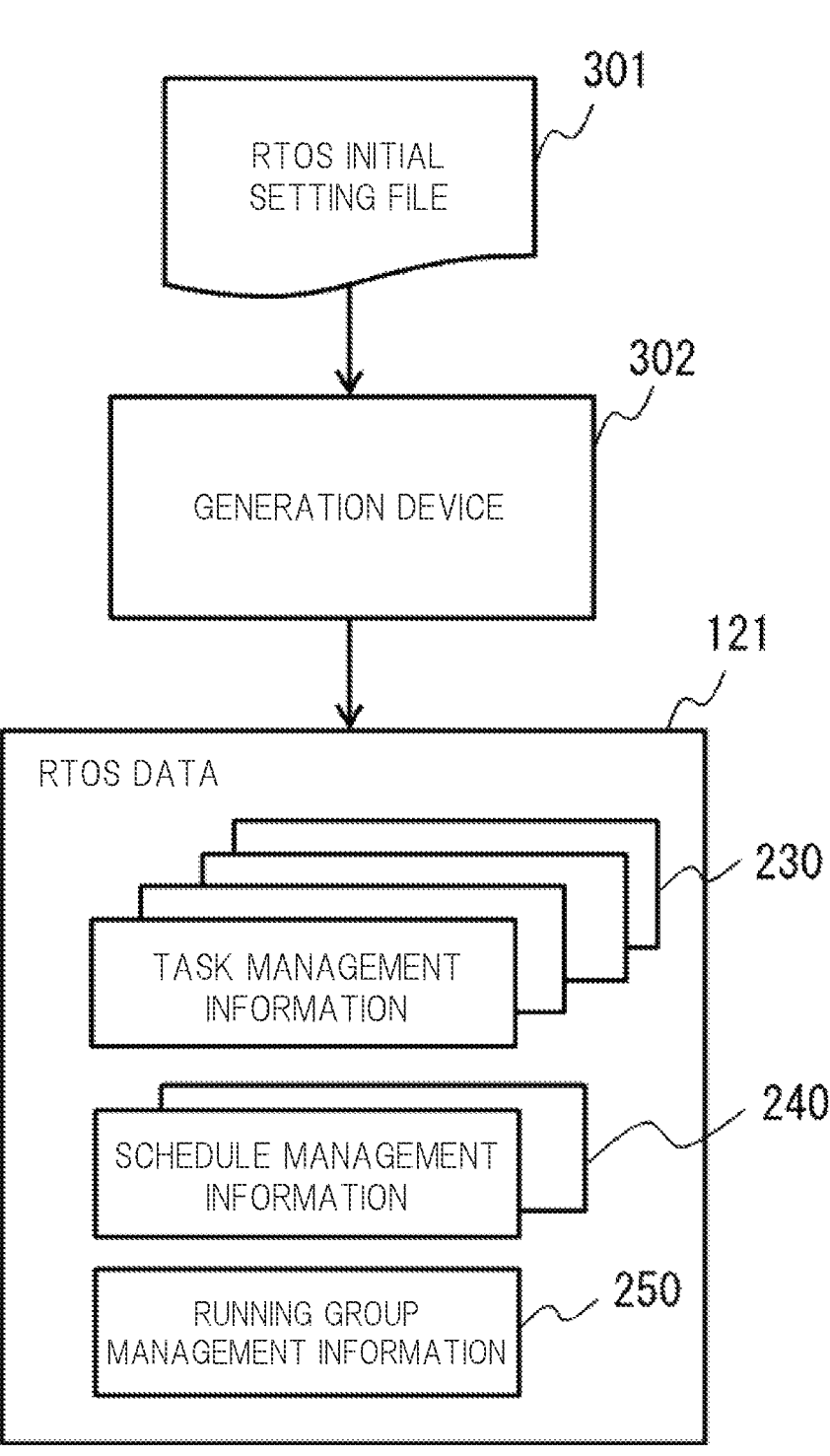
FIG. 7 is a diagram showing a method for generating the RTOS data according to the first embodiment.

Next, a description will be given of an initial setting method of the data of the present embodiment. FIG. 7 shows a configuration of generating the RTOS data according to the present embodiment. As shown in FIG. 7, the RTOS data 121 is generated and initially set in advance by a generation device 302 by using an RTOS initial setting file 301.

The RTOS initial setting file 301 is a configuration file generated by the user for initial setting of the RTOS. In the RTOS initial setting file 301, those set by the user are described, which are the priority level and group of each task, the highest priority level of such tasks, the number of groups of the tasks, and the like.

The generation device 302 is a configurator that generates the RTOS data 121 based on the RTOS initial setting file 301. The generation device 302 reads the RTOS initial setting file 301 set by the user, and generates and initially sets the RTOS data 121 based on the read RTOS initial setting file 301. Moreover, the generation device 302 is connected to the multiprocessor system 100 (semiconductor device), and writes the generated RTOS data 121 into the data area 120 of the memory 102 of the multiprocessor system 100.

The generation device 302 generates and initially sets the task management information 230, the schedule management information 240 and the running group management information 250, which are included in the RTOS data 121. The generation device 302 generates the task management information 230 whose number is equal to the number of tasks described in the RTOS initial setting file 301, and initially sets each piece of the task management information 230 based on a definition content of each task, which is thus described. For example, based on a definition of a group of each task described in the RTOS initial setting file 301, the generation device 302 sets the task group ID 231 of the task management information 230. Based on a definition of a priority level of each task described in the RTOS initial setting file 301, the generation device 302 sets the task priority level 235 of the task management information 230. Moreover, the generation device 302 sets the task state 232, the task stack information 233 and the task start address 234 in the task management information 230 to initial values thereof.

Moreover, the generation device 302 generates the schedule management information 240 whose number is equal to the number of processor elements described in the RTOS initial setting file 301, and initially sets each piece of the schedule management information 240 based on a definition content of each processor element, which is thus described. For example, based on a definition of the highest priority level of such tasks in the RTOS initial setting file 301, the generation device 302 generates the structure array of the ready task information 241 of the schedule management information 240, and sets an initial value (0) to the generated structure array. Based on a definition of the number of groups of the tasks in the RTOS initial setting file 301, the generation device 302 generates an array of the pieces of group highest priority level information 242 of the schedule management information 240, and sets an initial value (0) to the generated array. Moreover, the generation device 302 sets initial values to the highest priority level information 243 and the running task ID 244 in the schedule management information 240.

Moreover, the generation device 302 generates the running group management information 250, and initially sets the running group management information 250 based on the description of the RTOS initial setting file 301. For example, based on the definition of the number of groups of the tasks in the RTOS initial setting file 301, the generation device 302 generates a bitmap of the running group management information 250, and sets an initial value (0) to the generated bitmap.

System Operation

Figure 8:
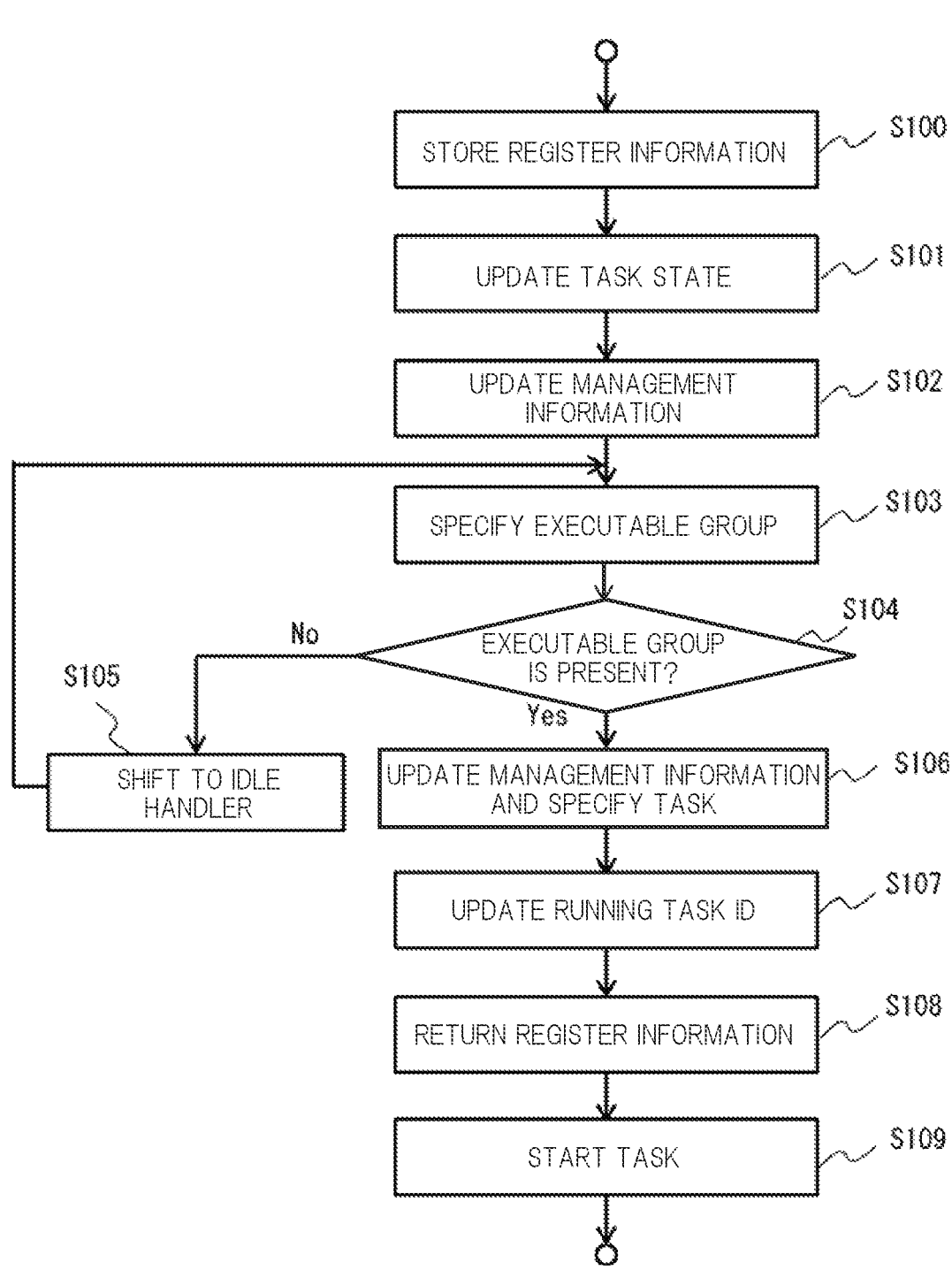
FIG. 8 is a flowchart showing a method for operating the multiprocessor system according to the first embodiment.

Next, a method for operating the system of the present embodiment will be described. FIG. 8 is a flowchart showing a method for operating the multiprocessor system according to the present embodiment.

As shown in FIG. 8, first, in S100, the task management control unit 210 stores the register information of the task. That is, upon being called from the user application program 112, the storage unit 211 acquires the information held in the register 104 of the PE 101, which is being used by the running task requested (for example, requested to be stopped) by the call. Moreover, the storage unit 211 stores the acquired information, which is held in the register 104, in the task stack information 233 in the task management information 230 of the task. The information of the register 104 that is being used by this task also includes a detail of an address to which the information returns when the processing for the task resumes.

Next, in S101, the task management control unit 210 updates the task state. That is, according to a request, the storage unit 211 updates the task state 232 in the task management information 230 of the requested running task from the running state (Running state) to another state (for example, Suspended state).

Next, in S102, according to the update of the task state, the task management control unit 210 updates the running group management information 250 and the schedule management information 240. When the processing by the storage unit 211 is called by the task stop request from the user application program 112, the storage unit 211 performs update processing as follows. That is, in the bitmap of the running group management information 250, the storage unit 211 sets to 0 and updates a bit corresponding to a group to which a task (requested task) that was running until immediately before. Moreover, the storage unit 211 deletes a task ID of the task, which was running until immediately before, from the ready task information 241 in the schedule management information 240 of the PE 101 in which the task was running until immediately before. Further, the storage unit 211 sets, to 0, the running task ID 244 in the schedule management information 240.

Meanwhile, when the storage unit 211 is called by the task start request from the user application program 112, the storage unit 211 performs registration processing as follows. That is, the storage unit 211 registers a task ID of a task, which is requested to be started, in the ready task information 241 in the schedule management information 240 of the PE 101 that executes the task requested to be started. The storage unit 211 refers to the task priority level 235 of the task in the task management information 230, and registers the task ID of the task, which is requested to be started, in the ready task information 241 of that priority level.

Moreover, in the case of the start request, the storage unit 211 refers to the highest priority level information 243 in the schedule management information 240, and compares the highest priority level information 243 with the task priority level 235 in the task management information 230 of the task requested to be started. When the task priority level 235 of the task is higher than the highest priority level information 243, the storage unit 211 updates a value of the highest priority level information 243 in the schedule management information 240 to a value of the task priority level 235 of the task requested to be started. Moreover, when the highest priority level information 243 and the task priority level 235 of the task are the same, or when the task priority level 235 of the task is lower than the highest priority level information 243, the storage unit 211 does not update the highest priority level information 243 in the schedule management information 240.

Further, in the case of the start request, the storage unit 211 refers to the group highest priority level information 242 in the schedule management information 240. By this reference, the storage unit 211 compares the group highest priority level information 242 of the group of the task requested to be started with the task priority level 235 in the task management information 230 of the task requested to be started. When the task priority level 235 is higher than the group highest priority level information 242, the storage unit

211 updates a value of the group highest priority level information 242 of the group of the task requested to be started to a value of the task priority level 235 of the task requested to be started. Moreover, when group highest priority level information 242 and the task priority level 235 are the same, or when the task priority level 235 is lower than the group highest priority level information 242, the storage unit 211 does not update the group highest priority level information 242.

Next, in S103, the schedule management control unit 220 specifies the group of the executable tasks as the executable group, and in S104, determines whether or not the executable group is present. That is, for example, upon being called from the storage unit 211 or an idle handler, the group determination unit 221 refers to the running group management information 250. By this reference, when any bit in the bitmap of the running group management information 250 is 0, the group determination unit 221 specifies a group corresponding to a position of the bit of 0. Further, the group determination unit 221 refers to the group highest priority level information 242 in the schedule management information 240 of the PE 101 that responds to the call. By this reference, the group determination unit 221 confirms a value of the highest priority level corresponding to the specified group.

When a value of the group highest priority level information 242 of the specified group is 0, such a task that belongs to the group and is ready to be executed is not present. Therefore, the group determination unit 221 refers to the running group management information 250 one more time, and searches for the position of the bit that is 0. Moreover, when all the bits of the running group management information 250 are 1, the group determination unit 221 determines in S104 that no executable group is present. Further, when all pieces of the group highest priority level information 242 of the group are 0, the group determination unit 221 determines in S104 that no executable group is present. In this case, the group determination unit 221 shifts the processing to S105. Moreover, when bits of the group of the running group management information 250 are 0, and when the value of the group highest priority level information 242 of the group is not 0, the group determination unit 221 determines in S104 that the executable group is present. That is, when no running task is present in the group, and when the task in the Ready state is present in the group, the group determination unit 221 determines in S104 that the executable group is present. In this case, the group determination unit 221 shifts the processing to S106.

In S105, the schedule management control unit 220 shifts the processing to the idle handler. That is, since no executable task is present, the group determination unit 221 shifts the processing to the idle handler. When the processing in the idle handler is completed, the processing returns to S103.

Moreover, in S106, the schedule management control unit 220 updates the running group management information, and specifies the task ID of the task to be started. That is, when it is determined that the executable group is present, the group update unit 222 refers to the determined schedule management information 240. By this reference, the group update unit 222 compares the group highest priority level information 242 of the group specified in S103 with the highest priority level information 243. When the group highest priority level information 242 and the highest priority level information 243 coincide with each other, the group update unit 222 sets, to 1, a bit in the bitmap of the running group management information 250, the bit corresponding to the group specified in S103.

Meanwhile, when the group highest priority level information 242 of the group specified in S103 and the highest priority level information 243 do not coincide with each other, the group update unit 222 performs the processing as follows. That is, the group update unit 222 refers to the task group ID 231 of the task management information 230 of the task, which corresponds to the highest priority level information 243, among the tasks of the ready task information 241 of the schedule management information 240. By this reference, the group update unit 222 determines whether or not the bit, which corresponds to the task group ID 231 of the task, in the bitmap of the running group management information 250 is 0. When the corresponding bit in the running group management information 250 is 0, the group update unit 222 sets the bit to 1. Moreover, when the bit corresponding to the running group management information 250 is already set to 1, the group update unit 222 refers to a group ID of a next task with the same priority level from the ready task information 241 of the schedule management information 240, and repeats the above-mentioned determination processing. When the reference to such task group IDs 231 of the tasks corresponding to the highest priority level information 243 is entirely ended, the group update unit 222 shifts such a reference destination to the ready task information 241 with a next priority level, and repeats the above-mentioned determination processing. Thereafter, the determination processing is repeated until values of the priority levels of the group highest priority level information 242 of the group specified in S103 and of the reference destination coincide with each other. The group update unit 222 repeats the present determination processing, and specifies the group of the task to be started next and the task ID of the task.

Next, in S107, the schedule management control unit 220 updates the running task ID by the specified task ID. That is, the schedule update unit 223 sets the task ID of the task that is specified in S106 and is to be started next to the running task ID 244 of the schedule management information 240. When the setting of the running task ID 244 is completed, the schedule update unit 223 calls the task management control unit 210, and shifts the processing to S108.

Next, in S108, the task management control unit 210 returns the register information of the task to the register of the PE. That is, upon being called from the schedule update unit 223, the return unit 212 refers to the task stack information 233 in the task management information 230 of the task specified in S106. By this reference, the return unit 212 returns the stored register information of the task to the register 104 of the PE 101 that executes the task.

Next, in S109, the task management control unit 210 starts the task. That is, when the register information is returned, the start unit 213 refers to the task start address 234 in the task management information 230 of the returned task, and starts the task by the PE 101.

Specific Example of System Operation

Figure 9:
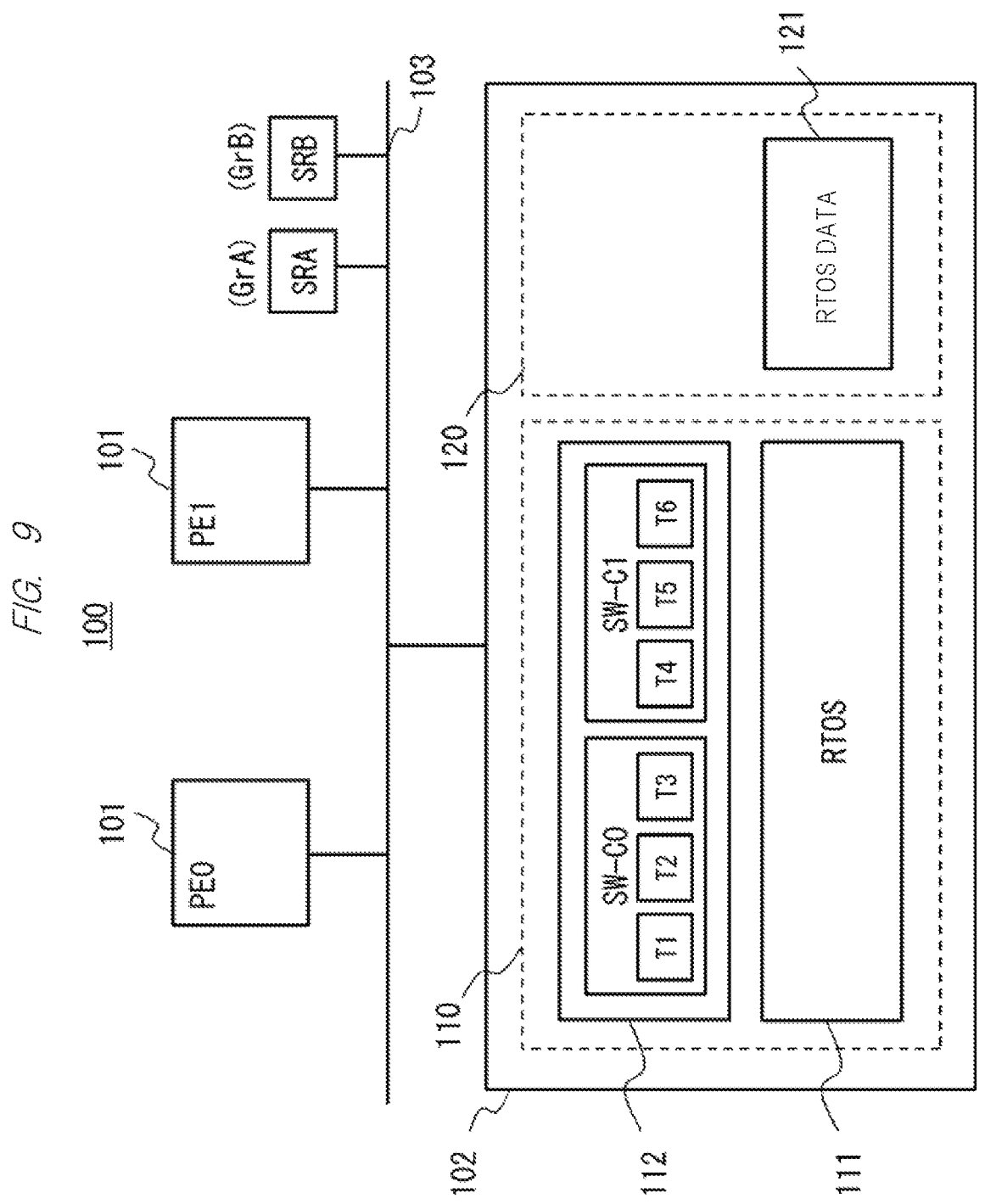
FIG. 9 is a system configuration diagram for a specific example of the multiprocessor system according to the first embodiment.

Next, a specific example of the method for operating the system of the present embodiment will be described. FIG. 9 shows a configuration of a multiprocessor system in the specific example.

As shown in FIG. 9, in the specific example, the multiprocessor system 100 includes a PE0 and a PE1, whose number is two, as the plurality of PEs 101. Moreover, the user application program 112 includes a software component SW-C0 executed in the PE0, and a software component SW-C1 executed in the PE1. The software component SW-C0 includes three tasks T1, T2 and T3 executed in the PE0. The software component SW-C1 includes three tasks T4, T5 and T6 executed in the PE1. Moreover, a group of tasks which access a shared resource SRA is defined as a group A (GrA), and a group of tasks which access a shared resource SRB is defined as a group B (GrB).

Figure 11:
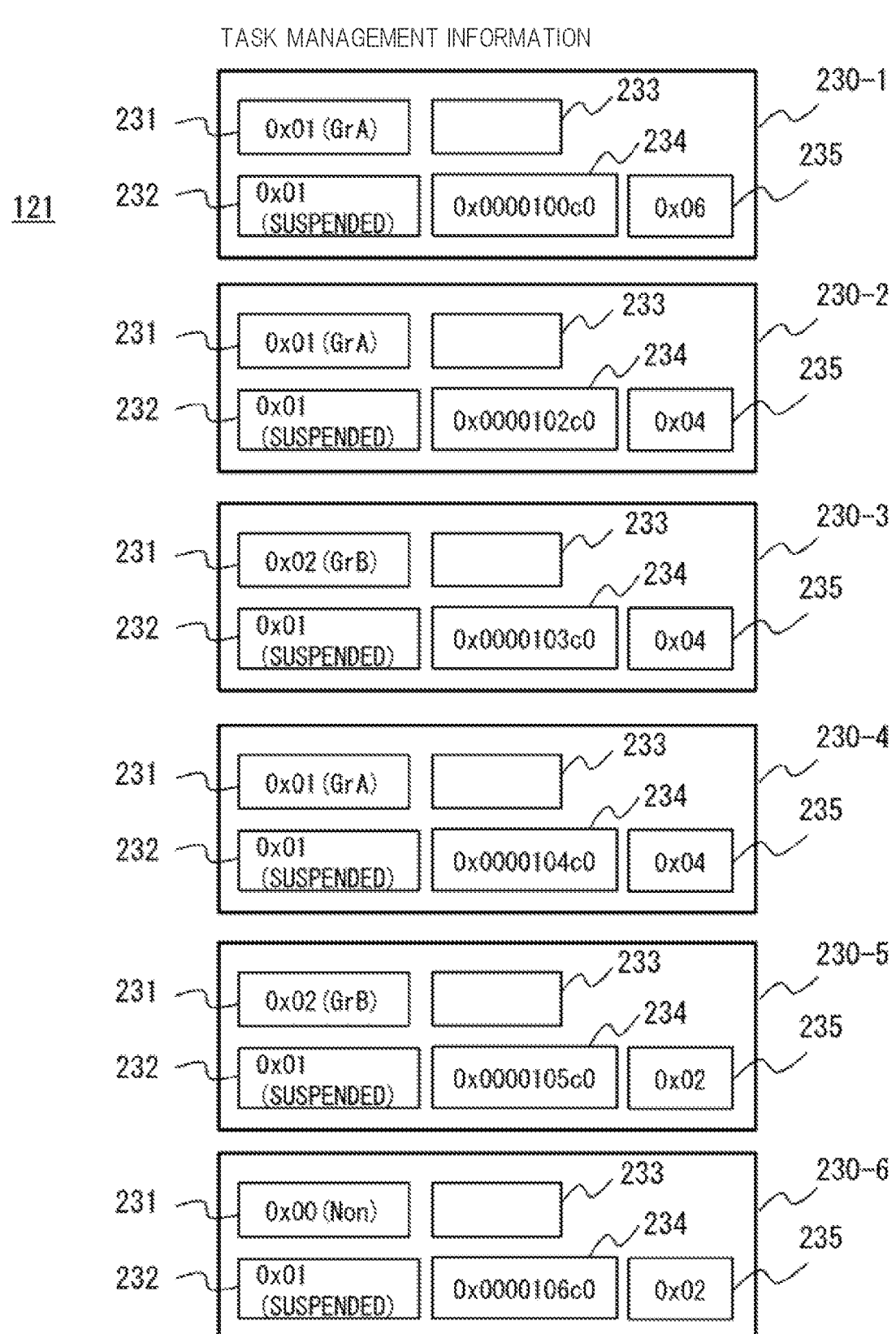
FIG. 11 is a diagram showing initial values of task management information for the specific example of the multiprocessor system according to the first embodiment.

FIG. 10 shows a description of an RTOS initial setting file in the specific example. FIG. 11 shows initial values of pieces of task management information generated from the RTOS initial setting file of FIG. 10. Initial setting values of the six tasks T1 to T6 of the specific example are generated by causing the generation device 302 to read the RTOS initial setting file 301.

As shown in FIG. 10, in the RTOS initial setting file 301, group names and priority levels of the respective tasks are described. In the specific example, in the task T1, the group A and a priority level 6 are defined. In the task T2, the group A and a priority level 4 are defined. In the task T3, the group B and the priority level 4 are defined. In the task T4, the group A and the priority level 4 are defined. In the task T5, the group B and a priority level 2 are defined. In the task T6, the priority level 2 is defined, and no group is defined (the group is none).

As shown in FIG. 11, the generation device 302 generates the pieces of task management information 230 of the respective tasks based on the definitions of the respective tasks of the RTOS initial setting file 301. In the specific example, based on the definitions of the tasks T1 to T6 of the RTOS initial setting file 301, the generation device 302 generates the pieces of task management information 230-1 to 230-6 of the task T1 to T6, and initially sets the respective pieces of information. Based on the definitions of the groups and priority levels of the tasks, the generation device 302 initially sets the task group IDs 231 and task priority levels 235 of the task management information 230. Moreover, the generation device 302 initializes each of the task states 232 to a Suspended state (1), and sets an address of the software component SW-C0 or SW-C1 to each of the task start addresses 234.

In the task management information 230-1 of the task T1, based on the definition of the task T1 of the RTOS initial setting file 301, an ID(1) indicating Group A is set to the task group ID 231, and 6 is set to the task priority level 235. In the task management information 230-2 of the task T2, based on the definition of the task T2 of the RTOS initial setting file 301, the ID(1) indicating Group A is set to the task group ID 231, and 4 is set to the task priority level 235. In the task management information 230-3 of the task T3, based on the definition of the task T3 of the RTOS initial setting file 301, an ID(2) indicating Group B is set to the task group ID 231, and 4 is set to the task priority level 235. In the task management information 230-4 of the task T4, based on the definition of the task T4 of the RTOS initial setting file 301, the ID(1) indicating Group A is set to the task group ID 231, and 4 is set to the task priority level 235. In the task management information 230-5 of the task T5, based on the definition of the task T5 of the RTOS initial setting file 301, the ID(2) indicating Group B is set to the task group ID 231, and 2 is set to the task priority level 235. In the task management information 230-6 of the task T6, based on the definition of the task T6 of the RTOS initial setting file 301, the ID(0) indicating such a non-group is set to the task group ID 231, and 2 is set to the task priority level 235.

Hereinafter, a flow of a state shift of the tasks T1 to T6 initially set as in FIG. 11 in the specific example will be described in order of the following cases.

Case 1: Initialization of RTOS is completed, all tasks are in Ready state

Case 2: Task T1 of Group A is in Running state on PE0 side

Figure 12:
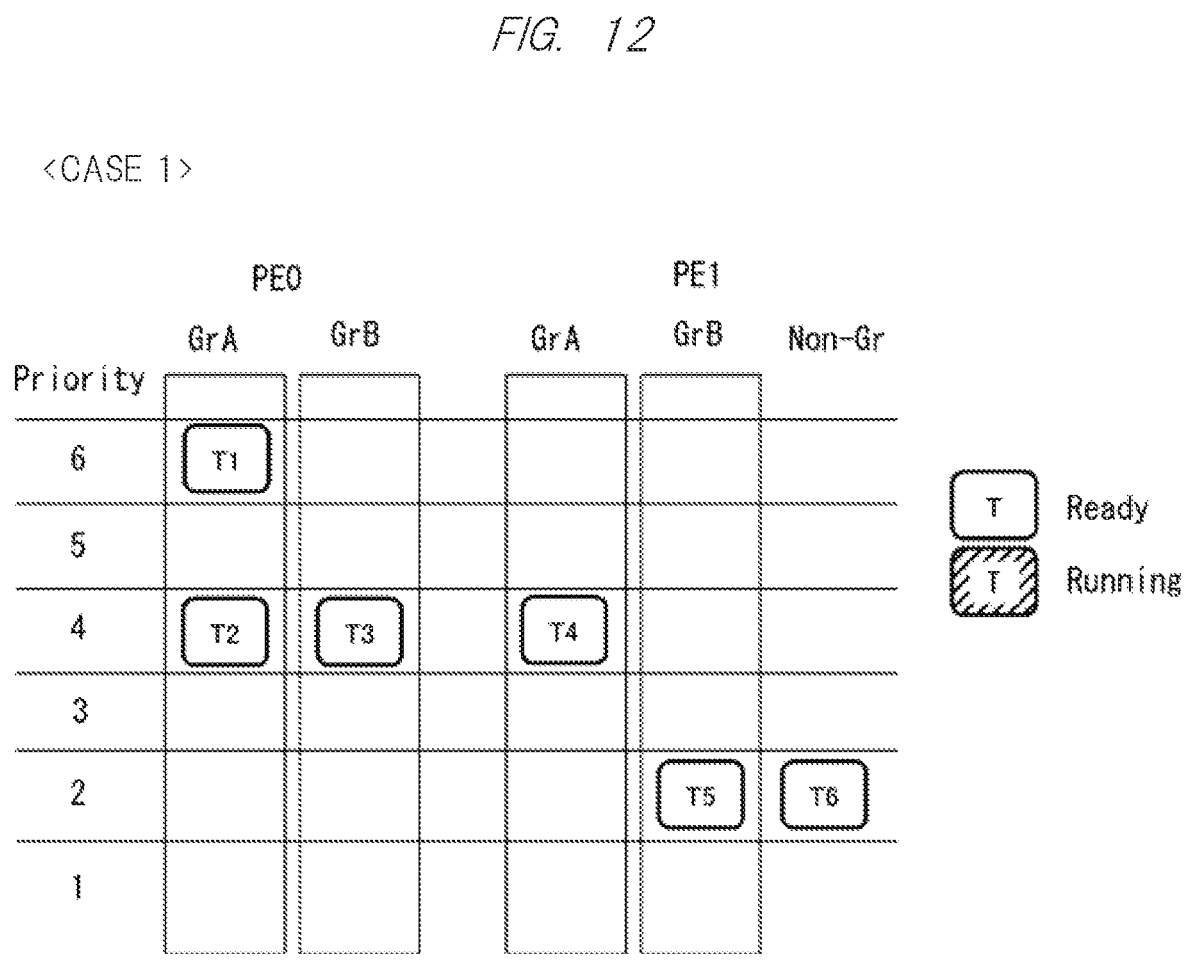
Figure 13:
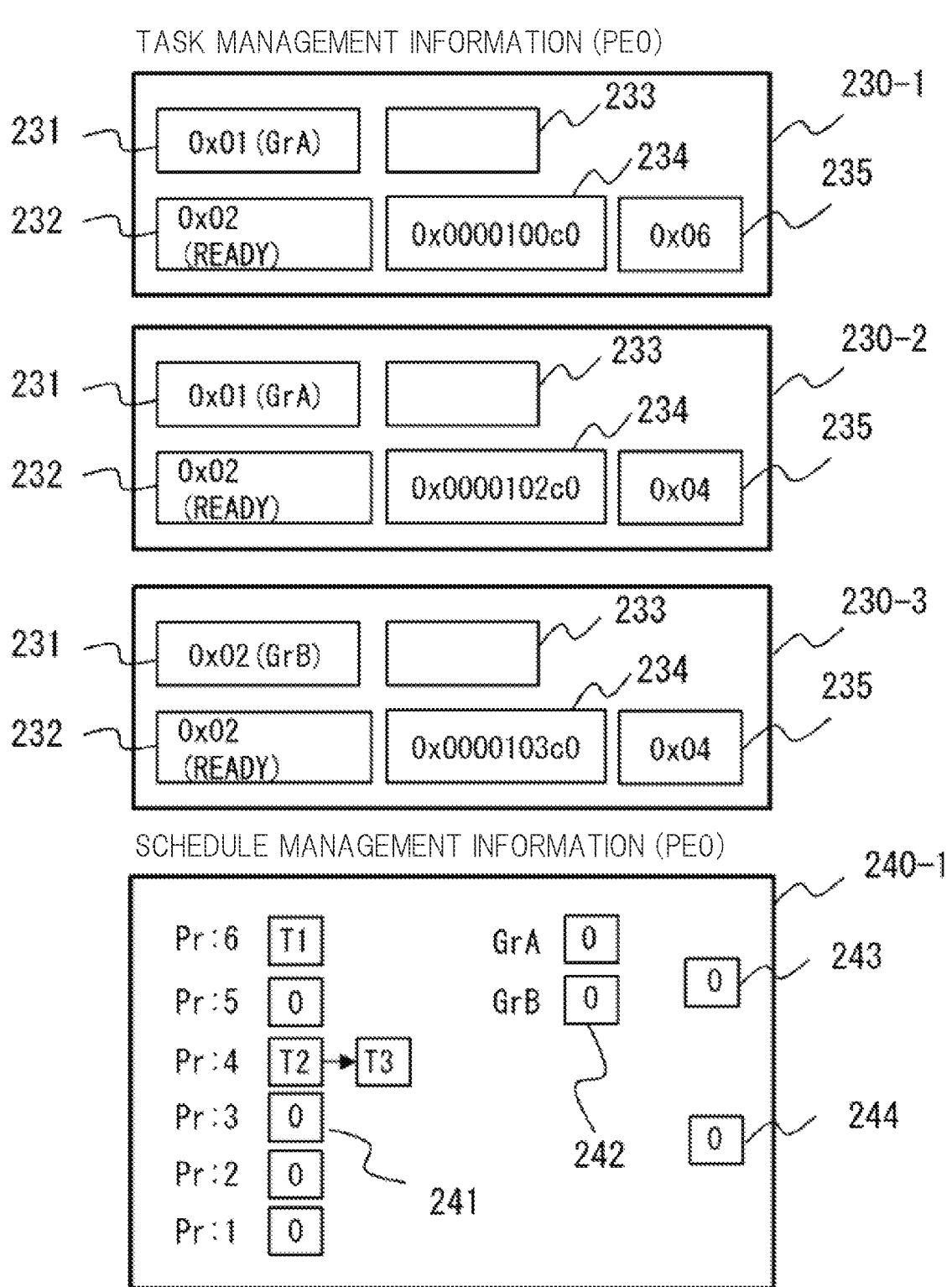
FIG. 13 is a diagram showing task management information and schedule management information of the PE0 in Case 1 of the specific example of the multiprocessor system according to the first embodiment.
Figure 14:
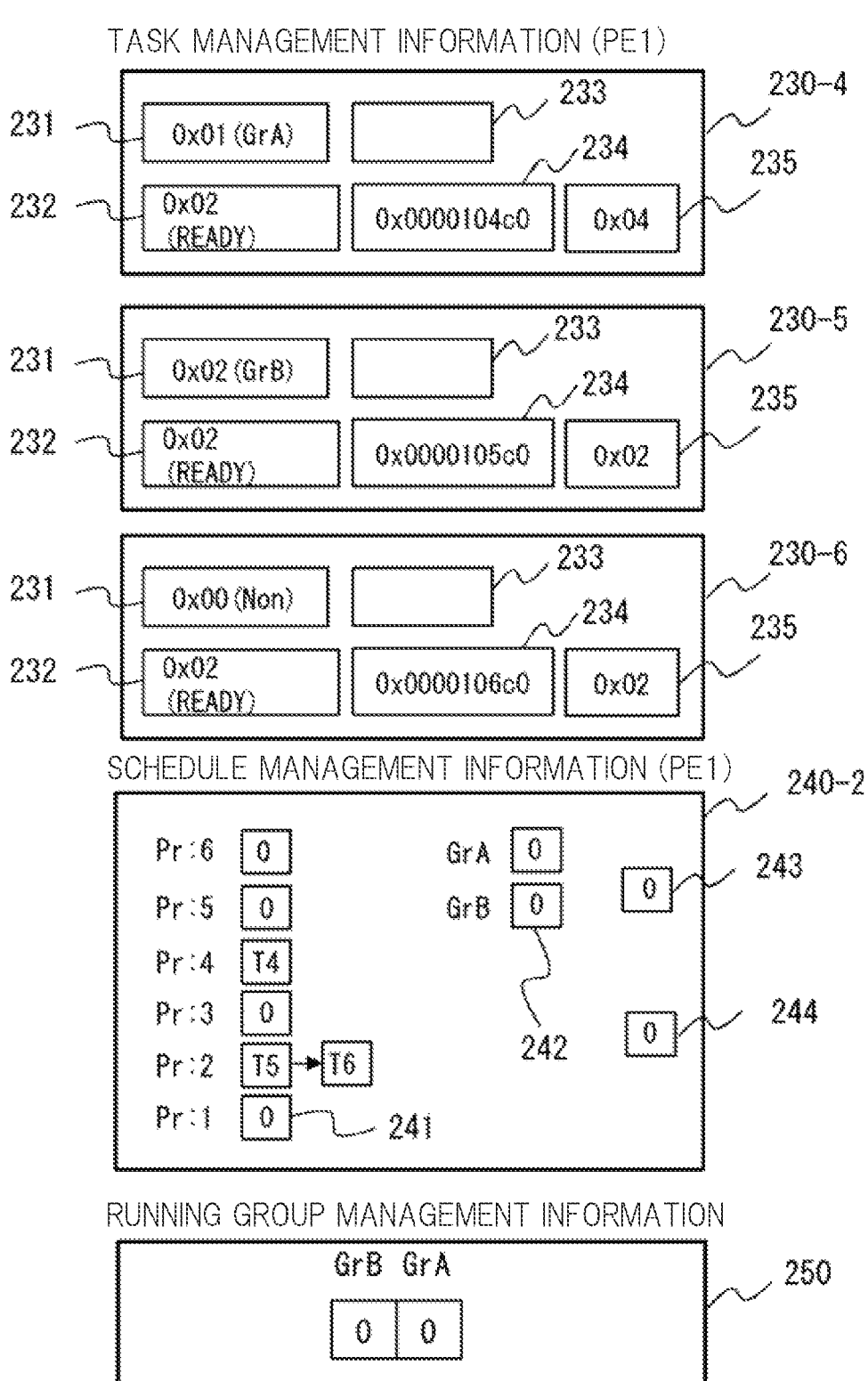
FIG. 14 is a diagram showing task management information and schedule management information of the PE1 and running group management information in Case 1 of the specific example of the multiprocessor system according to the first embodiment.

Case 3: Task T1 of Group A is in Running state on PE0 side, and Task T5 of Group B is in Running state on PE1 side Case 4: Task T2 of Group A is in Running state on PE0 side, and Task T5 of Group B is in Running state on PE1 side Case 5: Task T2 of Group A is in Running state on PE0 side, and Task T6 that does not belong to any group (belongs to no group) is in Running state on PE1 side Case 6: Task T2 of Group A is in Running state on PE0 side, and idle handler is running on PE1 side Case 7: Task T3 of Group B is in Running state on PE0 side, and Task T4 of Group A is in Running state on PE1 side Case 1: Initialization of RTOS is Completed, all Tasks are in Ready State FIG. 12 shows states of the tasks of the respective PEs in Case 1. FIGS. 13 and 14 show specific values of the respective pieces of task management information 230, respective pieces of schedule management information 240 and the running group management information 250 in Case 1.

As shown in FIG. 12, in Case 1, on the PE0 side, the task T1 (Group A, Priority level 6), the task T2 (Group A, Priority level 4) and the task T4 (Group B, Priority level 4) are in the Ready state. On the PE1 side, the task T4 (Group A, Priority level 4), the task T5 (Group B, Priority level 2) and the task T6 (Non-group, Priority level 2) are in the Ready state.

Specifically, as shown in FIG. 13, on the PE0 side, the task states 232 in the pieces of task management information 230-1 to 230-3 of the tasks T1 to T3 turn to a Ready state (2). In the schedule management information 240-1 of the PE0, the task T1 is registered in the ready task information 241 with the priority level 6. Moreover, the tasks T2 and T3 are registered in the ready task information 241 with the priority level 4. As shown in FIG. 14, on the PE1 side, the task states 232 in the pieces of task management information 230-4 to 230-6 of the tasks T4 to T6 turn to the Ready state (2). In the schedule management information 240-2 of the PE1, the task T4 is registered in the ready task information 241 with the priority level 4. Moreover, the tasks T5 and T6 are registered in the ready task information 241 with the priority level 2. Moreover, as shown in FIG. 14, in the running group management information 250, the bits of Group A and Group B are 0.

In this example, first, in the state of Case 1, the schedule management control unit 220 refers to the ready task information 241 of the schedule management information 240-1 in the PE0, and selects the task T1 with the priority level 6, which is the highest, as a candidate for the task to be started. Next, the schedule management control unit 220 refers to the task management information 230-1 of the selected task T1, and acquires the task group ID 231 (Group A). Next, the schedule management control unit 220 refers to the running group management information 250, and confirms the value of the bit corresponding to Group A to which the task T1 belongs. In Case 1, since the bit of Group A is 0, the schedule management control unit 220 determines the task T1 as the task to be started next, and shifts to the state of Case 2.

Case 2: Task T1 of Group A is in Running State on PE0 Side

Figure 15:
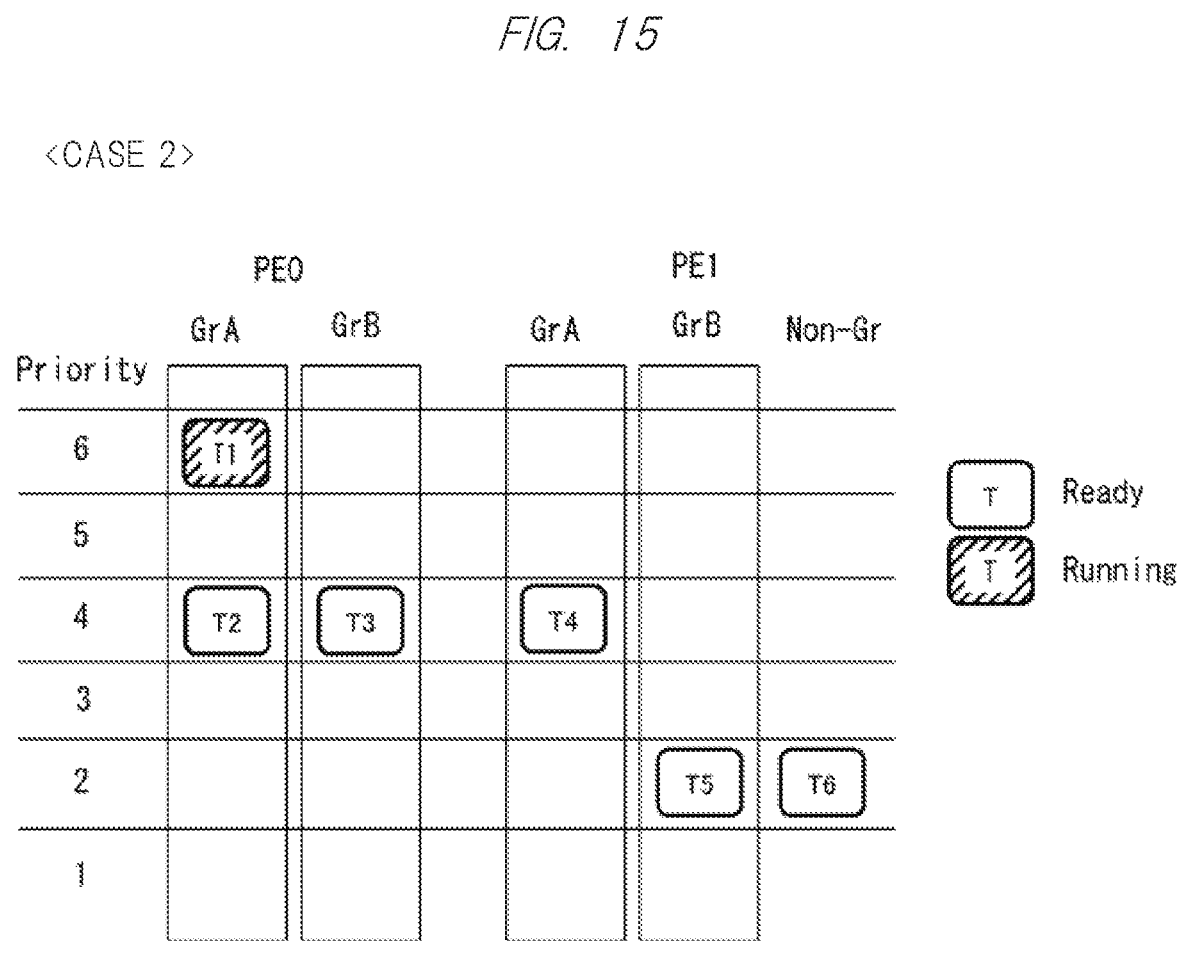
Figure 16:
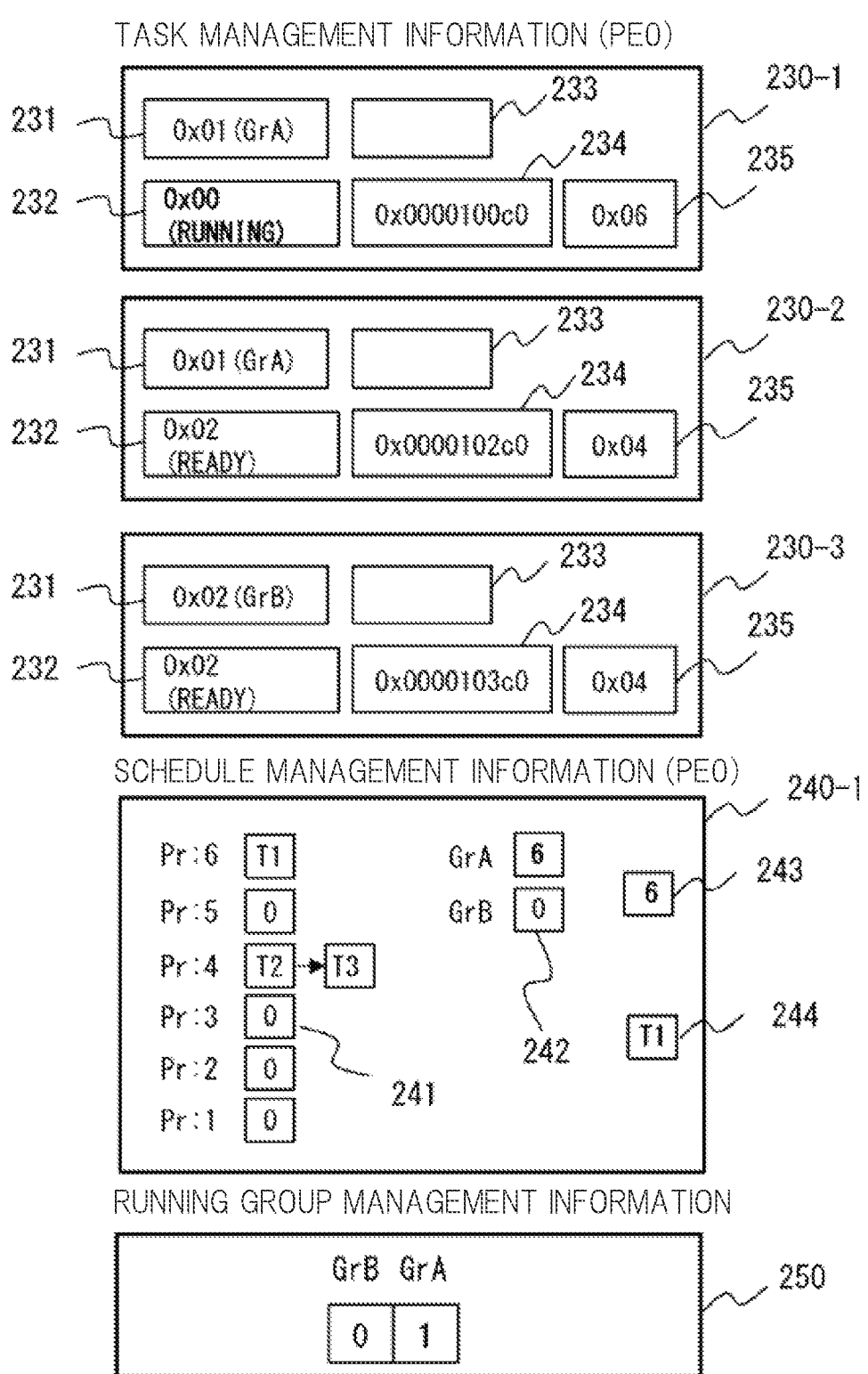
FIG. 16 is a diagram showing task management information and schedule management information of the PE0 and running group management information in Case 2 of the specific example of the multiprocessor system according to the first embodiment.

FIG. 15 shows states of the tasks of the respective PEs in Case 2. FIG. 16 shows specific values of the respective pieces of task management information 230 of the PE0, the schedule management information 240 thereof and the running group management information 250 in Case 2. The pieces of task management information 230 of the PE1 and the schedule management information 240 thereof in Case 2 are the same as those in Case 1. As shown in FIG. 15, in Case 2, the task T1 (Group A, Priority level 6) on the PE0 side turns to the Running state from the state of Case 1.

Specifically, upon determining the task T1 as the task to be started next as described above, the schedule management control unit 220 updates the task state 232 of the task management information 230-1 of the task T1 from the Ready state to the Running state as shown in FIG. 16. Moreover, as shown in FIG. 16, the schedule management control unit 220 sets, to 1, the bit of Group A of the running group management information 250. Further, as shown in FIG. 16, the schedule management control unit 220 sets the priority level 6 of the task T1 to the highest priority level information 243 in the schedule management information 240-1 of the PE0 and the group highest priority level information 242 of Group A therein. Moreover, the schedule management control unit 220 sets the task T1 to the running task ID 244.

In this example, in the state of Case 2, the schedule management control unit 220 refers to the ready task information 241 of the schedule management information 240-2 in the PE1, and selects the task T4 with the priority level 4, which is the highest, as a candidate for the task to be started. Next, the schedule management control unit 220 refers to the task management information 230-4 of the task T4, and acquires the task group ID 231 (Group A). Next, the schedule management control unit 220 refers to the running group management information 250, and confirms the value of the bit corresponding to Group A to which the task T4 belongs. In Case 2, since the bit of Group A is 1, the schedule management control unit 220 determines the task T4 as a task that cannot be started.

Next, the schedule management control unit 220 refers to the ready task information 241 of the schedule management information 240-2, and selects the task T5 with the priority level 2, which is the second highest after that of the task T4, as a candidate for the task to be started. Next, the schedule management control unit 220 refers to the task management information 230-5 of the task T5, and acquires the task group ID 231 (Group B). Next, the schedule management control unit 220 refers to the running group management information 250, and confirms the value of the bit corresponding to Group B to which the task T5 belongs. In Case 2, since the bit of Group B is 0, the schedule management control unit 220 determines the task T5 as the task to be started next, and shifts to the state of Case 3.

Figure 17:
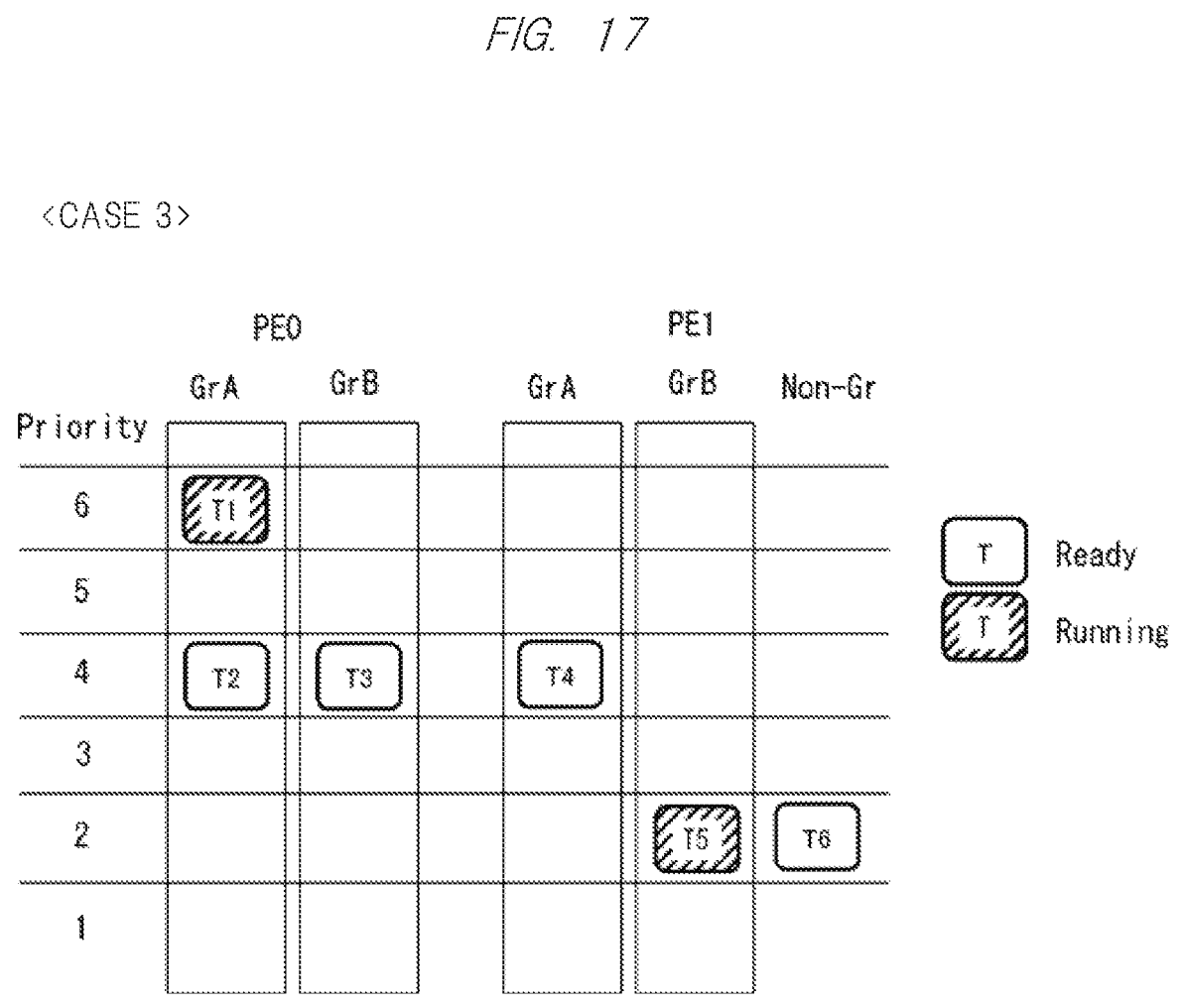
Figure 18:
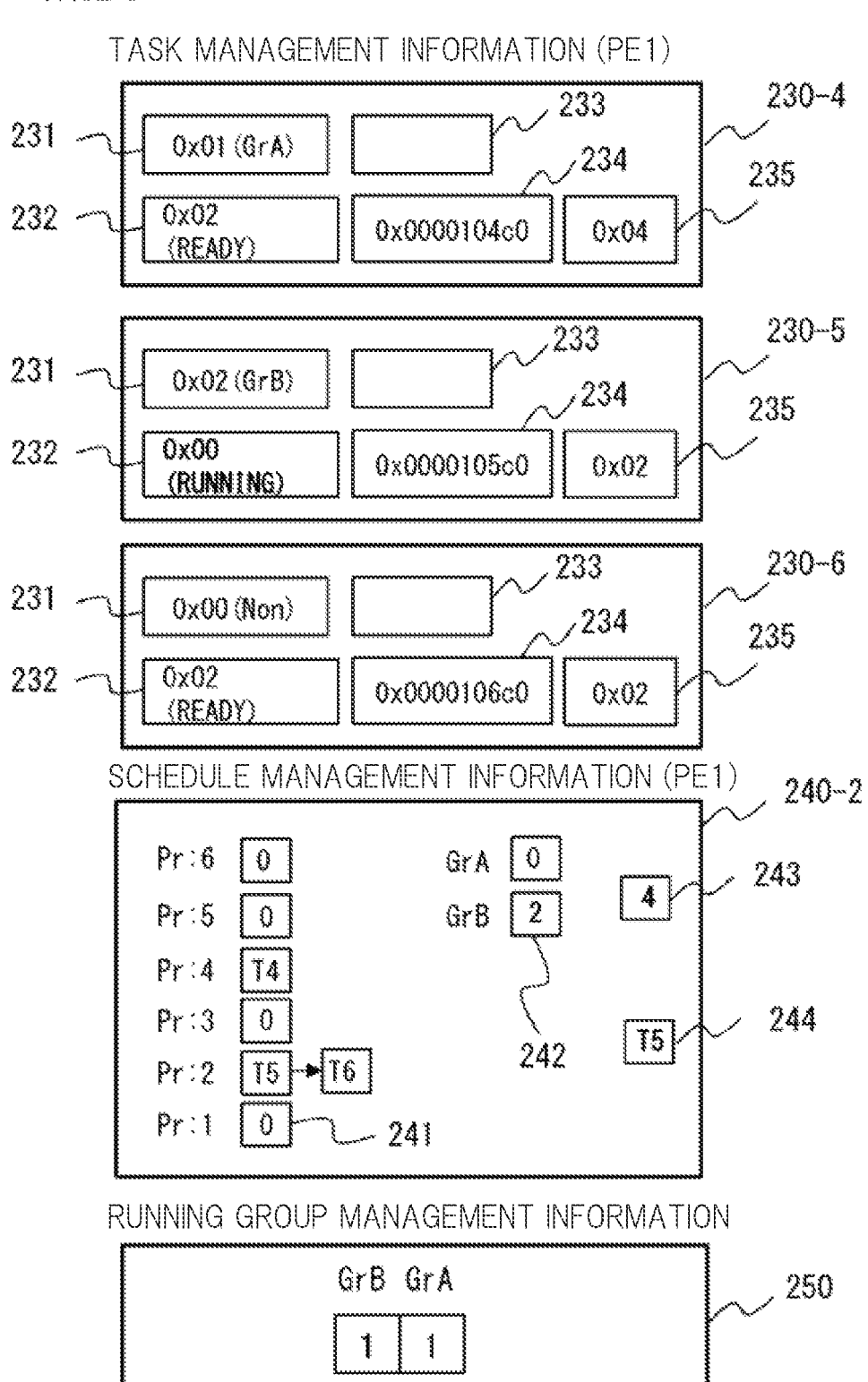
FIG. 18 is a diagram showing task management information and schedule management information of the PE1 and running group management information in Case 3 of the specific example of the multiprocessor system according to the first embodiment.

Case 3: Task T1 of Group A is in Running State on PE0 Side, and Task T5 of Group B is in Running State on PE1 Side FIG. 17 shows states of the tasks of the respective PEs in Case 3. FIG. 18 shows specific values of the respective pieces of task management information 230 of the PE1, the schedule management information 240 thereof and the running group management information 250 in Case 3. The pieces of task management information 230 of the PE0 and the schedule management information 240 thereof are the same as those in Case 2. As shown in FIG. 17, in Case 3, the task T5 (Group B, Priority level 2) on the PE1 side turns to the Running state from the state of Case 2.

Specifically, upon determining the task T5 as the task to be started next as described above, the schedule management control unit 220 updates the task state 232 of the task management information 230-5 of the task T5 from the Ready state to the Running state as shown in FIG. 18.

Moreover, as shown in FIG. 18, the schedule management control unit 220 sets, to 1, the bit of Group B of the running group management information 250. Further, as shown in FIG. 18, the schedule management control unit 220 sets the priority level 4 of the task T4 to the highest priority level information 243 in the schedule management information 240-2 of the PE1. Moreover, the schedule management control unit 220 sets the priority level 2 of the task T5 to the group highest priority level information 242 of Group B. Further, the schedule management control unit 220 sets the task T5 to the running task ID 244.

In this example, in the state of Case 3, the task T1 in the Running state is ended on the PE0 side. Then, the task management control unit 210 performs ending processing for the task T1. Moreover, the task management control unit 210 updates the task management information 230-1 of the task T1 and the running group management information 250, and calls the schedule management control unit 220.

Next, the schedule management control unit 220 refers to the ready task information 241 of the schedule management information 240-1 in the PE0, and selects the task T2 with the priority level 4, which is the second highest, as a candidate for the task to be started. Next, the schedule management control unit 220 refers to the task management information 230-2 of the task T2, and acquires the task group ID 231 (Group A). Next, the schedule management control unit 220 refers to the running group management information 250, and confirms the value of the bit corresponding to Group A to which the task T2 belongs. In Case 3, since the bit of Group A of the running group management information 250 is 0 when the task T1 is ended, the schedule management control unit 220 determines the task T2 as the task to be started next, and shifts to the state of Case 4.

Figure 19:
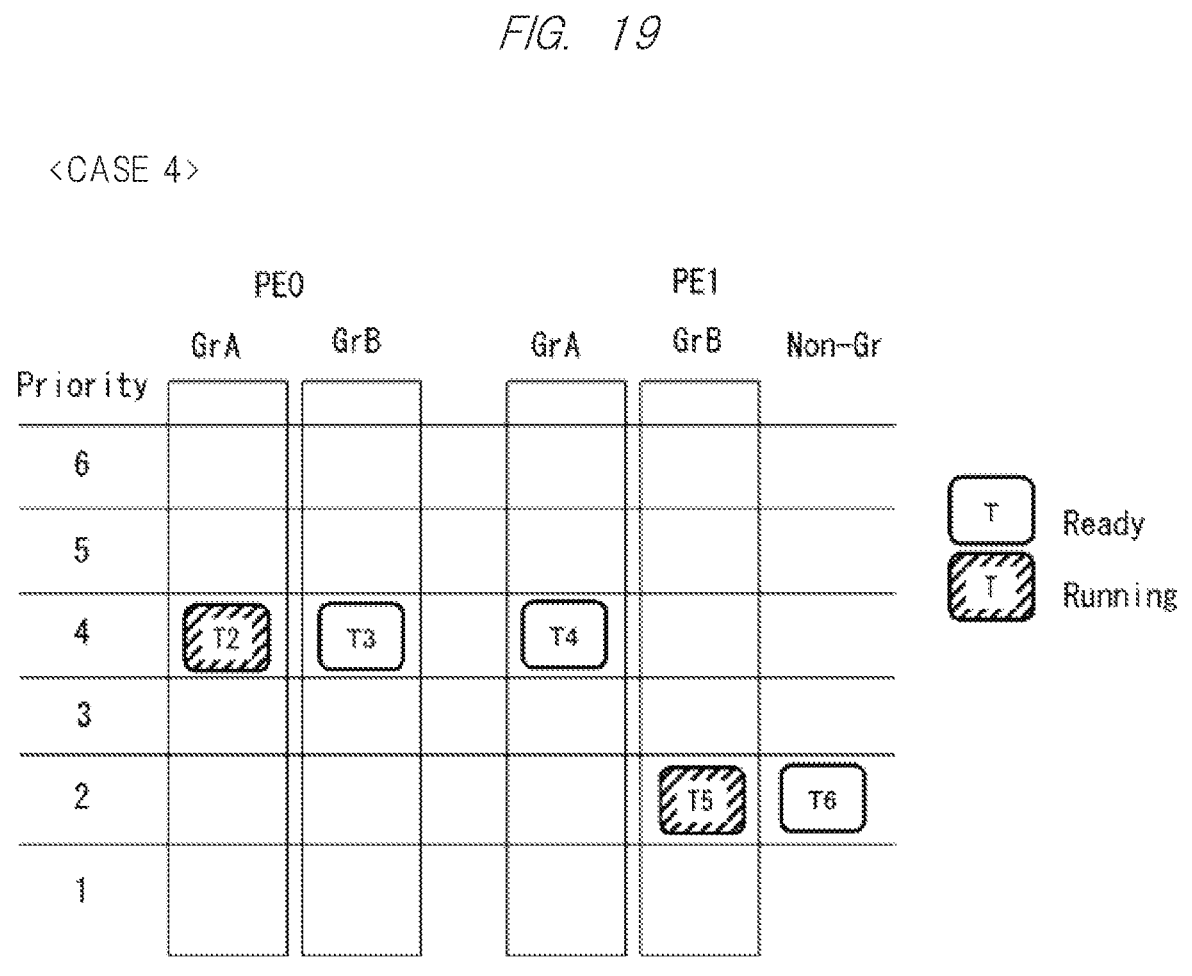
Figure 20:
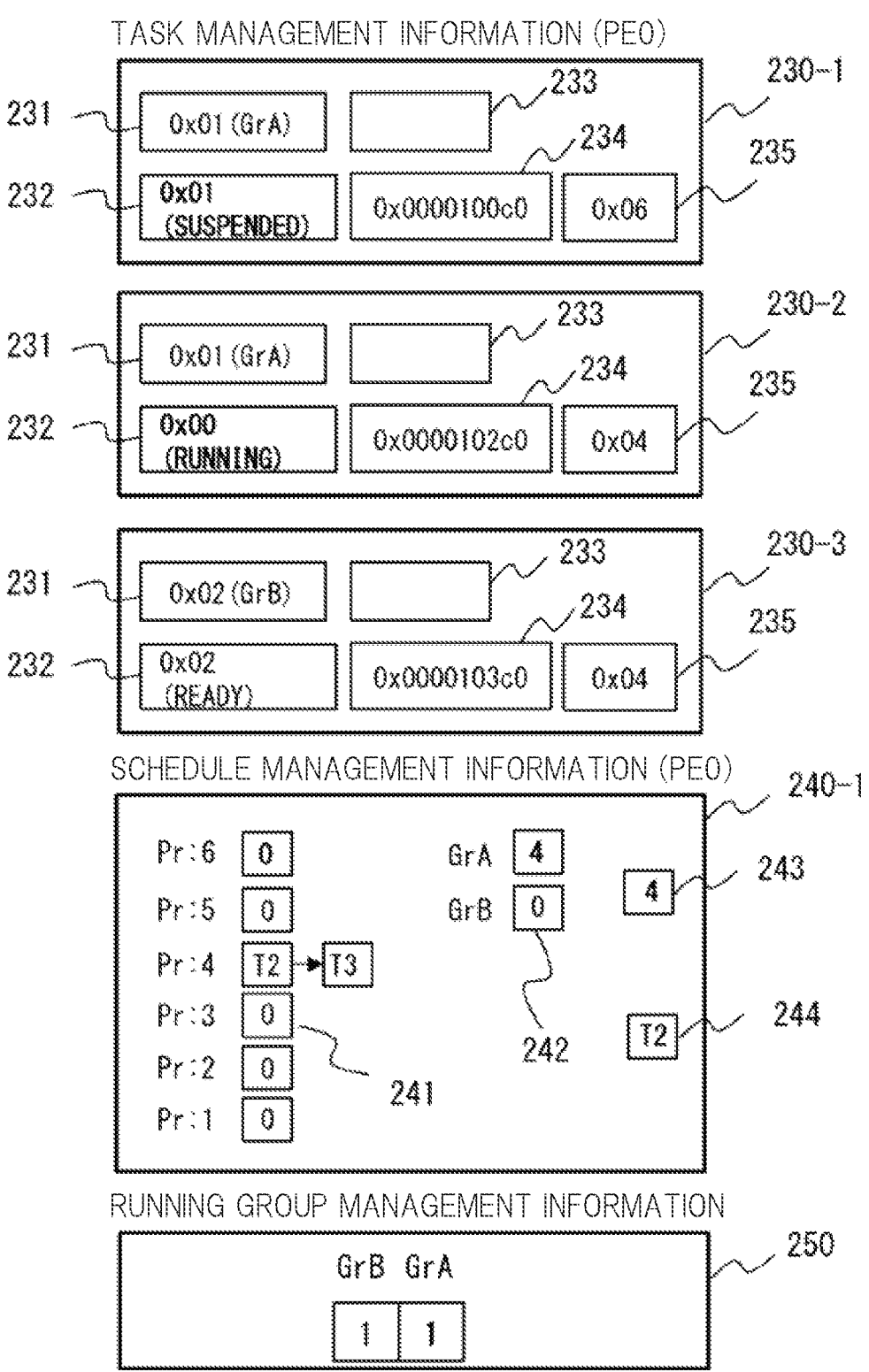
FIG. 20 is a diagram showing task management information and schedule management information of the PE0 and running group management information in Case 4 of the specific example of the multiprocessor system according to the first embodiment.

Case 4: Task T2 of Group A is in Running State on PE0 Side, and Task T5 of Group B is in Running State on PE1 Side FIG. 19 shows states of the tasks of the respective PEs in Case 4. FIG. 20 shows specific values of the respective pieces of task management information 230 of the PE0, the schedule management information 240 thereof and the running group management information 250 in Case 4. The pieces of task management information 230 of the PE1 and the schedule management information 240 thereof in Case 4 are the same as those in Case 3. As shown in FIG. 19, in Case 4, the task T1 (Group A, Priority level 6) on the PE0 side turns to the Suspended state from the state of Case 3 (that is, is deleted in the drawing), and the task T2 (Group A, Priority level 2) turns to the Running state.

Specifically, when the task T1 is ended as described above, then as shown in FIG. 20, the task management control unit 210 updates the task state 232 of the task management information 230-1 of the task T1 from the Running state to the Suspended state. Moreover, the task management control unit 210 sets, to 0, the bit of Group A of the running group management information 250. Further, the task management control unit 210 deletes the task T1 from the ready task information 241 of the schedule management information 240-1 in the PE0, and sets the running task ID 244 to 0.

Moreover, upon determining the task T2 as the task to be started next as described above, the schedule management control unit 220 updates the task state 232 of the task management information 230-2 of the task T2 from the Ready state to the Running state as shown in FIG. 20. Moreover, as shown in FIG. 20, the schedule management control unit 220 sets, to 1, the bit of Group A of the running group management information 250. Further, as shown in FIG. 20, the schedule management control unit 220 sets the priority level 4 of the task T2 to the highest priority level information 243 in the schedule management information 240-1 of the PE0 and the group highest priority level information 242 of Group A therein. Moreover, the schedule management control unit 220 sets the task T2 to the running task ID 244.

In this example, in the state of Case 4, the task T5 in the Running state is ended on the PE1 side. Then, the task management control unit 210 performs ending processing for the task T5. Moreover, the task management control unit 210 updates the task management information 230-5 of the task T5 and the running group management information 250, and calls the schedule management control unit 220.

Next, the schedule management control unit 220 refers to the ready task information 241 of the schedule management information 240-2 in the PE1, and selects the task T4 with the priority level 4, which is the highest, as a candidate for the task to be started. Next, the schedule management control unit 220 refers to the task management information 230-4 of the task T4, and acquires the task group ID 231 (Group A). Next, the schedule management control unit 220 refers to the running group management information 250, and confirms the value of the bit corresponding to Group A to which the task T4 belongs. In Case 4, since the bit of Group A is 1, the schedule management control unit 220 determines the task T4 as such a task that cannot be started.

Next, the schedule management control unit 220 refers to the ready task information 241 of the schedule management information 240-2, and selects the task T6 with the priority level 2, which is the second highest after that of the task T4, as a candidate for the task to be started. Next, the schedule management control unit 220 refers to the task management information 230-6 of the task T6, and acquires the task group ID 231 (Non-group). Next, the schedule management control unit 220 confirms that the group ID of the task T6 is 0 (Non-group). In this case, since the task T6 is a task that does not operate the shared resource, the schedule management control unit 220 determines that the task T6 is a task that can be started next without referring to the running group management information 250. Therefore, the schedule management control unit 220 determines the task T6 as the task to be started next, and shifts to the state of Case 5.

Figure 21:
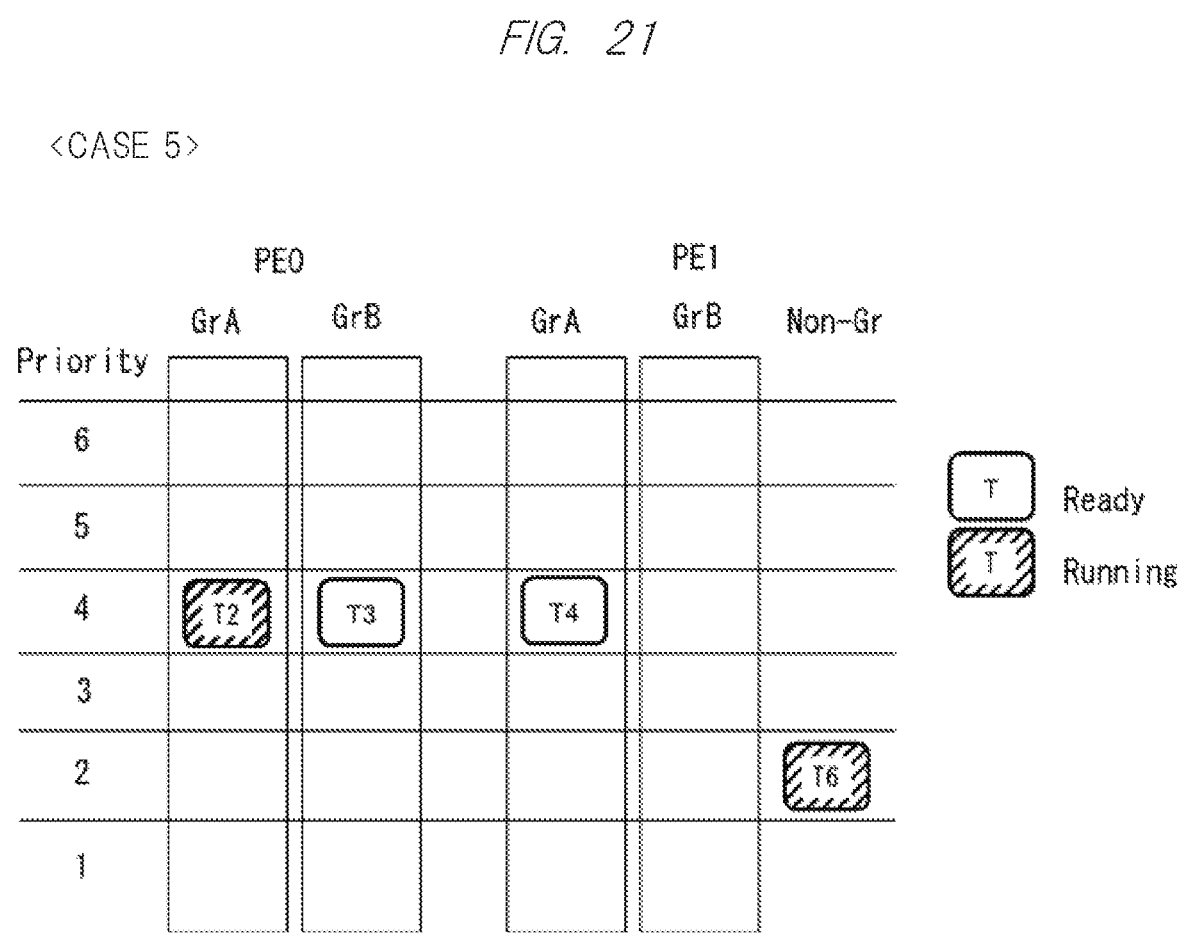
Figure 22:
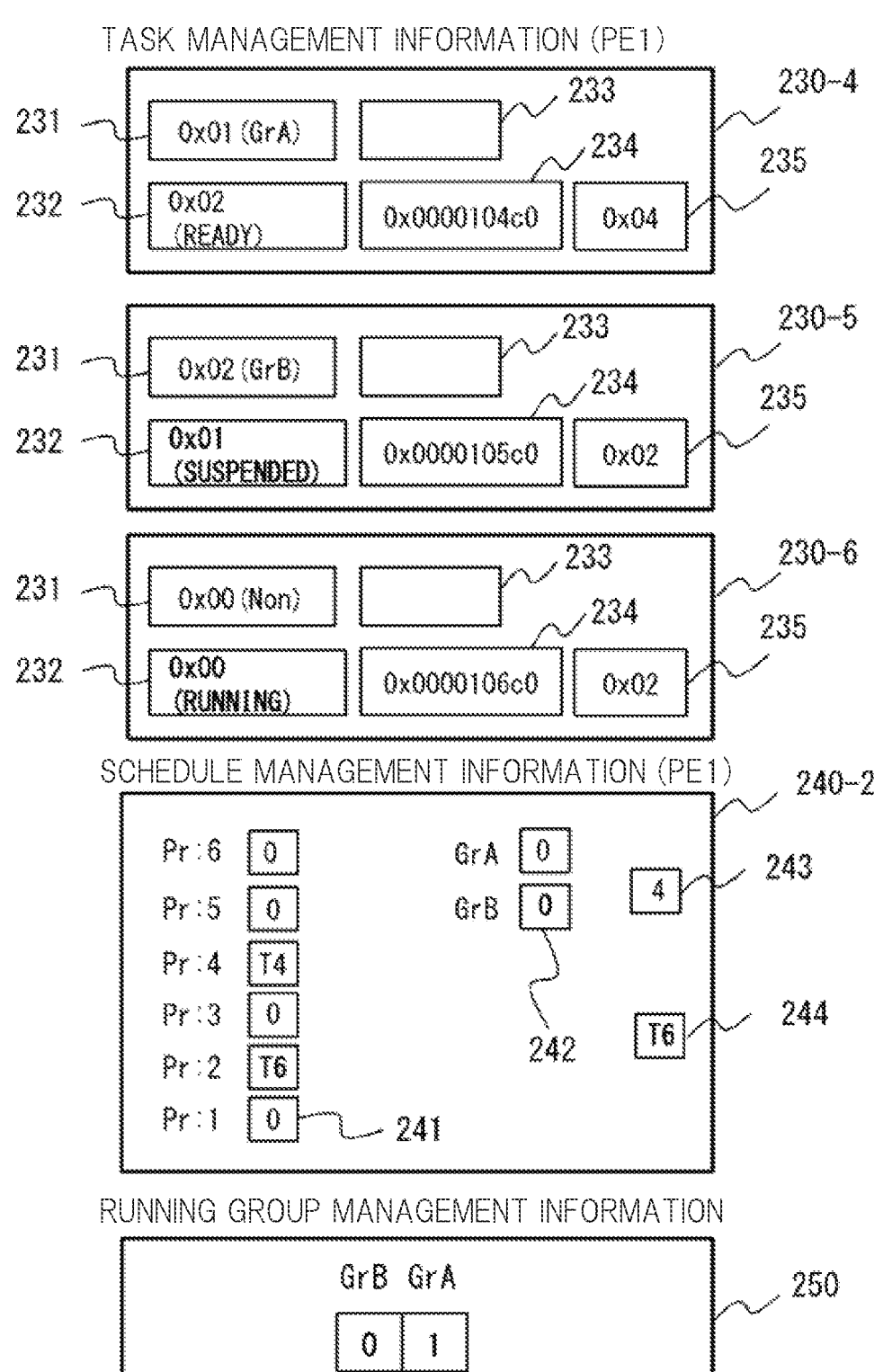
FIG. 22 is a diagram showing task management information and schedule management information of the PE1 and running group management information in Case 5 of the specific example of the multiprocessor system according to the first embodiment.

Case 5: Task T2 of Group A is in Running State on PE0 Side, and Task T6 that does not Belong to any Group (Belongs to No Group: Non-Group) is in Running State on PE1 Side FIG. 21 shows states of the tasks of the respective PEs in Case 5. FIG. 22 shows specific values of the respective pieces of task management information 230 of the PE1, the schedule management information 240 thereof and the running group management information 250 in Case 5. As shown in FIG. 21, in Case 5, the task T5 (Group B, Priority level 2) on the PE1 side turns to the Suspended state from the state of Case 4, and the task T6 (Non-group, Priority level 2) turns to the Running state.

Specifically, when the task T5 is ended as described above, then as shown in FIG. 22, the task management control unit 210 updates the task state 232 of the task management information 230-5 of the task T5 from the Running state to the Suspended state. Moreover, as shown in FIG. 22, the task management control unit 210 sets, to 0, the bit of Group B of the running group management information 250. Further, the task management control unit 210 deletes the task T5 from the ready task information 241 of the schedule management information 240-2 in the PE1, and sets the running task ID 244 to 0.

Moreover, upon determining the task T6 as the task to be started next as described above, the schedule management control unit 220 updates the task state 232 of the task management information 230-6 of the task T6 from the Ready state to the Running state as shown in FIG. 22. Moreover, the schedule management control unit 220 does not update the bit of the running group management information 250. Further, as shown in FIG. 22, the schedule management control unit 220 does not update the highest priority level information 243 in the schedule management information 240-2 of the PE1. Moreover, the schedule management control unit 220 sets 0 to the group highest priority level information 242 of Group B, and sets the task T6 to the running task ID 244.

In this example, in the state of Case 5, the task T6 in the Running state is ended on the PE1 side. Then, the task management control unit 210 performs ending processing for the task T6. Moreover, the task management control unit 210 updates the task management information 230-6 of the task T6 and the running group management information 250, and calls the schedule management control unit 220.

Next, the schedule management control unit 220 refers to the ready task information 241 of the schedule management information 240-2 in the PE1, and selects the task T4 with the priority level 4, which is the highest, as a candidate for the task to be started. Next, the schedule management control unit 220 refers to the task management information 230-4 of the task T4, and acquires the task group ID 231 (Group A). Next, the schedule management control unit 220 refers to the running group management information 250, and confirms the value of the bit corresponding to Group A to which the task T4 belongs. In Case 5, since the bit of Group A is 1, the schedule management control unit 220 determines the task T4 as such a task that cannot be started.

Next, the schedule management control unit 220 refers to the ready task information 241 of the schedule management information 240-2, and confirms that no task with the second highest priority level after that of the task T4 is present. Since no task that can be started now is present, the schedule management control unit 220 shifts to processing for starting the idle handler, thereby shifting to the state of Case 6.

Figure 23:
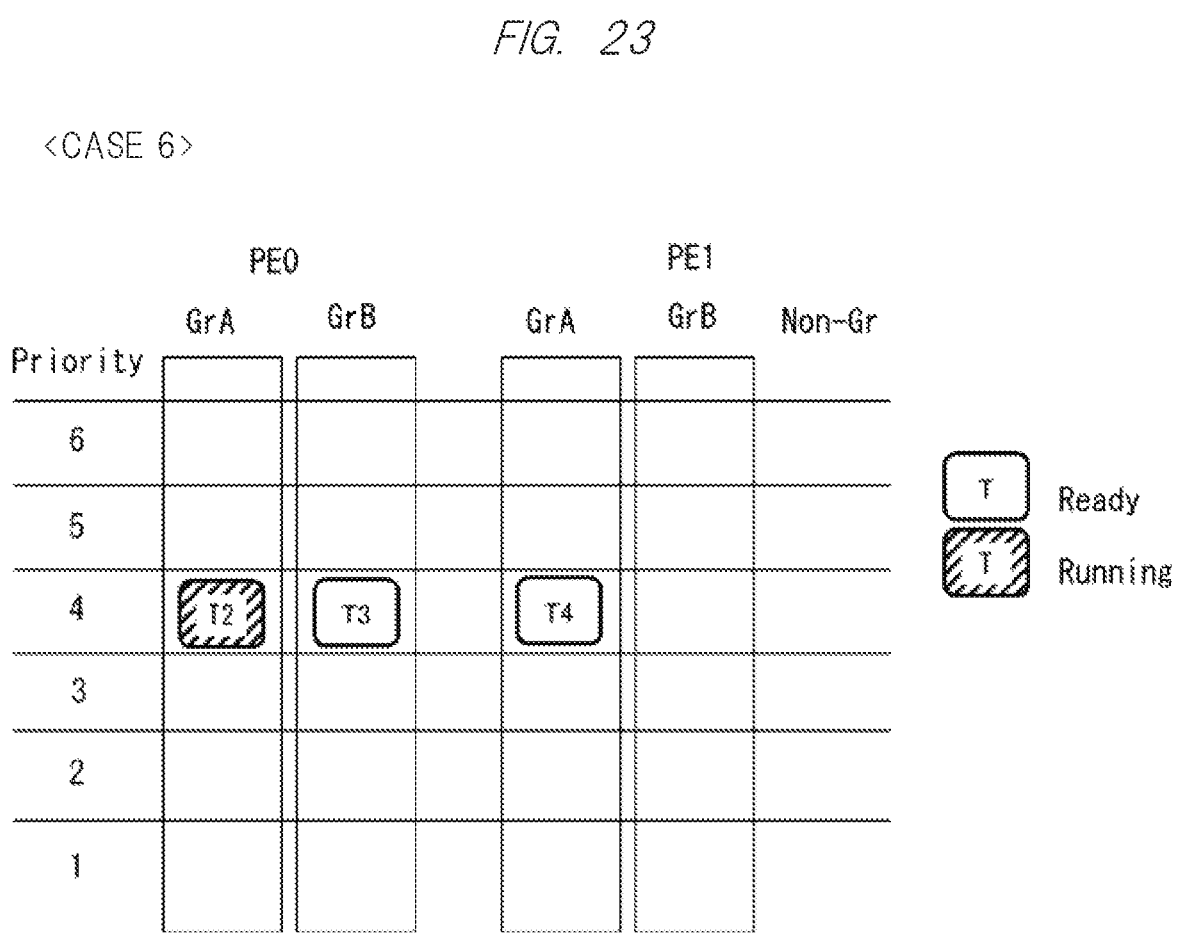
Figure 24:
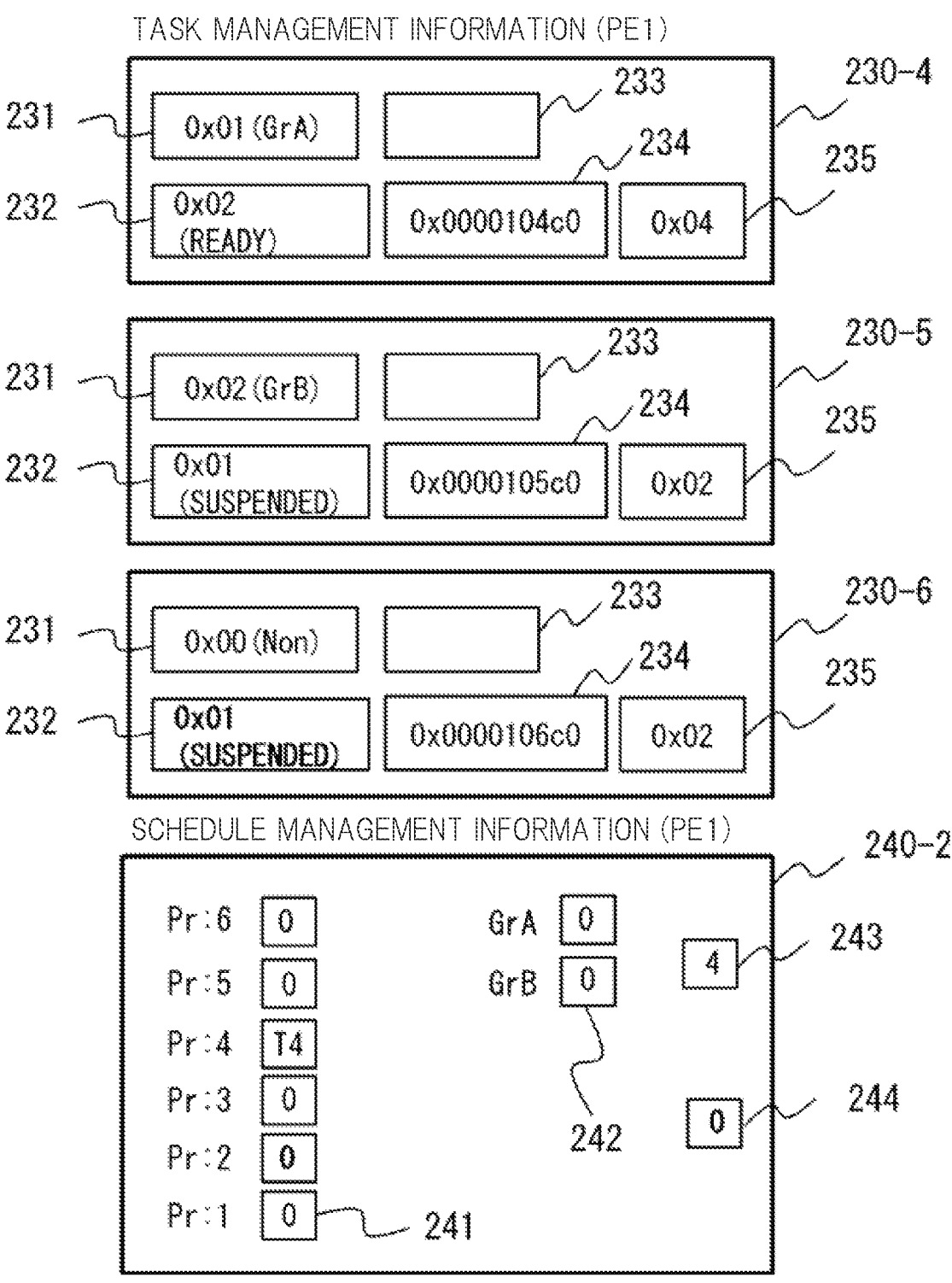
FIG. 24 is a diagram showing task management information and schedule management information of the PE1 in Case 6 of the specific example of the multiprocessor system according to the first embodiment.

Case 6: Task T2 of Group A is in Running State on PE0 Side, and Idle Handler is Running on PE1 Side FIG. 23 shows states of the tasks of the respective PEs in Case 6. FIG. 24 shows specific values of the respective pieces of task management information 230 of the PE1 and the schedule management information 240 thereof in Case 6. The pieces of task management information 230 of the PE0, the schedule management information 240 thereof and the running group management information 250 in Case 6 are the same as those in Case 5. As shown in FIG. 23, in Case 6, the task T6 (Non-group, Priority level 2) on the PE1 side turns to the Suspended state from the state of Case 5.

Specifically, when the task T6 is ended as described above, then as shown in FIG. 24, the task management control unit 210 updates the task state 232 of the task management information 230-6 of the task T6 from the Running state to the Suspended state. Moreover, the task management control unit 210 does not update the running group management information 250. Further, as shown in FIG. 24, the task management control unit 210 deletes the task T6 from the ready task information 241 of the schedule management information 240-2 in the PE1, and sets the running task ID 244 to 0.

In this example, in the state of Case 6, the task T2 in the Running state is ended on the PE0 side. Then, the task management control unit 210 on the PE0 side performs ending processing for the task T2. Moreover, the task management control unit 210 updates the task management information 230-2 of the task T2 and the running group management information 250, and calls the schedule management control unit 220.

Next, the schedule management control unit 220 refers to the ready task information 241 of the schedule management information 240-1 in the PE0, and selects the task T3 with the priority level 4, which is the second highest, as a candidate for the task to be started. Next, the schedule management control unit 220 refers to the task management information 230-3 of the task T3, and acquires the task group ID 231 (Group B). Next, the schedule management control unit 220 refers to the running group management information 250, and confirms the value of the bit corresponding to Group B to which the task T3 belongs. In Case 6, since the bit of Group B is 0, the schedule management control unit 220 determines the task T3 as the task to be started next, and updates the respective pieces of management information.

Next, the schedule management control unit 220 of the PE1 in which the idle handler is running confirms one more time whether or not the task to be started next is present since the running group management information 250 is updated by the PE0. The schedule management control unit 220 refers to the ready task information 241 of the schedule management information 240-2 in the PE1, and selects task T4 with the priority level 4, which is the highest, as a candidate for the task to be started. Next, the schedule management control unit 220 refers to the task management information 230-4 of the task T4, and acquires the task group ID 231 (Group A). Next, the schedule management control unit 220 refers to the running group management information 250, and confirms the value of the bit corresponding to Group A to which the task T4 belongs. In Case 6, since the bit of Group A is 0, the schedule management control unit 220 determines the task T4 as the task to be started next, and shifts to the state of Case 7.

Figure 25:
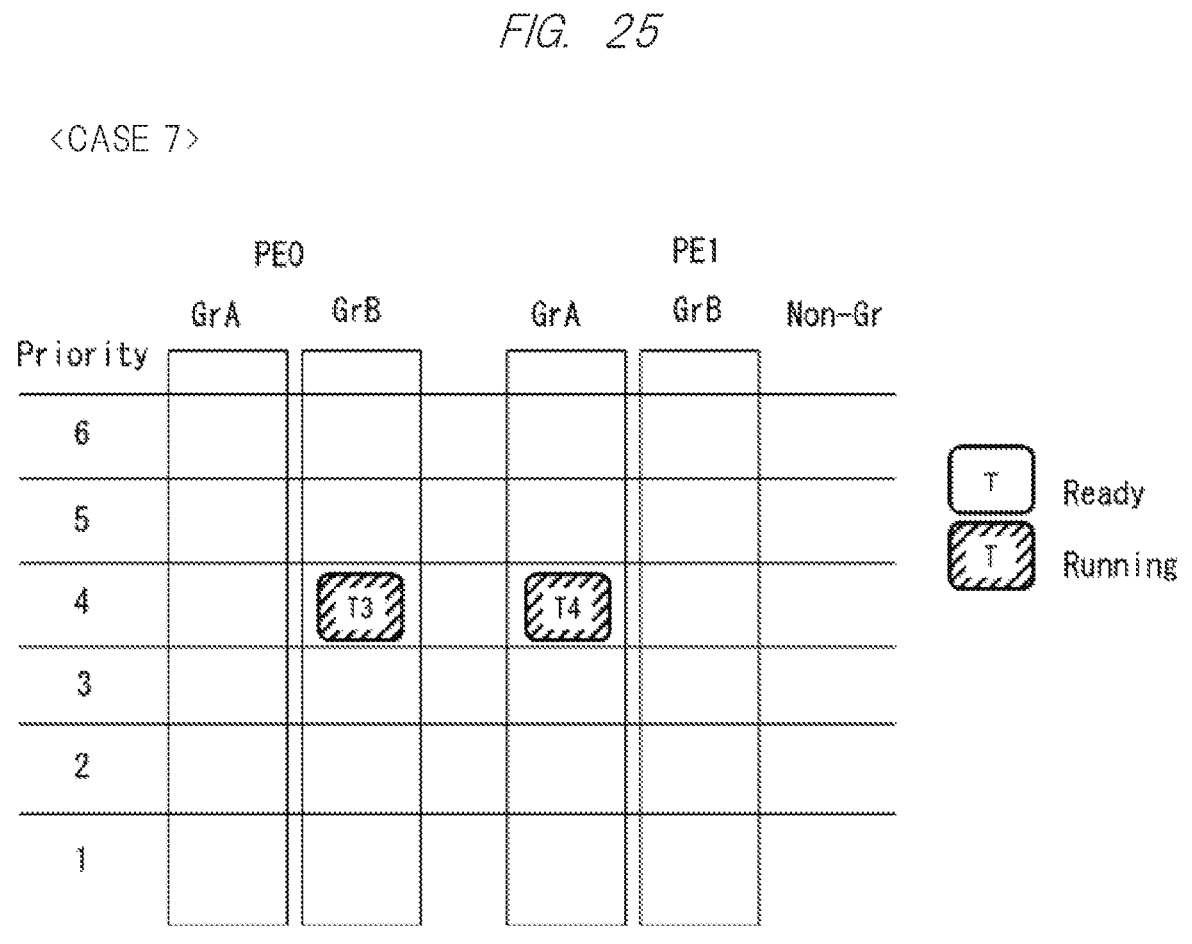
Figure 26:
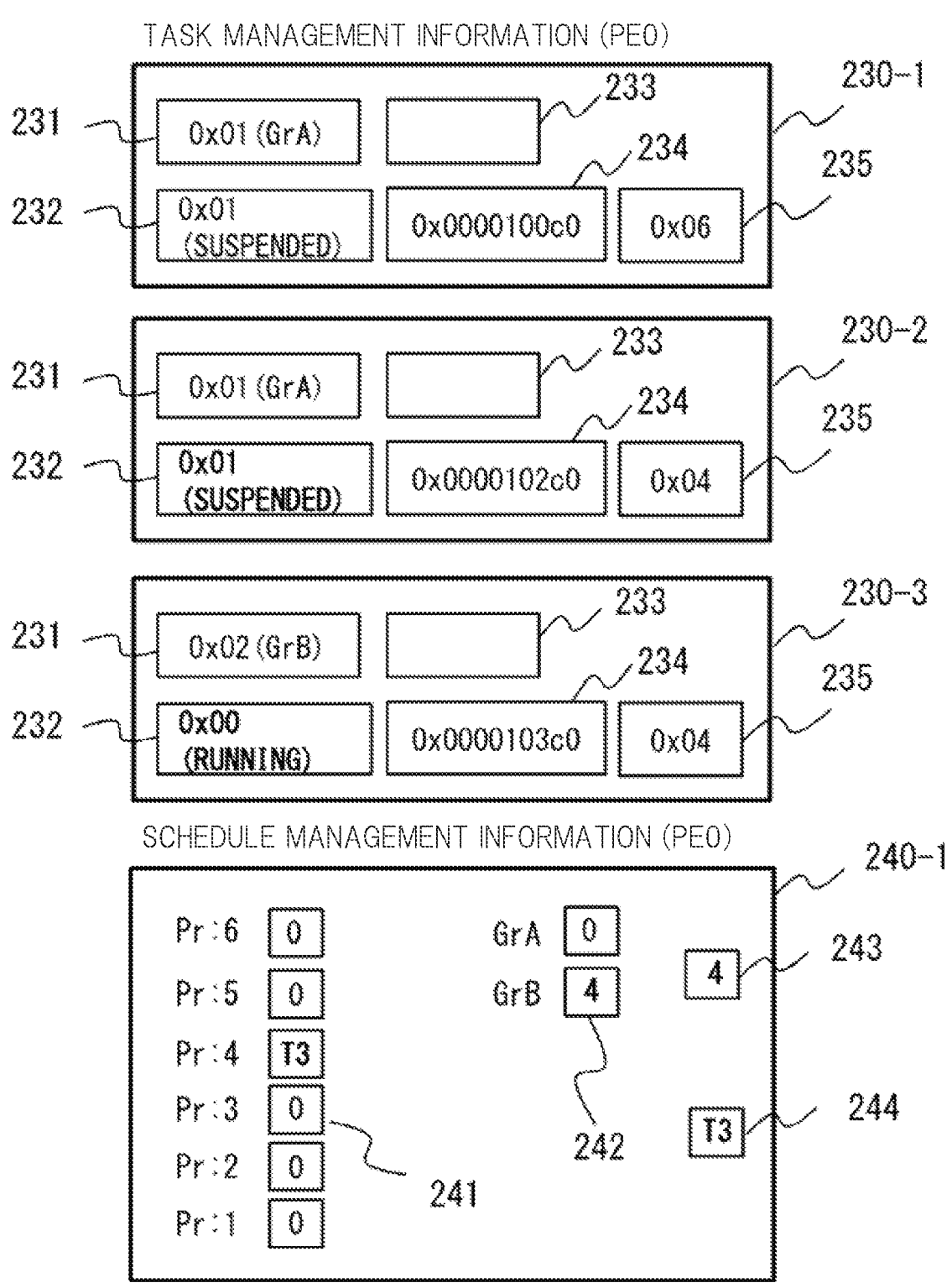
FIG. 26 is a diagram showing task management information and schedule management information of the PE0 in Case 7 of the specific example of the multiprocessor system according to the first embodiment.
Figure 27:
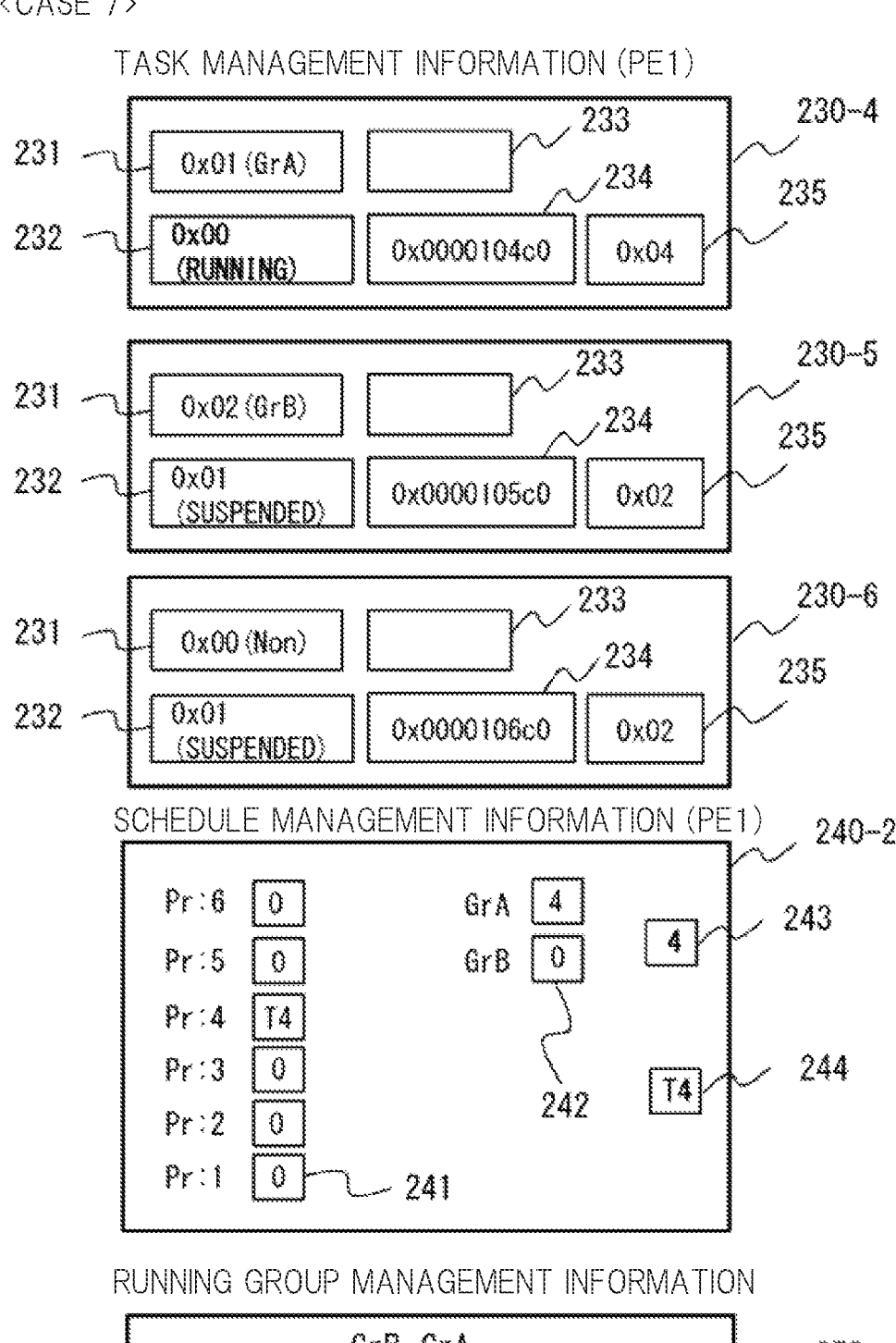
FIG. 27 is a diagram showing task management information and schedule management information of the PE1 and running group management information in Case 7 of the specific example of the multiprocessor system according to the first embodiment.

Case 7: Task T3 of Group B is in Running State on PE0 Side, and Task T4 of Group A is in Running State on PE1 Side FIG. 25 shows states of the tasks of the respective PEs in Case 7. FIGS. 26 and 27 show specific values of the respective pieces of task management information 230, the respective pieces of schedule management information 240 and the running group management information 250 in Case 7. As shown in FIG. 25, in Case 7, the task T2 (Group A, Priority level 4) on the PE0 side turns to the Suspended state from the state of Case 6. Moreover, the task T3 (Group B, Priority level 4) on the PE0 side turns to the Running state, and the task T4 (Group A, Priority level 4) on the PE1 side turns to the Running state.

Specifically, when the task T2 is ended as described above, then as shown in FIG. 26, the task management control unit 210 updates the task state 232 of the task management information 230-2 of the task T2 from the Running state to the Suspended state. Moreover, the task management control unit 210 sets, to 0, the bit of Group A of the running group management information 250. Further, the task management control unit 210 deletes the task T2 from the ready task information 241 of the schedule management information 240-1 in the PE0, and sets the running task ID 244 to 0.

Moreover, upon determining the task T3 as the task to be started next as described above, the schedule management control unit 220 updates the task state 232 of the task management information 230-3 of the task T3 from the Ready state to the Running state as shown in FIG. 26. Moreover, as shown in FIG. 27, the schedule management control unit 220 sets, to 1, the bit of Group B of the running group management information 250. Further, as shown in FIG. 26, the schedule management control unit 220 sets the priority level 4 of the task T2 to the group highest priority level information 242 of Group B in the schedule management information 240-1 of the PE0, and sets the task T3 to the running task ID 244.

Further, upon determining the task T4 as the task to be started next as described above, the schedule management control unit 220 updates the task state 232 of the task management information 230-4 of the task T4 from the Ready state to the Running state as shown in FIG. 27. Moreover, as shown in FIG. 27, the schedule management control unit 220 sets, to 1, the bit of Group A of the running group management information 250. Further, as shown in FIG. 27, the schedule management control unit 220 sets the priority level 4 of the task T4 to the group highest priority level information 242 of Group A in the schedule management information 240-2 of the PE1, and sets the task T4 to the running task ID 244.

As described above, a series of the tasks T1 to T6 turn to the Running state by a flow from Case 1 to Case 7.

Comparison with Comparative Example

Figure 28:
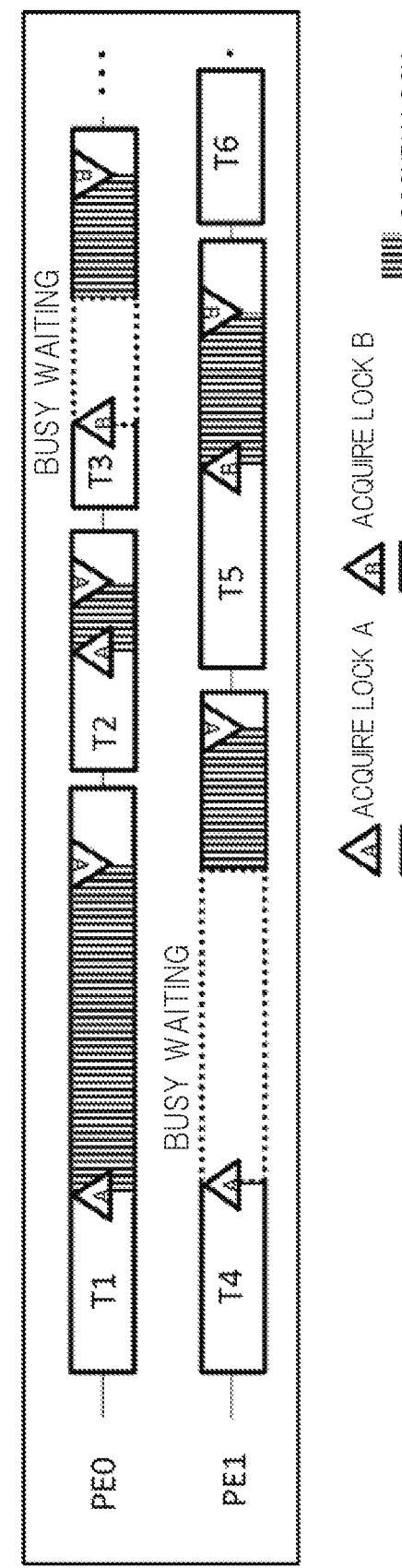
FIG. 28 is a diagram showing an example of shifts of the tasks in a multiprocessor system of a comparative example.
Figure 29:
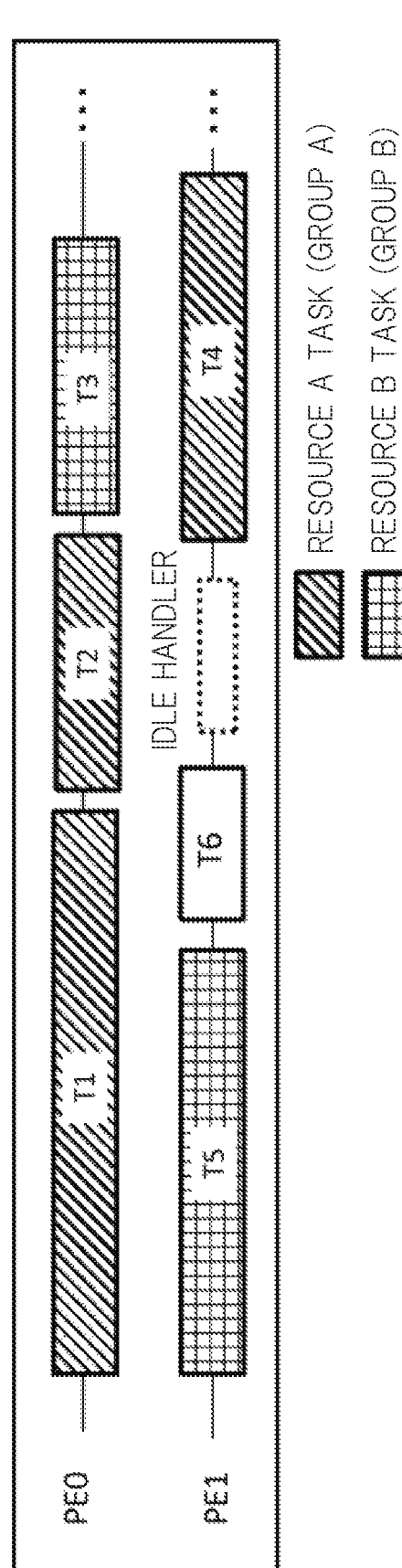
FIG. 29 is a diagram showing an example of shifts of the tasks in the multiprocessor system according to the first embodiment.

FIG. 28 shows a state shift in the case of scheduling the tasks T1 to T6 of the specific example in a multiprocessor system of a comparative example to which the present embodiment is not applied yet. FIG. 29 shows a state shift in the case of scheduling the tasks T1 to T6 of the specific example in the multiprocessor system according to the present embodiment as described above.

As shown in FIG. 28, in the comparative example, the tasks T1, T2 and T4 operate Shared resource A, and the tasks T3 and T5 operate Shared resource B. Then, since the tasks which operate the shared resource may work concurrently between the PEs, lock acquisition processing and lock release processing must be added during the task processing. In the comparative example, the tasks T1, T2 and T4 require Lock A acquisition processing and Lock A release processing for Shared resource A, and the tasks T3 and T5 require Lock B acquisition processing and Lock B release processing for Shared resource B.

In FIG. 28, the task T1 of the PE0 and the task T4 of the PE1, the tasks T1 and T4 using Shared resource A, are executed simultaneously. For example, when the task T1 performs the Lock A acquisition processing before the task T4 and occupies Lock A, the task T4 cannot acquire Lock A. Therefore, even if the task T4 performs the Lock A acquisition processing, the task T4 fails to acquire Lock A, and shifts to retry loop processing. Accordingly, the task T4 is in a busy waiting state until the task T1 performs the Lock A release processing. Moreover, the task T3 of the PE0 and the task T5 of the PE1, the tasks T3 and T5 using the shared resource B, are executed simultaneously. For example, when the task T5 performs the Lock B acquisition processing before the task T3 and occupies Lock B, the task T3 cannot acquire Lock B. Therefore, even if the task T3 performs the Lock B acquisition processing, the task T3 is in the busy waiting state until the task T5 performs the Lock B release processing. As described above, in the comparative example, one PE is in the busy waiting state while the other PE is acquiring a lock, and therefore, resources of the PE will be wasted.

In contrast, in the present embodiment, as shown in FIG. 29, the tasks T1, T2 and T4 are grouped into Group A since the tasks T1, T2 and T4 operate Shared resource A, and the tasks T3 and T5 are grouped into Group B since the tasks T3 and T5 operate Shared resource B. Then, the RTOS performs scheduling so as to perform an exclusive control for the start of each task for each group. Therefore, the tasks T1, T2 and T4 are not executed simultaneously. The tasks T3 and T5 are not executed simultaneously. In FIG. 29, the tasks T1 and T2 are executed in the PE0, and thereafter, the task T4 is executed in the PE1. After the task T5 is executed in the PE1, the task T3 is executed in the PE0. As described above, in the present embodiment, the tasks which operate each of the shared resources do not operate concurrently between the PEs, and therefore, the lock acquisition processing and the lock release processing are not required in the tasks. Therefore, the resources of the PEs will not be wasted as in the busy waiting. Moreover, since the execution of the tasks is not interrupted due to the busy waiting, estimation accuracy for a task execution time, which is one of performance indices of the system, is improved.

Note that, while the task is being executed in the other PE, the task in the same group is not executed, and therefore, the execution of the task may be delayed more than before the embodiment is applied. In FIG. 29, execution timing of the task T4 becomes later than in the comparative example of FIG. 28. For example, tasks are set not to be grouped, whereby the limitation by the task scheduling for each group is eliminated, and the tasks can be executed according to scheduling based on only the priority levels. Therefore, the task T4 is divided, and a portion thereof that is not related to the operation of Shared resource A is not grouped into any group, whereby the delay of the execution timing can be suppressed.

Effects

As described above, in the present embodiment, in the embedding-directed RTOS that operates on the multiprocessor system, the group information of the tasks and the group information of the running tasks are managed. Moreover, based on these pieces of information, the tasks on the respective PEs are scheduled in advance so as not to generate a conflict operation for the shared resources. Specifically, a task with a highest priority level, which belongs to a group in which no task in the Running state is present on the multiprocessor system, is selected as a task to be started next.

Thus, the tasks are scheduled so as not to cause the conflict operation for the shared resources on the multiprocessor system, and therefore, the software developer will not need to consider to add the exclusive control for the tasks. That is, it is not necessary to add the spin lock (lock acquisition processing and lock release processing) to the tasks. Hence, by using the RTOS of the present embodiment, it becomes possible to operate tasks, which work on a single processor, directly on a multiprocessor, and an application program can be used.

Second Embodiment

Next, a multiprocessor system according to a second embodiment will be described. In the present embodiment, an exclusive control is performed for each group including tasks and interrupt handling which access a shared resource in a scheduling function of an OS.

System Configuration

Figure 30:
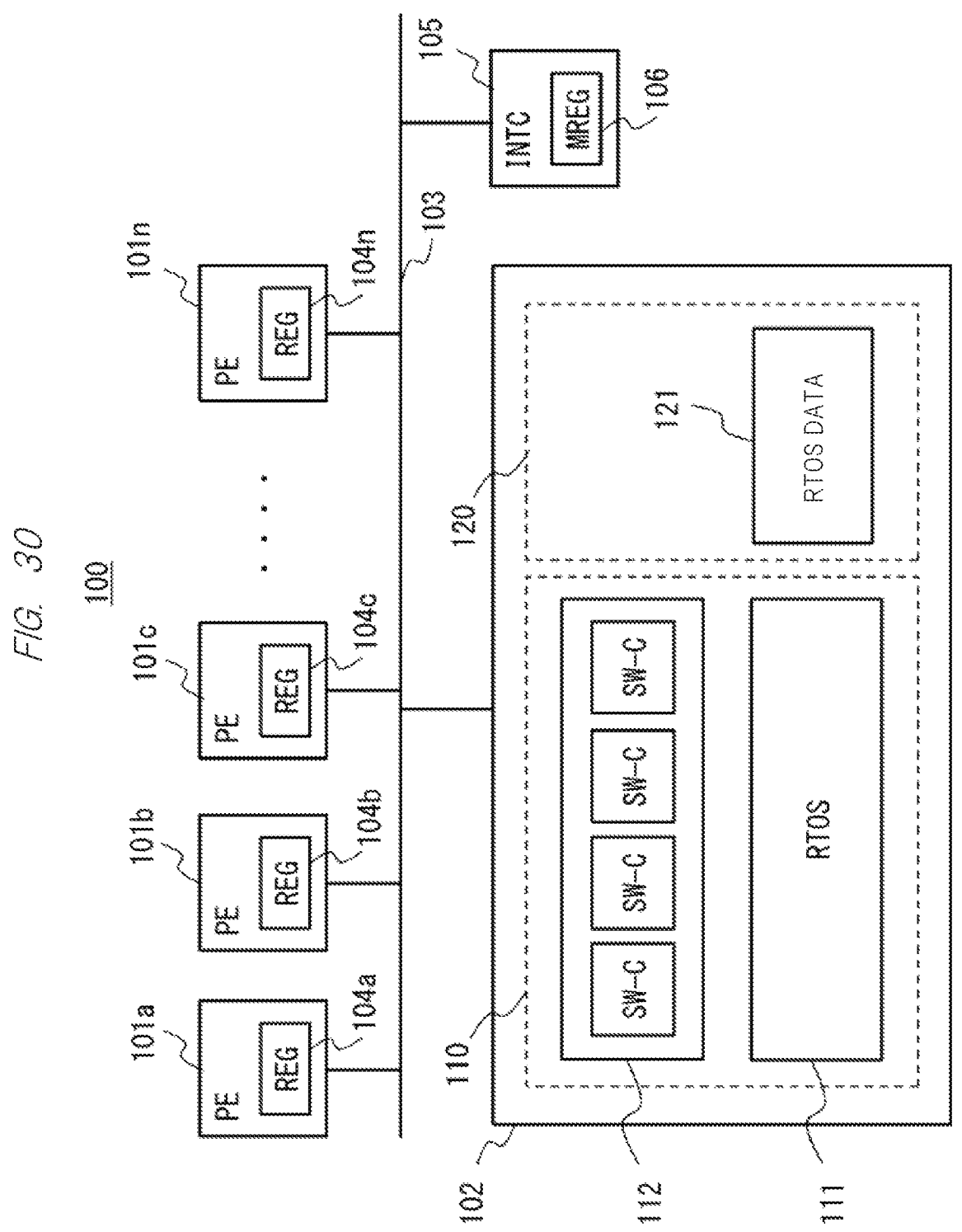
FIG. 30 is a configuration diagram showing a hardware configuration of a multiprocessor system according to a second embodiment.

FIG. 30 shows a hardware configuration of the multiprocessor system according to the present embodiment. As shown in FIG. 30, the multiprocessor system 100 according to the present embodiment further includes an interrupt controller (INTC) 105 in addition to the configuration of the first embodiment.

The interrupt controller 105 is connected to a bus 103. The interrupt controller 105 is capable of accessing a plurality of PEs 101 and a memory 102 via the bus 103. The interrupt controller 105 controls an interrupt that occurs in the multiprocessor system 100. The interrupt includes hardware and software interrupts. When the interrupt occurs, the interrupt controller 105 is capable of inputting interrupt requests to all PEs 101a to 101n. Upon receiving the interrupt request, each PE 101 executes interrupt service routine (ISR) corresponding to a cause of the interrupt. For example, the interrupt service routine is included in an RTOS 111, and the interrupt service routine corresponding to the interrupt request (cause of interrupt) is called and executed. In the present embodiment, such interrupt service routines (causes of interrupt) which access shared resources are grouped for each of the shared resources. Such grouping is the same as the grouping of the tasks in the first embodiment. For example, the tasks and interrupt service routines, which access a shared resource SR1, are grouped into Group 1 that is single.

Moreover, the interrupt controller 105 includes an interrupt mask register (MREG) 106. The interrupt mask register 106 holds an interrupt mask. The interrupt mask is a mask bit that sets whether or not to accept (whether to permit or prohibit) an interrupt for each cause of the interrupt. When 1 is set to a bit corresponding to the cause of interrupt, an interrupt request for the cause of interrupt is prohibited, and when 0 is set to the bit corresponding to the cause of interrupt, the interrupt request for the cause of interrupt is permitted. The interrupt mask register 106 is settable from all the PEs 101a to 101n. According to a value of the interrupt mask register 106, the interrupt controller 105 inputs the interrupt request to the PE 101 when the cause of such an interrupt that has occurred is permitted, and suspends the interrupt request when the cause of the interrupt that has occurred is prohibited.

Figure 31:
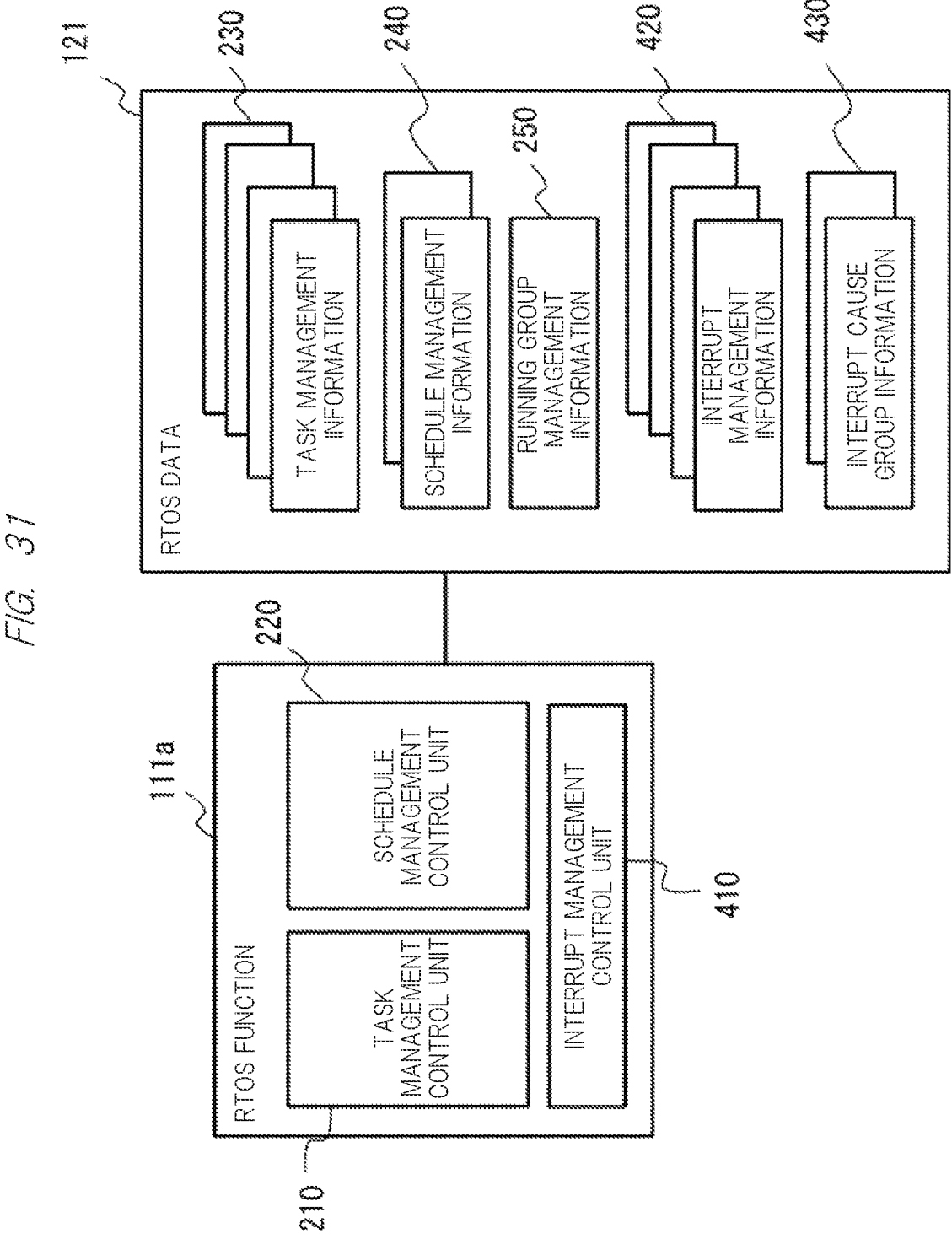
FIG. 31 is a configuration diagram showing configurations of an RTOS and RTOS data according to the second embodiment.

FIG. 31 shows a functional configuration of the RTOS and a data configuration of RTOS data according to the present embodiment. As shown in FIG. 31, the RTOS data 121 further includes interrupt management information 420 and interrupt cause group information 430 in addition to the configuration of the first embodiment.

The interrupt management information 420 is information for managing the interrupt service routines. The interrupt management information 420 is information assigned for each of the interrupt service routines. The interrupt management information 420 includes priority levels of the interrupt service routines, identification information of the groups of the shared resources used by the interrupt service routines. The interrupt management information 420 associates these pieces of information with the interrupt service routines.

The interrupt cause group information 430 is information indicating the groups of the respective causes of interrupt. The interrupt cause group information 430 is information assigned to the PEs 101 in a one-to-one relationship. The interrupt cause group information 430 includes information indicating the cause of interrupt executed in the PE 101 for each group. The interrupt cause group information 430 associates the cause of interrupt with each group.

Moreover, in the present embodiment, the running group management information 250 is information that manages a group of the interrupt service routines running in the multiprocessor system 100 in addition to the group of the tasks running therein. The running group management information 250 includes information indicating whether or not there is a running task or interrupt service routine for each group in the multiprocessor system 100.

An RTOS function 111a further includes an interrupt management control unit 410 in addition to the configuration of the first embodiment. The interrupt management control unit 410 manages and controls an operation of the interrupt service routine in each of the PEs 101. The interrupt management control unit 410 is called from the task management control unit 210. The interrupt management control unit 410 acquires the interrupt cause group information 430 according to the group of the tasks executed in each PE 101. By such acquisition, the interrupt management control unit 410 updates the interrupt mask register 106, thereby controlling the operation of the interrupt service routine. Moreover, the interrupt management control unit 410 is called according to the interrupt request, and controls the operation of the interrupt service routine according to the request. The interrupt management control unit 410 acquires the interrupt cause group information 430, and sets the running group management information 250.

Moreover, together with the task management control unit 210, the interrupt management control unit 410 manages an execution state of each task that accesses the shared resource in the multiprocessor system 100 and each interrupt service routine (interrupt handling) that accesses the shared resource therein. By the running group management information 250, the interrupt management control unit 410 and the task management control unit 210 manage whether or not the tasks which access the shared resources and the interrupt service routines which access the shared resources are executed in all the PEs 101. Moreover, the interrupt management control unit 410 and the task management control unit 210 manage the execution states of the tasks which access the shared resource for each group and the execution states of the interrupt service routines which access the shared resource for each group. For example, the interrupt management control unit 410 and the task management control unit 210 manage the execution states of the tasks of Group 1, which access the shared resource SR1, and the execution states of the interrupt service routines of Group 1, which access the shared resource SR1. Moreover, the interrupt management control unit 410 and the task management control unit 210 manage the execution states of the tasks of Group 2, which access the shared resource SR2, and the execution states of the interrupt service routines of Group 2, which access the shared resource SR2.

Moreover, together with the schedule management control unit 220, the interrupt management control unit 410 determines the task to be executed next in the PE 101 and the interrupt service routine of the interrupt that will occur therein. This determination is performed based on the execution states of the tasks which access the shared resource and the execution states of interrupt service routines which access the shared resource. When the tasks which access the shared resource and the interrupt service routines which access the shared resource are not executed in any of the PEs 101, the interrupt management control unit 410 and the schedule management control unit 220 schedules a task, which is scheduled to be executed next in the PE 101, so that this task is executed. When such a task that accesses the shared resource and the interrupt service routine that accesses the shared resource are executed in any of the PEs 101, the interrupt management control unit 410 and the schedule management control unit 220 schedule the task, which is scheduled to be executed next in the PE 101, so that the execution of this task is suspended. In the case of executing the task that accesses the shared resource, the interrupt management control unit 410 sets the interrupt mask register 106 so as to prohibit the execution (acceptance) of the interrupt service routine that accesses the shared resource. Moreover, when the execution of the task that accesses the shared resource is ended, the interrupt management control unit 410 sets the interrupt mask register 106 so as to release the prohibition of the execution of the interrupt service routine that accesses the shared resource.

Moreover, the interrupt management control unit 410 and the schedule management control unit 220 determine the task of the group, which is to be executed next in the PE 101, and the interrupt service routine of the interrupt of the group, which will occur next. This determination is performed based on the execution states of the tasks for each group and the execution states of the interrupt service routines for each group. For example, based on the execution states of the tasks of Group 1 and the execution states of the interrupt service routines of Group 1, the interrupt management control unit 410 and the schedule management control unit 220 determine the task of Group 1, which is to be executed next in the PE 101, and the interrupt handling of Group 1, which will occur next therein. Moreover, based on the execution states of the tasks of Group 2 and the execution states of the interrupt service routines of Group 2, the interrupt management control unit 410 and the schedule management control unit 220 determine the task of Group 2, which is to be executed next in the PE 101, and the interrupt handling of Group 2, which will occur next therein. The interrupt management control unit 410 and the schedule management control unit 220 determine whether or not such tasks of the groups, which access the shared resources, and the interrupt service routines of the groups, which access the shared resources, are running in all the PEs 101. When the tasks and the interrupt service routines are not executed in any of the PEs 101, the interrupt management control unit 410 and the schedule management control unit 220 schedule the task of the group, which is scheduled to be executed next in the PE 101, so that this task is executed. Moreover, when such a task of the group or such an interrupt service routine of the group is executed in any of the PEs 101, the interrupt management control unit 410 and the schedule management control unit 220 schedules the task of the group, which is scheduled to be executed next in the PE 101, so that the execution of this task is suspended. In the case of executing the task belonging to the group, the interrupt management control unit 410 sets the interrupt mask register 106 so as to prohibit the execution of the interrupt service routine of the group. Moreover, when the execution of the task belonging to the group is ended, the interrupt management control unit 410 sets the interrupt mask register 106 so as to release the prohibition of the execution of the interrupt service routine of the group.

Figure 32:
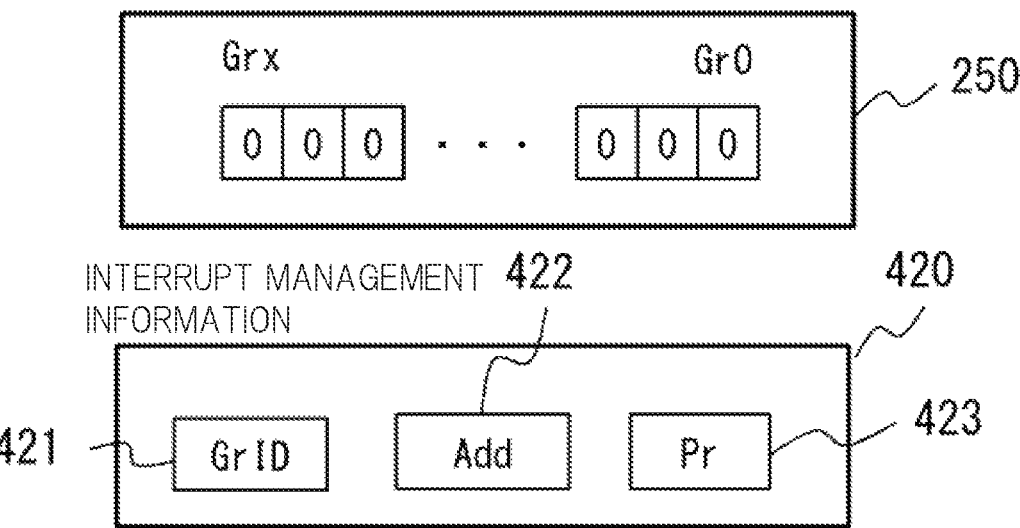
FIG. 32 is a configuration diagram showing the configuration of the RTOS data according to the second embodiment.
Figure 32:
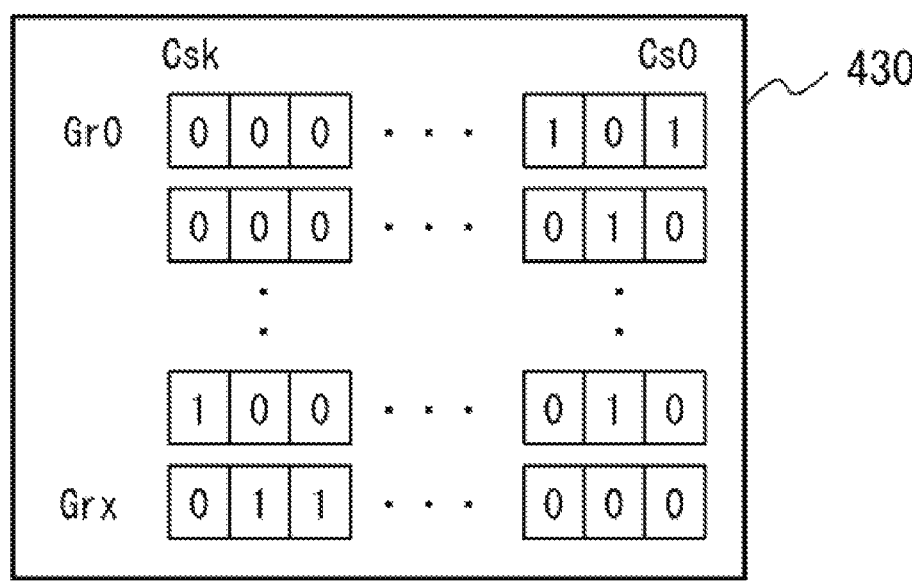

FIG. 32 shows configurations of the running group management information 250, the interrupt management information 420 and the interrupt cause group information 430, which are included in the RTOS data according to the present embodiment.

As in the first embodiment, the running group management information 250 is composed of a bitmap table in which a bit is assigned to each of the groups. In the present embodiment, the running group management information 250 indicates a group to which the running task belongs or a group of the running interrupt service routine in any of the PEs 101 of the multiprocessor system 100. In the running group management information 250, 1 is set to a predetermined bit corresponding to a group in which the task or the interrupt service routine in the Running state is present on the multiprocessor system 100. Moreover, in the running group management information 250, 0 is set to a predetermined bit corresponding to a group in which the task or the interrupt service routine in the Running state is not present on the multiprocessor system 100.

The interrupt management information 420 includes an interrupt group ID (GrID) 421, an interrupt start address (Add) 422, and an interrupt initial priority level (Pr) 423. The interrupt group ID 421 is identification information for identifying the group to which the interrupt service routine belongs (that is, the group is a shared resource accessed thereby). The interrupt start address 422 is information indicating a detail of an address of the interrupt service routine read at the time of starting the processing of the interrupt service routine on the PE 101. The interrupt initial priority level 423 is information indicating an initial value of the priority level of the interrupt service routine.

The interrupt cause group information 430 is composed of a bitmap table of the cause of interrupt for each group. The bitmap table includes a bit map in which bits are assigned one by one to all the causes of interrupt (for example, cause of interrupt 0 to cause of interrupt k), which a managed by the interrupt controller 105 of the multiprocessor system 100. One bitmap table is present per group. In the bitmap of the group to which each cause of interrupt belongs, 1 is set to the bit corresponding to the cause of interrupt. That is, the interrupt cause group information 430 is information indicating the group to which each cause of interrupt belongs. To which group each cause of interrupt belongs is determined by the user at the time of initially setting the RTOS 111.

Figure 33:
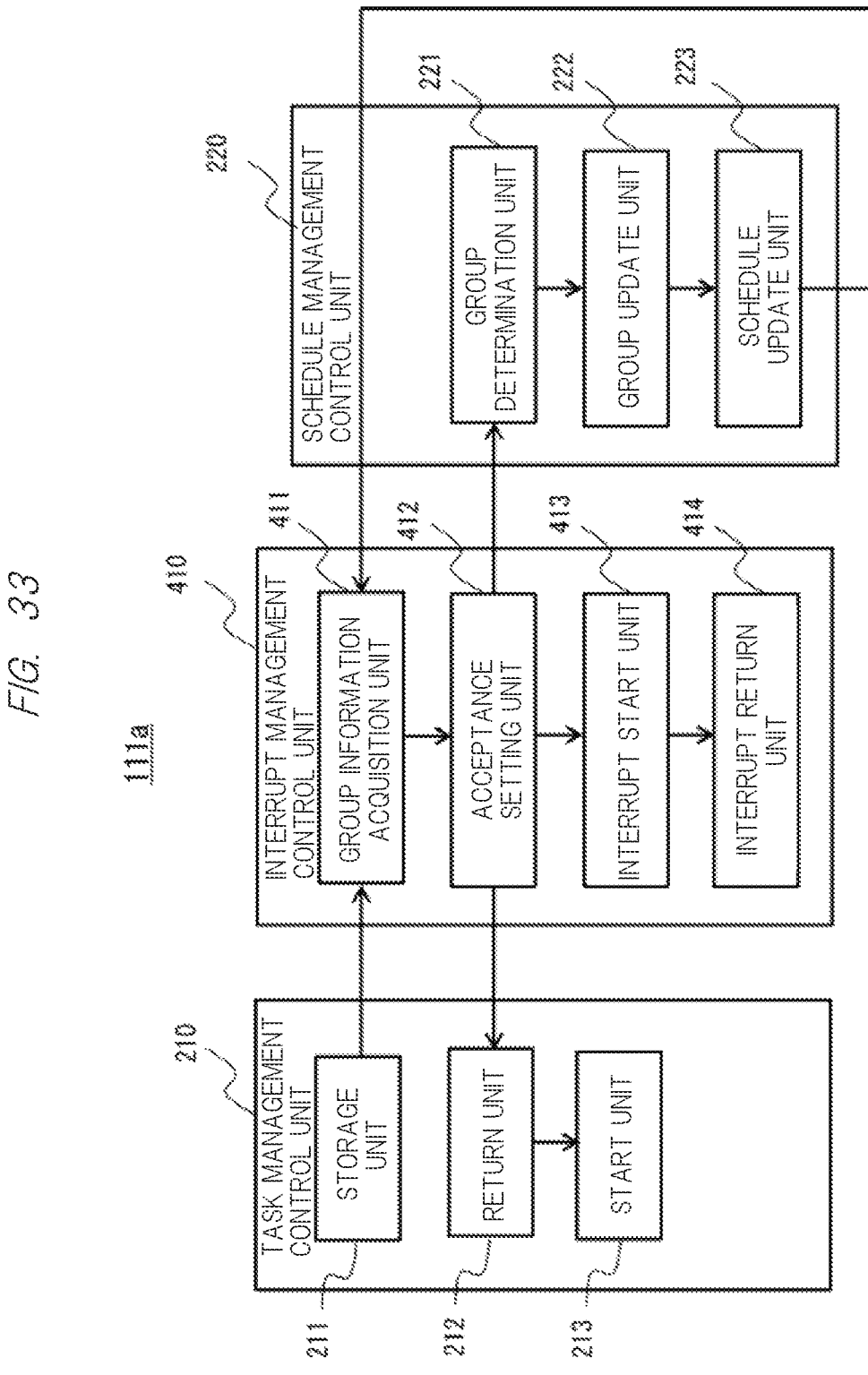
FIG. 33 is a configuration diagram showing the configuration of the RTOS according to the second embodiment.

FIG. 33 shows a configuration of the interrupt management control unit 410 included in the RTOS function 111a according to the present embodiment. As shown in FIG. 33, the interrupt management control unit 410 includes a group information acquisition unit 411, an acceptance setting unit 412, an interrupt start unit 413, and an interrupt return unit 414.

The group information acquisition unit 411 is called from the storage unit 211 of the task management control unit 210 or the schedule update unit 223 of the schedule management control unit 220. According to this call, the group information acquisition unit 411 refers to the running group management information 250, and determines the group in which the task or the interrupt service routine is running. The group information acquisition unit 411 refers to the interrupt cause group information 430, and acquires the interrupt cause group information 430 of the group. Based on the acquired interrupt cause group information 430, the acceptance setting unit 412 changes a setting to accept the interrupt request. At the time of specifying an executable group, the group information acquisition unit 411 and the acceptance setting unit 412 may refer to the interrupt management information 420, and may prohibit the interrupt handling associated with the group. At the time of specifying the executable group, the group information acquisition unit 411 and the acceptance setting unit 412 may refer to the interrupt cause group information 430, and may prohibit the interrupt handling for the cause of interrupt, which is associated with the group. At the time of scheduling the task, the interrupt mask register 106 is set by the acceptance setting unit 412, and thereafter, the group determination unit 221 of the schedule management control unit 220 or the return unit 212 of the task management control unit 210 is called.

Moreover, at the time of the interrupt request from the interrupt controller 105, the interrupt mask register 106 is set by the acceptance setting unit 412, and thereafter, the interrupt start unit 413 starts the interrupt service routine according to the accepted interrupt request. After the interrupt service routine is ended, the interrupt return unit 414 returns the processing to an interruption occurrence source.
RTOS Initial Setting In the present embodiment, as in the first embodiment, the generation device 302 generates and initially sets the RTOS data 121 based on an RTOS initial setting file set by the user.

As in the first embodiment, the generation device 302 initially sets the task management information 230, the schedule management information 240 and the running group management information 250, and further, initially sets the interrupt management information 420 and the interrupt cause group information 430.

Figure 34:
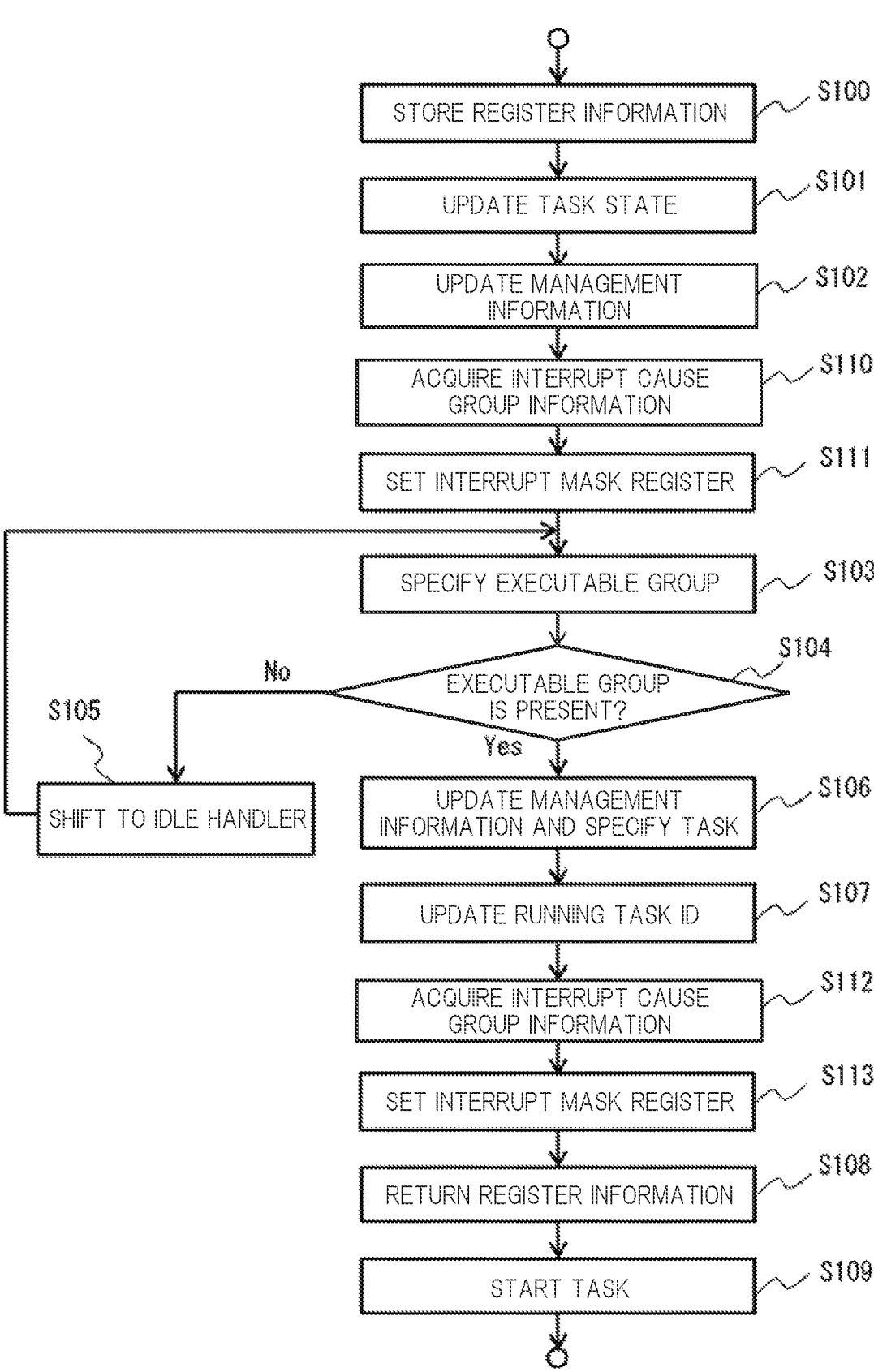
FIG. 34 is a flowchart showing a method for operating the multiprocessor system according to the second embodiment.

In the RTOS initial setting file 301, described are the group of each interrupt service routine, the initial priority level of each service routine, and the group of each cause of interrupt, which are set by the user. Based on the group of the interrupt service routines of the RTOS initial setting file 301, the generation device 302 sets the interrupt group ID 421 of the interrupt management information 420. Moreover, based on the initial priority levels of the interrupt service routines of the RTOS initial setting file 301, the generation device 302 sets the interrupt initial priority level 423 of the interrupt management information 420. Further, the generation device 302 generates the interrupt cause group information 430 based on the group of the causes of interrupt of the RTOS initial setting file 301.
System Operation Next, a method for operating the system of the present embodiment will be described. FIG. 34 is a flowchart showing a method for operating the multiprocessor system according to the present embodiment. In the present embodiment, for the flowchart of the first embodiment, S110 and S111 are added between S102 and S103. Moreover, S112 and S113 are added between S107 and S108. Processing added to those of the first embodiment will be described.

Subsequently to S102, the interrupt management control unit 410 acquires the interrupt cause group information 430 in S110. That is, the group information acquisition unit 411 is called from the storage unit 211 after S102. According to this call, the group information acquisition unit 411 refers to the running group management information 250, and specifies a bit position in which 1 is set, thereby specifying a group in which enabled tasks or interrupt service routines in the Running state are present. Next, the group information acquisition unit 411 acquires such interrupt cause group information 430 that corresponds to the group of the tasks in the Running state or the running interrupt service routines. When a plurality of the groups to which the tasks in the Running state or the running interrupt service routines belong are present, the group information acquisition unit 411 acquires such interrupt cause group information 430 that corresponds to all the groups. When any group to which the tasks in the Running state or the running interrupt service routines belong is not present, the group information acquisition unit 411 does not acquire the interrupt cause group information 430.

Next, in S111, the interrupt management control unit 410 sets the interrupt mask register 106. That is, the acceptance setting unit 412 performs a logical sum operation for all pieces of the interrupt cause group information 430 acquired in S110. The acceptance setting unit 412 sets bits as a result of the operation to the interrupt mask register 106 of the interrupt controller 105. Thus, the acceptance of the interrupt of the group is prohibited. That is, in the case of being called from the task stop request, the acceptance of the interrupt of the group of the stopped task is permitted (the prohibition is released), and the acceptance of the interrupt of the group of the running task is prohibited. Thereafter, the executable group and task are specified in S103 and after.

Subsequently to S107, the interrupt management control unit 410 acquires the interrupt cause group information 430 in S112 as in S110. That is, the group information acquisition unit 411 is called from the schedule update unit 223 after S107. According to this call, the group information acquisition unit 411 refers to the running group management information 250, and specifies a bit position in which 1 is set, thereby specifying a group in which enabled tasks or interrupt service routines in the Running state are present. Next, the group information acquisition unit 411 acquires such interrupt cause group information 430 that corresponds to the group of the tasks in the Running state or the running interrupt service routines.

Next, in S113, the interrupt management control unit 410 sets the interrupt mask register 106 as in S111. That is, the acceptance setting unit 412 performs a logical sum operation for all pieces of the interrupt cause group information 430 acquired in S112. The acceptance setting unit 412 sets bits as a result of the operation to the interrupt mask register 106 of the interrupt controller 105. Thus, the acceptance of the interrupt of the group is prohibited. That is, the acceptance of the interrupt of the group of the task to be started and the running group is prohibited. Thereafter, the task is started in S108 and after.

Figure 35:
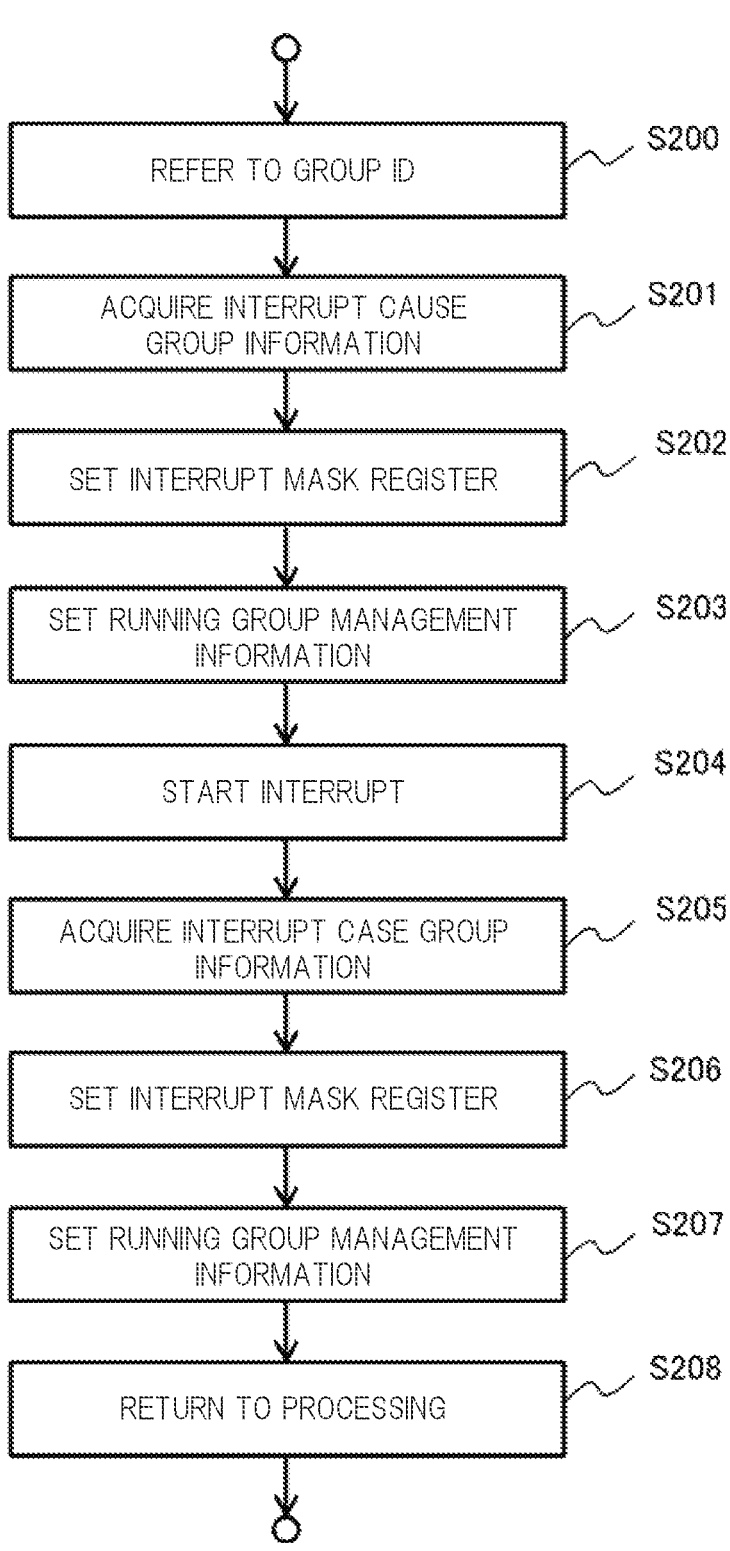
FIG. 35 is a flowchart showing a method for operating the multiprocessor system according to the second embodiment.

In the present embodiment, also in the start and end processing for the interrupt service routine, it is necessary to update the acceptance permission and prohibition setting of the acceptance of the interrupt and the running group management information based on the group information of the interrupt, which is added in the present embodiment. FIG. 35 is a flowchart showing a method for operating the interrupt service routine at the start and end time according to the present embodiment. Note that, when a plurality of the interrupt requests occur, the following processing is performed therefor in a descending order of the interrupt initial priority levels 423 of the interrupt service routines First, in S200, the interrupt management control unit 410 refers to the group ID of the interrupt service routine. That is, the interrupt management control unit 410 accepts the interrupt request from the interrupt controller 105, and starts the interrupt service routine. At this time, the group information acquisition unit 411 refers to the interrupt management information 420 of the requested interrupt service routine, and specifies the interrupt group ID 421 of the interrupt service routine.

Next, in S201, the interrupt management control unit 410 acquires the interrupt cause group information 430. That is, the group information acquisition unit 411 acquires the interrupt cause group information 430 of the group corresponding to the specified group ID 421.

Next, in S202, the interrupt management control unit 410 sets the interrupt mask register 106. That is, the acceptance setting unit 412 sets the bit of the acquired interrupt cause group information 430 of the group to the interrupt mask register 106 of the interrupt controller 105. Thus, the acceptance of the interrupt of the group is prohibited.

Next, in S203, the interrupt management control unit 410 sets the running group management information 250. That is, the acceptance setting unit 412 refers to the running group management information 250, and sets, to 1, the bit corresponding to the group of the interrupt service routine to be started.

Next, in S204, the interrupt management control unit 410 starts the interrupt service routine. That is, the interrupt start unit 413 refers to the interrupt management information 420 of the interrupt service routine, acquires the interrupt start address 422 of the interrupt service routine, and starts an interrupt service by the acquired address.

Next, in S205, the interrupt management control unit 410 acquires the interrupt cause group information 430. That is, when the interrupt service routine is ended, the group information acquisition unit 411 refers to the interrupt management information 420 of the ended interrupt service routine, and specifies the interrupt group ID 421 of the interrupt service routine. The group information acquisition unit 411 acquires the interrupt cause group information 430 of the group corresponding to the specified group ID 421.

Next, in S206, the interrupt management control unit 410 sets the interrupt mask register 106. That is, the acceptance setting unit 412 inverts the bit of the acquired interrupt cause group information 430 of the group, and sets the inverted bit to the interrupt mask register 106 of the interrupt controller 105. Thus, the acceptance of the interrupt of the group is permitted (the prohibition of the acceptance is released).

Next, in S207, the interrupt management control unit 410 sets the running group management information 250. That is, the acceptance setting unit 412 refers to the running group management information 250, and sets, to 0, the bit corresponding to the group of the ended interrupt service routine.

Next, in S208, the interrupt management control unit 410 returns to the processing of the interrupt occurrence source. That is, the interrupt return unit 414 returns to the user routine (task or ISR of the interrupt request acceptance source. For example, when the interrupt occurs during the execution of the task, the register and address of the task are retreated to a stack, and when the interrupt is ended, the register is returned, and the processing is resumed from the retreated address.

Comparison with First Embodiment

Figure 36:
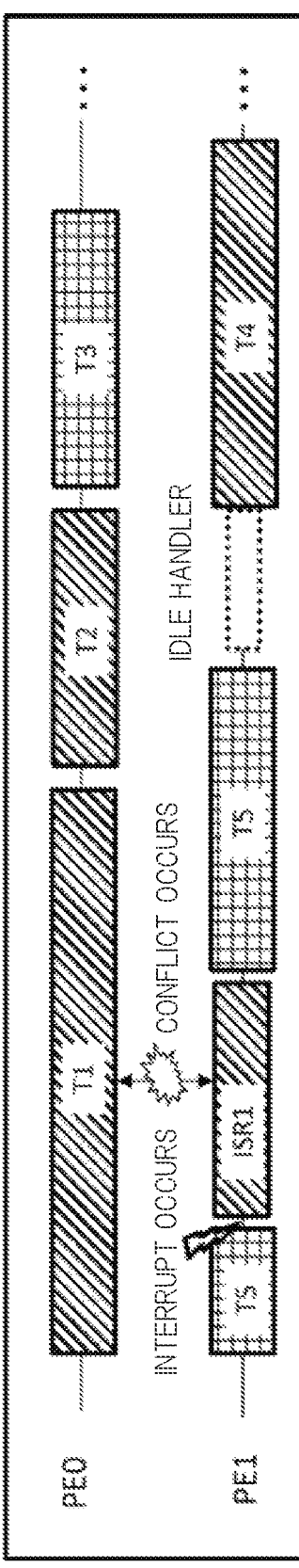
FIG. 36 is a diagram showing an example of shifts of the tasks in the multiprocessor system according to the first embodiment.
Figure 37:
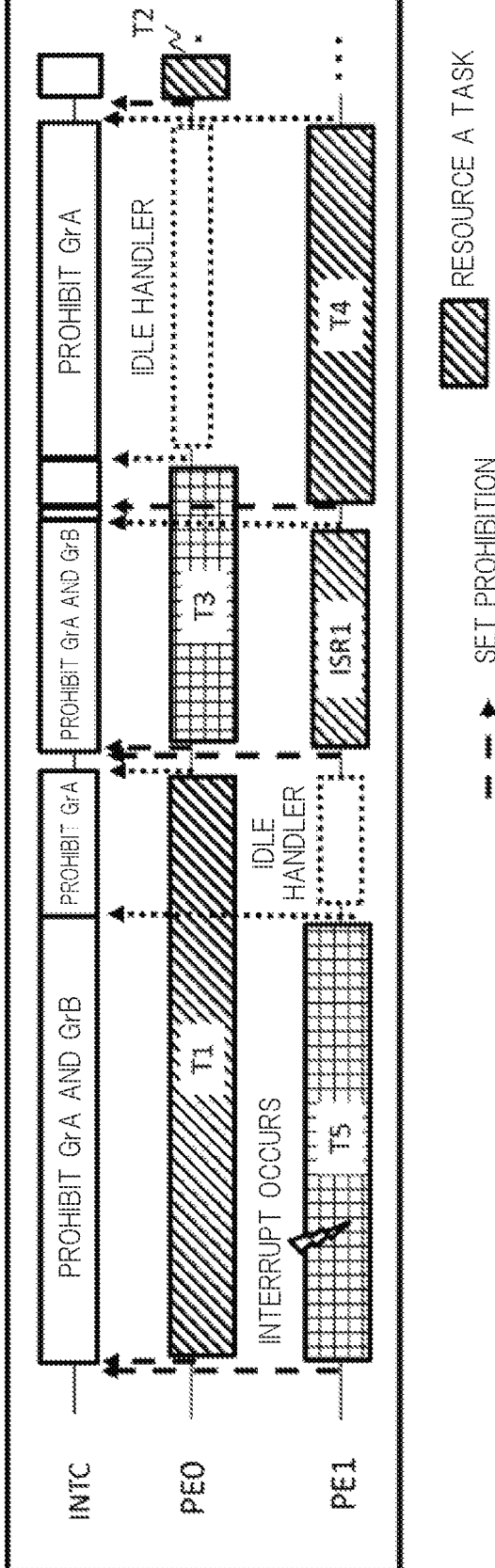
FIG. 37 is a diagram showing an example of shifts of the tasks in the multiprocessor system according to the second embodiment.

FIG. 36 shows a state shift of tasks when tasks T1 to T5 similar to those in the above-described specific example are executed and a conflicting interrupt occurs in the multiprocessor system according to the first embodiment. FIG. 37 shows a state shift of tasks when tasks T1 to T5 similar to those in FIG. 36 are executed and a conflicting interrupt occurs in the multiprocessor system according to the second embodiment.

As shown in FIG. 36, in the first embodiment, the tasks T1, T2 and T4 operate Shared resource A, and accordingly, form Group A, and the tasks T3 and T5 operate Shared resource B, and accordingly, form Group B. Therefore, T1, T2 and T4 are scheduled so as not to be executed simultaneously, and T3 and T5 are scheduled so as not to be executed simultaneously. However, in the first embodiment, the conflict of the interrupt service routine to the shared resources is not considered. As in FIG. 36, when the interrupt of the interrupt service routine (ISR1) that operates Shared resource A occurs simultaneously with the task T1 that operates Shared resource A, a conflict to Shared resource A occurs, and accordingly, Shared resource A cannot be prevented from being broken.

In contrast, in the present embodiment, as shown in FIG. 37, an interrupt acceptance that belongs to the same group as that of the task is prohibited at the time of starting the task, and this prohibition of the interrupt acceptance is released at the time of ending the task. Thus, the interrupt service routine and the task, which belong to the same group, are prevented from working concurrently between the PEs. In FIG. 37, the interrupt acceptance of Group A is prohibited at the time of starting the tasks T1 and T4, and the interrupt acceptance of Group A is permitted at the time of ending the tasks T1 and T4. The interrupt acceptance of Group B is prohibited at the time of starting the tasks T3 and T5, and the interrupt acceptance of Group B is permitted at the time of ending the tasks T3 and T5. The interrupt service routine (ISR1) are caused to belong to Group A since the interrupt service routine (ISR1) operate Shared resource A, and the tasks T1 and T4 are not executed simultaneously. In FIG. 37, an interrupt occurs during the execution of the task T1. However, the interrupt request is suspended since the interrupt acceptance of Group A is prohibited, the task T1 is ended, and the interrupt acceptance of Group A is permitted, and thereafter, the suspended interrupt request is accepted, and the interrupt service routine is executed. Thus, the conflict of the interrupt service routine to the shared resource can be prevented from occurring, and it is not necessary to add the exclusive processing also in the application program that operates the shared resource from the interrupt service routine. Moreover, since the execution of the tasks is not interrupted due to the interrupt, the estimation accuracy for the task execution time is further improved. Note that, also in the present embodiment, the interrupt service routine (cause of interrupt) is set to the non-group, whereby the limitation by the task scheduling for each group is eliminated, and therefore, the interrupt service routine can be executed according to the scheduling based on only the priority levels.

Effects

As described above, in the present embodiment, the running group management information of the first embodiment is extended to be defined as the group information of the running task or interrupt service routine, and the group information of the cause of interrupt and the interrupt management information are added. Then, the interrupt management control unit refers to these pieces of information, and when the task or the interrupt service routine in the Running state is present at the time of scheduling the task, performs the prohibition setting of the acceptance of the interrupt service routine belonging to the same group. Moreover, the task with the highest priority level, which belongs to the group in which neither the task nor the interrupt service routine in the Running state is present on the multiprocessor system, is selected as the task to be started next.

Thus, a software developer will not need to consider to add the exclusive control not only for the tasks but also for the interrupt service routines. Therefore, also in the application program that operates a shared resource from the interrupt service routines, the software developer can directly divert the tasks and the interrupt service routines, which work on the single core processor, for the multiprocessor system without adding the spin lock thereto.

Note that the above-mentioned program can be stored using various types of non-transitory computer readable media, and can be supplied to a computer. The non-transitory computer readable media include various types of tangible storage media. Examples of the non-transitory computer readable media include a magnetic recording medium (for example, a flexible disk, a magnetic tape, a hard disk drive), a magneto-optical recording medium (for example, a magneto-optical disk), a compact disc read only memory (CD-ROM), a CD-R, a CD-R/W, and semiconductor memories (for example, a mask ROM, a programmable ROM (PROM), an erasable PROM (EPROM), a flash ROM, a random access memory (RAM)). Moreover, the program may be supplied to the computer by various types of transitory computer readable media). Examples of the transitory computer readable media include an electrical signal, an optical signal, and an electromagnetic wave. The transitory computer readable media can supply the program to the computer via a wired communication channel such as an electric wire and an optical fiber, or via a wireless communication channel.

While the invention made by the inventor has been specifically described on the basis of the embodiments thereof, needless to say, the present invention is not limited to the embodiments already described, and is modifiable in various ways within the scope without departing from the spirit thereof.

What is claimed is:

1. A semiconductor device comprising:
a memory that stores a program, task management information, and running group management information;
a first processor element and a second processor element; and
a first shared resource and a second shared resource that are respectively accessible from the first processor element and second processor element,
wherein the task management information associates tasks executable by the first processor element or the second processor element with group identification information identifying groups corresponding to the first shared resource or the second shared resource,
wherein the running group management information indicates, for each of the groups, whether a task associated with the group identification information is currently being executed in the first or second processor element, and
wherein each of the first processor element and the second processor element is configured to execute the program:
to refer to the running group management information in accordance with task execution state changes to reflect a current usage state of each shared resource;
to determine, based on the updated running group management information, a group whose shared resource is not being accessed by another processor element as an executable group;
to refer to the task management information to select and initiate execution of a task associated with the group identification information of the executable group; and
to control timing of access to the corresponding shared resource based on the running group management information.

2. The semiconductor device according to claim 1,
wherein each of the first processor element and the second processor element is configured to refer to the running group management information, and to specify, as the executable group, a group in which the tasks associated with the group identification information of the groups are not currently being executed in the first or second processor element.

3. The semiconductor device according to claim 1,
wherein the task management information further associates each task with an execution state, and
wherein each of the first processor element and the second processor element is configured to refer to the task management information, and to determine, among the tasks associated with group identification information of the executable group, a task whose execution state indicates that the task is executable by the corresponding processor element as the task to be executed next.

4. The semiconductor device according to claim 3,
wherein the task management information further associates each task with a priority level, and
wherein each of the first processor element and the second processor element is configured to refer to the task management information, and to determine, among the tasks associated with the group identification information of the executable group, a task whose execution state indicates that the task is executable by the corresponding processor element and that has a highest priority level as the task to be executed next.

5. The semiconductor device according to claim 1,
wherein the memory further stores interrupt management information,
wherein the interrupt management information is information in which interrupt handling operations and the group identification information for identifying the groups are associated with each other,
wherein the running group management information indicates, for each group, whether a task associated with the group identification information of the group or an interrupt handling operation associated with the group identification information of the group is currently being executed in the first processor element or second processor element, and
wherein each of the first processor element and the second processor element is configured to refer to the interrupt management information when specifying the executable group, and to temporarily inhibit execution of the interrupt handling operation associated with the group identification information of the group being executed in either the first process element or the second processor element.

6. The semiconductor device according to claim 5,
wherein the memory further stores interrupt cause group information,
wherein the interrupt cause group information is information in which the groups and causes of interrupt of the interrupt handling are associated with each other, and
wherein each of the first processor element and the second processor element is configured to refer to the interrupt cause group information when specifying the executable group, and to temporarily inhibit execution of the interrupt handling operation corresponding to the causes of interrupts associated with the groups being executed.

7. A control method of a semiconductor device including a first processor element and a second processor element, a first shared resource accessible from the first processor element and a second shared resource accessible from the second processor element, the control method comprising:
storing, in a memory, task management information in which tasks executable by the first processor element or the second processor element and group identification information for identifying groups corresponding to the first shared resource or the second shared resource are associated with each other;
storing, in the memory, running group management information indicating, for each group, whether a task associated with the group identification information of the group is currently being executed in the first processor element or the second processor element;

referring to and updating the running group management information in accordance with task execution state changes to reflect a current usage state of each of the first shared resource and the second shared resource;

determining, based on the updated running group management information, a group whose corresponding shared resource is not being accessed by another processor element as an executable group;

referring to the task management information and selecting and initiating execution of a task associated with group identification information of the executable group; and controlling timing of access to the corresponding shared resource based on the running group management information.

8. A non-transitory computer-readable medium storing a program that, when executed by semiconductor device including a first processor element, a second processor element, a first shared resource accessible from the first processor element, and a second shared resource accessible from the second processor element, causes the semiconductor device to perform a control method comprising:

storing, in a memory, task management information in which tasks executable by the first processor element or the second processor element and group identification information for identifying groups corresponding to the first shared resource or the second shared resource are associated with each other;

storing, in the memory, running group management information indicating, for each group, whether a task associated with the group identification information of the group is currently being executed in the first processor element or the second processor element;

referring to and updating the running group management information in accordance with task execution state changes to reflect a current usage state of each of the first shared resource and the second shared resource;

determining, based on the updated running group management information, a group whose corresponding shared resource is not being accessed by another processor element as an executable group;

referring to the task management information and selecting and initiating execution of a task associated with group identification information of the executable group; and controlling timing of access to the corresponding shared resource based on the running group management information.

* * * * *